US012719786B2

(12) United States Patent
Brar et al.

(10) Patent No.: US 12,719,786 B2
(45) Date of Patent: Aug. 25, 2026

(54) LAYER-2 NETWORKING SPAN PORT IN A VIRTUALIZED CLOUD ENVIRONMENT

(71) Applicant: Oracle International Corporation, Redwood Shores, CA (US)

(72) Inventors: Jagwinder Singh Brar, Bellevue, WA (US); Lucas Michael Kreger-Stickles, Seattle, WA (US); Bryce Eugene Bockman, Seattle, WA (US); Peter Croft Jones, Lexington, MA (US); Shane Baker, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 116 days.

(21) Appl. No.: 18/362,777

(22) Filed: Jul. 31, 2023

(65) Prior Publication Data

US 2024/0031282 A1 Jan. 25, 2024

Related U.S. Application Data

(63) Continuation of application No. 17/494,719, filed on Oct. 5, 2021, now Pat. No. 11,765,080.

(Continued)

(51) Int. Cl.

*H04L 45/586* (2022.01)

*G06F 9/455* (2018.01)

(Continued)

(52) U.S. Cl.

CPC ........ *H04L 45/586* (2013.01); *G06F 9/45558* (2013.01); *G06F 9/5077* (2013.01);

(Continued)

(58) Field of Classification Search

CPC ......... G06F 9/45558; G06F 2009/4557; G06F 2009/45595; H04L 45/66; H04L 47/2483; H04L 49/70; H04L 2101/622

See application file for complete search history.

(56) References Cited

U.S. PATENT DOCUMENTS

| | | | |
|---|---|---|---|
| 6,594,704 | B1 | 7/2003 | Birenbach et al. |
| 7,478,173 | B1 | 1/2009 | Delco |

(Continued)

FOREIGN PATENT DOCUMENTS

| | | | |
|---|---|---|---|
| CA | 2991359 | A1 | 5/2018 |
| CN | 1741500 | A | 3/2006 |

(Continued)

OTHER PUBLICATIONS

U.S. Appl. No. 17/376,004, Notice of Allowability mailed on Dec. 14, 2023, 2 pages.

(Continued)

*Primary Examiner* — Hieu T Hoang

(74) *Attorney, Agent, or Firm* — Kilpatrick Townsend & Stockton LLP

(57) ABSTRACT

Techniques are described for communications in an L2 virtual network. In an example, the L2 virtual network includes a plurality of L2 compute instances hosted on a set of host machines and a plurality of L2 virtual network interfaces and L2 virtual switches hosted on a set of network virtualization devices. An L2 virtual network interface emulates an L2 port of the L2 virtual network. Span port information applicable to the L2 port is sent to a network virtualization device that hosts the L2 virtual network interface.

20 Claims, 23 Drawing Sheets

Related U.S. Application Data

(60) Provisional application No. 63/132,377, filed on Dec. 30, 2020.

(51) Int. Cl.
*G06F 9/50* (2006.01)
*H04L 9/40* (2022.01)
*H04L 45/00* (2022.01)
*H04L 45/16* (2022.01)
*H04L 47/12* (2022.01)
*H04L 47/2483* (2022.01)
*H04L 49/00* (2022.01)
*H04L 61/103* (2022.01)
*H04L 61/2517* (2022.01)
*H04L 67/10* (2022.01)
*H04L 69/324* (2022.01)
*H04L 101/622* (2022.01)

(52) U.S. Cl.
CPC .............. *H04L 45/16* (2013.01); *H04L 45/66* (2013.01); *H04L 47/12* (2013.01); *H04L 47/2483* (2013.01); *H04L 49/70* (2013.01); *H04L 61/103* (2013.01); *H04L 61/2517* (2013.01); *H04L 63/101* (2013.01); *H04L 69/324* (2013.01); *G06F 2009/4557* (2013.01); *G06F 2009/45595* (2013.01); *H04L 67/10* (2013.01); *H04L 2101/622* (2022.05)

(56) References Cited

U.S. PATENT DOCUMENTS 7,746,783 B1 6/2010 Tripathi et al.
7,821,931 B2 10/2010 Swenson et al.
8,639,783 B1 * 1/2014 Bakke ..................... H04L 49/70 710/316
8,761,187 B2 * 6/2014 Barde ..................... H04L 49/70 370/386
9,100,213 B1 8/2015 Ramanathan et al.
9,154,327 B1 10/2015 Marino et al.
9,948,579 B1 4/2018 Sivaramakrishnan
10,009,371 B2 6/2018 Antony
10,063,469 B2 8/2018 Shen et al.
10,078,528 B2 9/2018 Bugenhagen
10,178,073 B2 1/2019 Shaposhnik
10,341,259 B1 7/2019 Singh
10,484,331 B1 11/2019 Rossman
10,552,513 B1 2/2020 Harkare
10,616,104 B2 4/2020 Shen et al.
10,671,424 B2 6/2020 Behera et al.
10,708,082 B1 7/2020 Bakiaraj et al.
10,778,465 B1 9/2020 Borle
11,159,366 B1 10/2021 Gawade et al.
11,171,834 B1 11/2021 Bockelmann et al.
11,206,213 B2 12/2021 Shen et al.
11,316,822 B1 4/2022 Gawade et al.
11,347,537 B2 5/2022 Behera et al.
11,463,355 B2 10/2022 Kreger-Stickles et al.
11,496,392 B2 11/2022 Agarwal et al.
11,502,950 B2 11/2022 Bays
11,502,958 B2 11/2022 Masurekar et al.
11,652,743 B2 5/2023 Brar et al.
11,757,773 B2 9/2023 Brar et al.
11,765,080 B2 9/2023 Brar et al.
11,818,040 B2 11/2023 Kreger-Stickles et al.
11,831,544 B2 11/2023 Kreger-Stickles et al.
11,876,708 B2 1/2024 Kreger-Stickles et al.
11,909,636 B2 2/2024 Brar et al.
12,015,552 B2 6/2024 Brar et al.
12,278,758 B2 4/2025 Brar et al.
12,284,113 B2 4/2025 Brar et al.
12,328,257 B2 6/2025 Kreger-stickles et al.
12,341,689 B2 6/2025 Kreger-stickles et al.
12,341,690 B2 6/2025 Kreger-Stickles et al.
2002/0120769 A1 8/2002 Ammitzboell
2004/0210623 A1 10/2004 Hydrie et al.
2005/0169239 A1 8/2005 Knees et al.
2005/0222815 A1 10/2005 Tolly
2006/0045089 A1 3/2006 Bacher et al.
2008/0205402 A1 8/2008 McGee et al.
2009/0063706 A1 3/2009 Goldman et al.
2009/0164522 A1 6/2009 Fahey
2009/0327462 A1 12/2009 Adams et al.
2010/0014526 A1 1/2010 Chavan et al.
2010/0131636 A1 5/2010 Suri et al.
2010/0333101 A1 12/2010 Pope et al.
2011/0090910 A1 4/2011 Tripathi et al.
2011/0158248 A1 6/2011 Vorunganti et al.
2011/0264610 A1 10/2011 Armstrong et al.
2011/0283017 A1 11/2011 Alkhatib et al.
2011/0317703 A1 * 12/2011 Dunbar ............... H04L 61/2596 370/392
2012/0014387 A1 1/2012 Dunbar et al.
2012/0110055 A1 5/2012 Van Biljon et al.
2012/0110056 A1 5/2012 Van Biljon et al.
2012/0110180 A1 5/2012 Van Biljon et al.
2012/0110188 A1 5/2012 Van Biljon et al.
2012/0110636 A1 5/2012 Van Biljon et al.
2012/0110650 A1 5/2012 Van Biljon et al.
2012/0110651 A1 5/2012 Van Biljon et al.
2012/0117229 A1 5/2012 Van Biljon et al.
2012/0207177 A1 * 8/2012 Sharma ................... H04L 43/00 370/419
2012/0210319 A1 8/2012 Recio et al.
2012/0216194 A1 8/2012 Hadas et al.
2012/0287787 A1 * 11/2012 Kamble ................ H04L 49/201 370/235
2012/0291026 A1 * 11/2012 Biswas ................. H04L 43/026 718/1
2012/0307684 A1 12/2012 Biswas et al.
2012/0324442 A1 12/2012 Barde
2013/0031233 A1 1/2013 Feng et al.
2013/0044631 A1 2/2013 Biswas et al.
2013/0044636 A1 2/2013 Koponen et al.
2013/0061047 A1 3/2013 Sridharan et al.
2013/0125230 A1 5/2013 Koponen et al.
2013/0188640 A1 7/2013 Cors et al.
2013/0212276 A1 8/2013 Abuelsaad et al.
2013/0259037 A1 * 10/2013 Natarajan ............. H04L 43/026 370/390
2013/0286832 A1 10/2013 Rajah et al.
2013/0346583 A1 12/2013 Low et al.
2014/0003442 A1 1/2014 Hernandez et al.
2014/0025816 A1 1/2014 Otani
2014/0090910 A1 4/2014 Treadway et al.
2014/0122704 A1 * 5/2014 Wang .................... H04L 49/354 709/224
2014/0126418 A1 5/2014 Brendel et al.
2014/0185616 A1 7/2014 Bloch et al.
2014/0233370 A1 8/2014 Khare et al.
2014/0247754 A1 9/2014 Venkata et al.
2014/0280841 A1 9/2014 Kamble et al.
2014/0328340 A1 11/2014 DeCusatis et al.
2014/0359749 A1 12/2014 Rieke et al.
2014/0376550 A1 12/2014 Khan et al.
2015/0009831 A1 1/2015 Graf
2015/0043334 A1 2/2015 Antony
2015/0043576 A1 2/2015 Dixon et al.
2015/0058463 A1 2/2015 Wang et al.
2015/0058968 A1 2/2015 Wang et al.
2015/0071110 A1 3/2015 Kothari et al.
2015/0074661 A1 3/2015 Kothari et al.
2015/0082301 A1 3/2015 Garg et al.
2015/0103842 A1 4/2015 Chandrashekhar et al.
2015/0121372 A1 4/2015 Hatta et al.
2015/0124814 A1 5/2015 De Silva et al.
2015/0163196 A1 6/2015 Bhagwat et al.
2015/0200808 A1 7/2015 Gourlay et al.
2015/0200853 A1 7/2015 Kothari et al.
2015/0237667 A1 8/2015 Ghai et al.
2015/0264121 A1 9/2015 Van Biljon et al.

(56) References Cited

U.S. PATENT DOCUMENTS

2015/0350095 A1* 12/2015 Raney .................... H04L 69/22 709/223
2015/0358231 A1 12/2015 Zhang et al.
2015/0365281 A1 12/2015 Marino et al.
2016/0087885 A1 3/2016 Tripathi et al.
2016/0094650 A1 3/2016 Garcia de Rio
2016/0110211 A1* 4/2016 Karnes ................ G06F 9/45558 718/1
2016/0149795 A1 5/2016 Kang et al.
2016/0182336 A1 6/2016 Doctor et al.
2016/0182342 A1 6/2016 Singaravelu et al.
2016/0218972 A1 7/2016 Sun
2016/0224363 A1 8/2016 Joy
2016/0241474 A1 8/2016 Wang et al.
2016/0254956 A1* 9/2016 Xu ..................... H04L 41/0886 370/255
2016/0323121 A1 11/2016 Benny et al.
2016/0335129 A1 11/2016 Behera et al.
2017/0126726 A1 5/2017 Han
2017/0161090 A1 6/2017 Kodama
2017/0163599 A1 6/2017 Shen et al.
2017/0180249 A1 6/2017 Shen et al.
2017/0180250 A1 6/2017 Shen et al.
2017/0279668 A1 9/2017 Shevenell et al.
2017/0279690 A1 9/2017 Tripathi et al.
2017/0302569 A1* 10/2017 Ramaswamy .......... H04L 67/10
2017/0324826 A1 11/2017 Johnsen et al.
2017/0364973 A1 12/2017 Van Biljon et al.
2017/0373952 A1 12/2017 Shem Tov et al.
2018/0006923 A1* 1/2018 Gao ........................ H04L 43/12
2018/0007005 A1* 1/2018 Chanda ............... H04L 63/0236
2018/0018193 A1 1/2018 Yabushita et al.
2018/0019956 A1 1/2018 Ravindran et al.
2018/0041477 A1 2/2018 Shaposhnik
2018/0063074 A1 3/2018 Shankarappa et al.
2018/0109471 A1 4/2018 Chang et al.
2018/0121223 A1 5/2018 Cui et al.
2018/0123954 A1 5/2018 Jiang et al.
2018/0124139 A1 5/2018 Jiang et al.
2018/0181417 A1 6/2018 Nallapareddy et al.
2018/0212928 A1 7/2018 Gerber et al.
2018/0239631 A1 8/2018 Behera et al.
2018/0241610 A1* 8/2018 Wang .................. H04L 41/0895
2018/0260292 A1 9/2018 Wang et al.
2018/0287966 A1 10/2018 Kamath et al.
2018/0309718 A1 10/2018 Zuo
2018/0343319 A1 11/2018 Kutty et al.
2018/0349163 A1* 12/2018 Gao ...................... H04L 49/208
2018/0367341 A1 12/2018 Wallace et al.
2018/0367417 A1 12/2018 Dixit et al.
2018/0375799 A1 12/2018 Liu et al.
2019/0014039 A1 1/2019 Shen et al.
2019/0028424 A1 1/2019 Mittal et al.
2019/0028435 A1 1/2019 Khare et al.
2019/0036802 A1 1/2019 Kuttuva Jeyaram
2019/0036868 A1 1/2019 Chandrashekhar et al.
2019/0059117 A1 2/2019 Shu et al.
2019/0065228 A1 2/2019 Tsirkin et al.
2019/0068496 A1 2/2019 Tessmer et al.
2019/0104069 A1* 4/2019 Kommula ........... H04L 43/0876
2019/0132241 A1 5/2019 Vattem et al.
2019/0132286 A1 5/2019 Holla et al.
2019/0140931 A1* 5/2019 Ganichev ................ H04L 45/42
2019/0166003 A1 5/2019 Shelke et al.
2019/0222508 A1 7/2019 Babu et al.
2019/0245949 A1 8/2019 Wang et al.
2019/0273683 A1* 9/2019 Jiang ................... G06F 9/45558
2020/0044969 A1 2/2020 Hao et al.
2020/0092299 A1* 3/2020 Srinivasan ............ G06F 21/552
2020/0177539 A1 6/2020 Mittal et al.
2020/0213227 A1 7/2020 Pianigiani et al.
2020/0213246 A1* 7/2020 Pan ................... G06F 15/17331
2020/0228447 A1 7/2020 Shen et al.
2020/0236041 A1 7/2020 Yu et al.
2020/0252291 A1 8/2020 Mittal et al.
2020/0278879 A1 9/2020 Behera et al.
2020/0280534 A1* 9/2020 Rajendran ............... H04L 45/02
2020/0409739 A1 12/2020 Kamath et al.
2020/0409873 A1* 12/2020 Kamath ................ G06F 9/4411
2021/0058295 A1* 2/2021 Pianigiani ............. H04L 67/303
2021/0067408 A1 3/2021 Vaidya et al.
2021/0067466 A1 3/2021 Parab et al.
2021/0075630 A1 3/2021 Immidi et al.
2021/0092057 A1 3/2021 Devireddy et al.
2021/0144177 A1 5/2021 Tsirkin et al.
2021/0314232 A1 10/2021 Nainar et al.
2022/0021610 A1 1/2022 Kreger-Stickles et al.
2022/0150312 A1 5/2022 Ranpise et al.

FOREIGN PATENT DOCUMENTS

CN 102790716 A 11/2012
CN 102938721 A 2/2013
CN 103890751 A 6/2014
CN 103997513 A 8/2014
CN 104348694 A 2/2015
CN 104823409 A 8/2015
CN 105684363 A 6/2016
CN 106375384 A 2/2017
CN 106850444 A 6/2017
CN 106936777 A 7/2017
CN 108540381 A 9/2018
CN 109120418 A 1/2019
CN 110050448 A 7/2019
CN 106936777 B 2/2020
CN 110999265 A 4/2020
CN 112084258 A 12/2020
CN 116210204 A 6/2023
CN 116235484 A 6/2023
EP 2680514 A1 1/2014
EP 3462686 A1 4/2019
EP 3605969 A1 2/2020
EP 3617879 A1 3/2020
EP 3675423 A1 7/2020
EP 3716533 A1 9/2020
EP 3783835 A1 2/2021
JP 2010103633 A 5/2010
JP 2012501583 A 1/2012
JP 2013258446 A 12/2013
JP 201 4506739 A 3/2014
JP 2014230057 A 12/2014
JP 2014535252 A 12/2014
JP 2015076874 A 4/2015
JP 2016076959 A 5/2016
JP 2017046208 A 3/2017
JP 2017200099 A 11/2017
JP 2017201804 A 11/2017
JP 2018050306 A 3/2018
JP 2018182418 A 11/2018
JP 2018537006 A 12/2018
JP 2019161319 A 9/2019
JP 2020022100 A 2/2020
JP 2020113836 A 7/2020
KR 20170119417 A 10/2017
WO 2010138937 A2 12/2010
WO 2016134380 A1 8/2016
WO 2018027007 A1 2/2018

OTHER PUBLICATIONS

U.S. Appl. No. 17/494,722, Notice of Allowance mailed on Feb. 6, 2024, 11 pages.

European Application No. 21751927.1, Intention to Grant mailed on Nov. 30, 2023, 8 pages.

European Application No. 21752350.5, Intention to Grant mailed on Nov. 16, 2023, 8 pages.

Configuring Local Span, Rspan and Erspan, Cisco IOS Software Configuration Guide, Release 12.2SX, Chapter 68, Aug. 17, 2007, 36 pages.

Configuring Traffic Storm Control, Cisco Nexus 5000 Series NX-OS Layer 2 Switching Configuration Guide, Release 5.0(3) N2(1), Jul. 29, 2011, pp. 1-4.

(56) References Cited

OTHER PUBLICATIONS

U.S. Appl. No. 17/375,999, Final Office Action mailed on Jan. 5, 2023, 24 pages.
U.S. Appl. No. 17/375,999, Non-Final Office Action mailed on Aug. 4, 2022, 22 pages.
U.S. Appl. No. 17/375,999, Notice of Allowance mailed on Jul. 13, 2023, 14 pages.
U.S. Appl. No. 17/375,999, Notice of Allowance mailed on Jun. 2, 2023, 14 pages.
U.S. Appl. No. 17/376,002, Notice of Allowance mailed on May 25, 2022, 8 pages.
U.S. Appl. No. 17/376,004, Non-Final Office Action mailed on Apr. 10, 2023, 8 pages.
U.S. Appl. No. 17/376,004, Notice of Allowance mailed on Aug. 29, 2023, 11 pages.
U.S. Appl. No. 17/494,719, Non-Final Office Action mailed on Apr. 4, 2023, 16 pages.
U.S. Appl. No. 17/494,719, Notice of Allowance mailed on Jul. 21, 2023, 10 pages.
U.S. Appl. No. 17/494,722, Final Office Action mailed on Aug. 8, 2023, 10 pages.
U.S. Appl. No. 17/494,722, Non-Final Office Action mailed on May 8, 2023, 11 pages.
U.S. Appl. No. 17/494,725, Corrected Notice of Allowability mailed on Apr. 14, 2023, 2 pages.
U.S. Appl. No. 17/494,725, Non-Final Office Action mailed on Nov. 9, 2022, 29 pages.
U.S. Appl. No. 17/494,725, Notice of Allowance mailed on Mar. 2, 2023, 9 pages.
U.S. Appl. No. 17/494,729, Non-Final Office Action mailed on Mar. 2, 2023, 21 pages.
U.S. Appl. No. 17/494,729, Notice of Allowance mailed on Jul. 11, 2023, 11 pages.
U.S. Appl. No. 17/958,800, Notice of Allowance mailed on Jul. 7, 2023, 9 pages.
Azodolmolky et al., Cloud Computing Networking: Challenges and Opportunities for Innovations, Institute of Electrical and Electronics Engineers Communications Magazine, vol. 51, No. 7, Jul. 2013, pp. 54-62.
Jain et al., Network Virtualization and Software Defined Networking for Cloud Computing: A Survey, Institute of Electrical and Electronics Engineers Communications Magazine, vol. 51, No. 11, Nov. 2013, pp. 24-31.
International Application No. PCT/US2021/041676, International Preliminary Report on Patentability mailed on Jan. 26, 2023, 9 pages.
International Application No. PCT/US2021/041676, International Search Report and Written Opinion mailed on Oct. 29, 2021, 13 pages.
International Application No. PCT/US2021/041678, International Preliminary Report on Patentability mailed on Jan. 26, 2023, 7 pages.
International Application No. PCT/US2021/041678, International Search Report and Written Opinion mailed on Nov. 16, 2021, 11 pages.
International Application No. PCT/US2021/041679, International Preliminary Report on Patentability mailed on Jan. 26, 2023, 7 pages.
International Application No. PCT/US2021/041679, International Search Report and Written Opinion mailed on Nov. 16, 2021, 11 pages.
International Application No. PCT/US2021/060721, International Preliminary Report on Patentability mailed on Jul. 13, 2023, 7 pages.
International Application No. PCT/US2021/060721, International Search Report and Written Opinion mailed on Mar. 22, 2022, 11 pages.
International Application No. PCT/US2021/060790, International Preliminary Report on Patentability mailed on Jul. 13, 2023, 9 pages.
International Application No. PCT/US2021/060790, International Search Report and Written Opinion mailed on Mar. 18, 2022, 13 pages.
International Application No. PCT/US2021/060804, International Preliminary Report on Patentability mailed on Jul. 13, 2023, 11 pages.
International Application No. PCT/US2021/060804, International Search Report and Written Opinion mailed on Mar. 21, 2022, 15 pages.
International Application No. PCT/US2021/060820, International Preliminary Report on Patentability mailed on Jul. 13, 2023, 9 pages.
International Application No. PCT/US2021/060820, International Search Report and Written Opinion mailed on Mar. 21, 2022, 13 pages.
International Application No. PCT/US2021/060843, International Preliminary Report on Patentability mailed on Jul. 13, 2023, 10 pages.
International Application No. PCT/US2021/060843, International Search Report and Written Opinion mailed on Mar. 23, 2022, 14 pages.
U.S. Appl. No. 17/375,999, "Corrected Notice of Allowability", filed Sep. 13, 2023, 2 pages.
U.S. Appl. No. 17/494,720, "Notice of Allowance", filed Sep. 29, 2023, 13 pages.
U.S. Appl. No. 17/958,800, "Corrected Notice of Allowability", filed Oct. 16, 2023, 2 pages.
U.S. Appl. No. 18/295,400, "Non-Final Office Action", mailed Jun. 6, 2024, 37 pages.
U.S. Appl. No. 18/511,037, "Non-Final Office Action", mailed Jul. 2, 2024, 30 pages.
International Application No. EP21839719.8, "Intention to Grant", mailed Apr. 25, 2024, 8 pages.
International Application No. EP21840228.7, "Intention to Grant", mailed Apr. 26, 2024, 7 pages.
International Application No. EP21840231.1, "Intention to Grant", mailed Jul. 3, 2024, 8 pages.
U.S. Appl. No. 17/375,999, Corrected Notice of Allowability mailed on Oct. 19, 2023, 2 pages.
U.S. Appl. No. 18/295,400, Corrected Notice of Allowability mailed on Jan. 6, 2025, 3 pages.
U.S. Appl. No. 18/295,400, Corrected Notice of Allowability mailed on Mar. 19, 2025, 3 pages.
U.S. Appl. No. 18/295,400, Notice of Allowance mailed on Dec. 12, 2024, 10 pages.
U.S. Appl. No. 18/358,745, Corrected Notice of Allowability mailed on Dec. 29, 2025, 2 pages.
U.S. Appl. No. 18/358,745, Non-Final Office Action mailed on Apr. 21, 2025, 15 pages.
U.S. Appl. No. 18/358,745, Notice of Allowance mailed on Oct. 24, 2025, 8 pages.
U.S. Appl. No. 18/358,745, Notice of Allowance mailed on Sep. 23, 2025, 9 pages.
U.S. Appl. No. 18/390,384, Non-Final Office Action mailed on Jul. 18, 2024, 8 pages.
U.S. Appl. No. 18/390,384, Notice of Allowance mailed on Dec. 19, 2024, 6 pages.
U.S. Appl. No. 18/412,012, Non-Final Office Action mailed on Jul. 31, 2024, 8 pages.
U.S. Appl. No. 18/412,012, Notice of Allowance mailed on Dec. 19, 2024, 6 pages.
U.S. Appl. No. 18/412,012, Notice of Allowance mailed on Feb. 25, 2025, 9 pages.
U.S. Appl. No. 18/498,943, Corrected Notice of Allowability mailed on Mar. 26, 2025, 2 pages.
U.S. Appl. No. 18/498,943, Corrected Notice of Allowability mailed on May 1, 2025, 2 pages.
U.S. Appl. No. 18/498,943, Non-Final Office Action mailed on Jul. 31, 2024, 10 pages.
U.S. Appl. No. 18/498,943, Notice of Allowance mailed on Mar. 14, 2025, 9 pages.
U.S. Appl. No. 18/498,943, Notice of Allowance mailed on Nov. 22, 2024, 9 pages.

(56) References Cited

OTHER PUBLICATIONS

U.S. Appl. No. 18/511,037, Corrected Notice of Allowability mailed on Dec. 11, 2024, 2 pages.
U.S. Appl. No. 18/511,037, Corrected Notice of Allowability mailed on Feb. 26, 2025, 2 pages.
U.S. Appl. No. 18/511,037, Corrected Notice of Allowability mailed on Mar. 14, 2025, 2 pages.
U.S. Appl. No. 18/511,037, Corrected Notice of Allowability mailed on May 9, 2025, 2 pages.
U.S. Appl. No. 18/511,037, Notice of Allowance mailed on Feb. 10, 2025, 9 pages.
U.S. Appl. No. 18/511,037, Notice of Allowance mailed on Nov. 27, 2024, 9 pages.
U.S. Appl. No. 18/736,252, Non-Final Office Action mailed on Nov. 10, 2025, 17 pages.
Chinese Patent Application No. 202180060787.9, Office Action mailed on Oct. 1, 2025, 19 pages.
Chinese Patent Application No. 202180060833.5, Office Action mailed on Jan. 20, 2026, 21 pages.
Chinese Patent Application No. 202180061266.5, Office Action mailed on Jul. 17, 2025, 20 pages.
European Patent Application No. 21751715.0, Intention to Grant mailed on Jan. 15, 2026, 8 pages.
European Patent Application No. 21751715.0, Office Action mailed on Jul. 1, 2025, 5 pages.
European Patent Application No. 21830839.3, Office Action mailed on Oct. 23, 2025, 5 pages.
European Patent Application No. 21839720.6, Office Action mailed on Nov. 7, 2025, 5 pages.
Indian Patent Application No. 202347000297, First Examination Report mailed on Oct. 11, 2024, 5 pages.
Indian Patent Application No. 202347000303, First Examination Report mailed on Aug. 19, 2024, 7 pages.
Japanese Patent Application No. 2023-502767, Notice of Decision to Grant mailed on Feb. 3, 2026, 5 pages.
Japanese Patent Application No. 2023-502767, Office Action mailed on Aug. 5, 2025, 6 pages.
Japanese Patent Application No. 2023-502767, Office Action mailed on Feb. 18, 2025, 8 pages.
Japanese Patent Application No. 2023-502776, Notice of Decision to Grant mailed on Aug. 5, 2025, 8 pages.
Japanese Patent Application No. 2023-502776, Office Action mailed on Feb. 18, 2025, 9 pages.
Japanese Patent Application No. 2023-502784, Notice of Decision to Grant mailed on Aug. 26, 2025, 5 pages.
Japanese Patent Application No. 2023-502784, Office Action mailed on Feb. 4, 2025, 10 pages.
Japanese Patent Application No. 2023-540131, Office Action mailed on Sep. 16, 2025, 13 pages.
Japanese Patent Application No. 2023-540136, Office Action mailed on Nov. 4, 2025, 9 pages.
Japanese Patent Application No. 2023-540139, Office Action mailed on Nov. 18, 2025, 13 pages.
Japanese Patent Application No. 2023-540141, Office Action mailed on Nov. 11, 2025, 14 pages.
Japanese Patent Application No. 2023-540148, Office Action mailed on Sep. 30, 2025, 8 pages.
Chinese Application No. 202180088338.5, Office Action mailed on Apr. 13, 2026, 25 pages.
Chinese Application No. 202180088346.X, Office Action mailed on Apr. 3, 2026, 27 pages.
Chinese Application No. 202180088347.4, Office Action mailed on Mar. 19, 2026, 10 pages.
Chinese Application No. 202180088348.9, Office Action mailed on Mar. 26, 2026, 20 pages.
Chinese Application No. 202180088649.1, Office Action mailed on Mar. 27, 2026, 34 pages.
Indian Application No. 202347037039, First Examination Report mailed on May 19, 2026, 11 pages.

* cited by examiner

1900

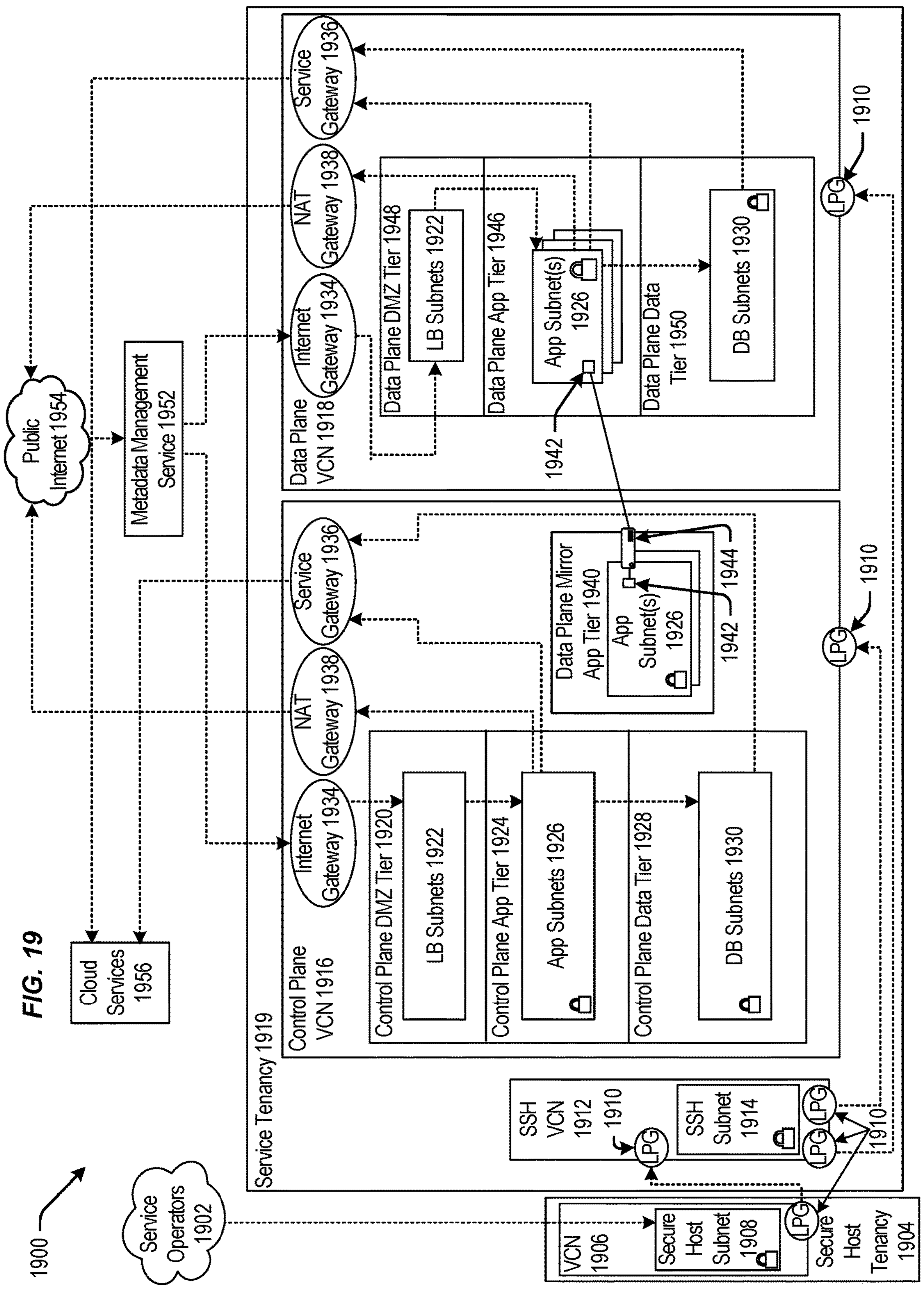

FIG. 19
Cloud Services 1956
Public Internet 1954
Metadata Management Service 1952
Service Operators 1902
Service Tenancy 1919
Control Plane VCN 1916
Internet Gateway 1934
NAT Gateway 1938
Service Gateway 1936
Control Plane DMZ Tier 1920
LB Subnets 1922
Control Plane App Tier 1924
App Subnets 1926
Control Plane Data Tier 1928
DB Subnets 1930
Data Plane Mirror App Tier 1940
App Subnet(s) 1926
1942
1944
Data Plane VCN 1918
Internet Gateway 1934
NAT Gateway 1938
Service Gateway 1936
Data Plane DMZ Tier 1948
LB Subnets 1922
Data Plane App Tier 1946
1942
App Subnet(s) 1926
Data Plane Data Tier 1950
DB Subnets 1930
VCN 1906
Secure Host Subnet 1908
LPG
Secure Host Tenancy 1904
SSH VCN 1912
1910
LPG
SSH Subnet 1914
LPG
LPG
1910
LPG
1910
LPG
1910

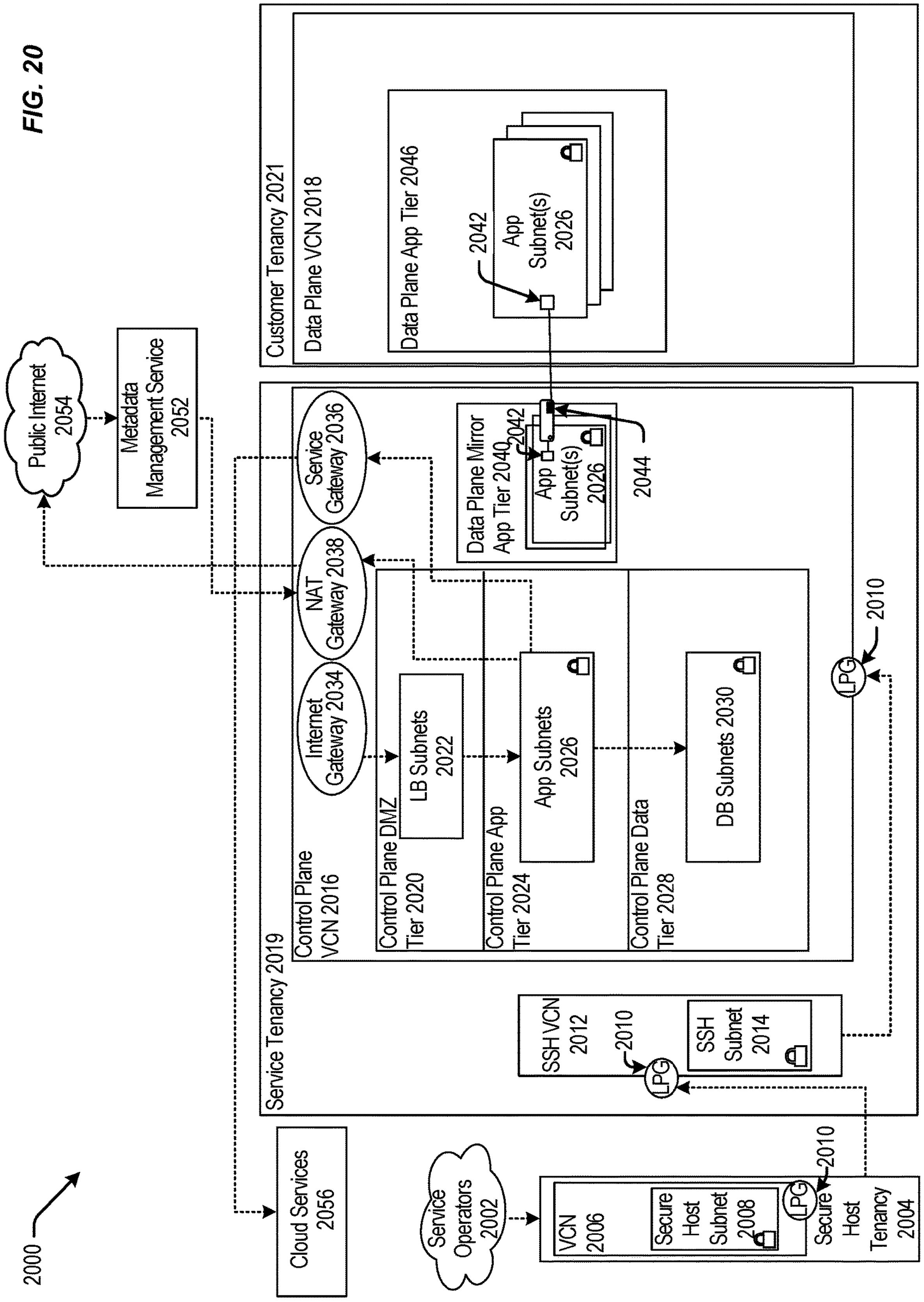

FIG. 20
2000
Public Internet 2054
Metadata Management Service 2052
Cloud Services 2056
Service Tenancy 2019
Control Plane VCN 2016
Internet Gateway 2034
NAT Gateway 2038
Service Gateway 2036
Control Plane DMZ Tier 2020
LB Subnets 2022
Control Plane App Tier 2024
App Subnets 2026
Control Plane Data Tier 2028
DB Subnets 2030
Data Plane Mirror App Tier 2040
2042
App Subnet(s) 2026
2044
Customer Tenancy 2021
Data Plane VCN 2018
Data Plane App Tier 2046
2042
App Subnet(s) 2026
Service Operators 2002
VCN 2006
Secure Host Subnet 2008
LPG
Secure Host Tenancy 2004
2010
SSH VCN 2012
2010
LPG
SSH Subnet 2014
LPG
2010

2100

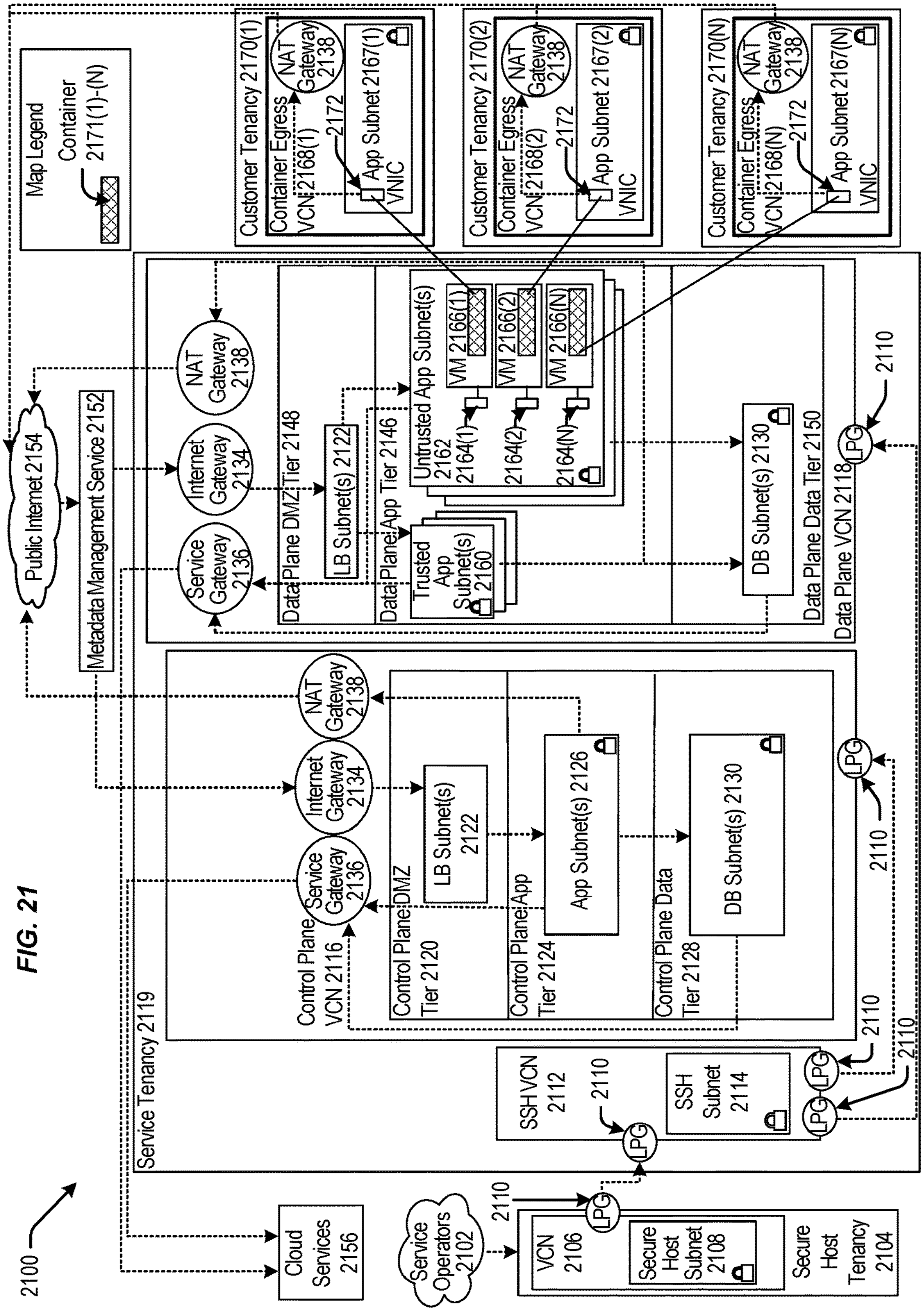

FIG. 21
Public Internet 2154
Metadata Management Service 2152
Map Legend
Container
2171(1)-(N)
Service Tenancy 2119
Cloud Services 2156
Service Operators 2102
VCN 2106
Secure Host Subnet 2108
Secure Host Tenancy 2104
LPG
2110
SSH VCN 2112
SSH Subnet 2114
Control Plane VCN 2116
Service Gateway 2136
Internet Gateway 2134
NAT Gateway 2138
Control Plane DMZ Tier 2120
LB Subnet(s) 2122
Control Plane App Tier 2124
App Subnet(s) 2126
Control Plane Data Tier 2128
DB Subnet(s) 2130
Data Plane DMZ Tier 2148
LB Subnet(s) 2122
Data Plane App Tier 2146
Trusted App Subnet(s) 2160
Untrusted App Subnet(s) 2162
2164(1)
2164(2)
2164(N)
VM 2166(1)
VM 2166(2)
VM 2166(N)
DB Subnet(s) 2130
Data Plane Data Tier 2150
Data Plane VCN 2118
Customer Tenancy 2170(1)
Container Egress VCN 2168(1)
NAT Gateway 2138
2172
App Subnet 2167(1)
VNIC
Customer Tenancy 2170(2)
Container Egress VCN 2168(2)
App Subnet 2167(2)
Customer Tenancy 2170(N)
Container Egress VCN 2168(N)
App Subnet 2167(N)

2200

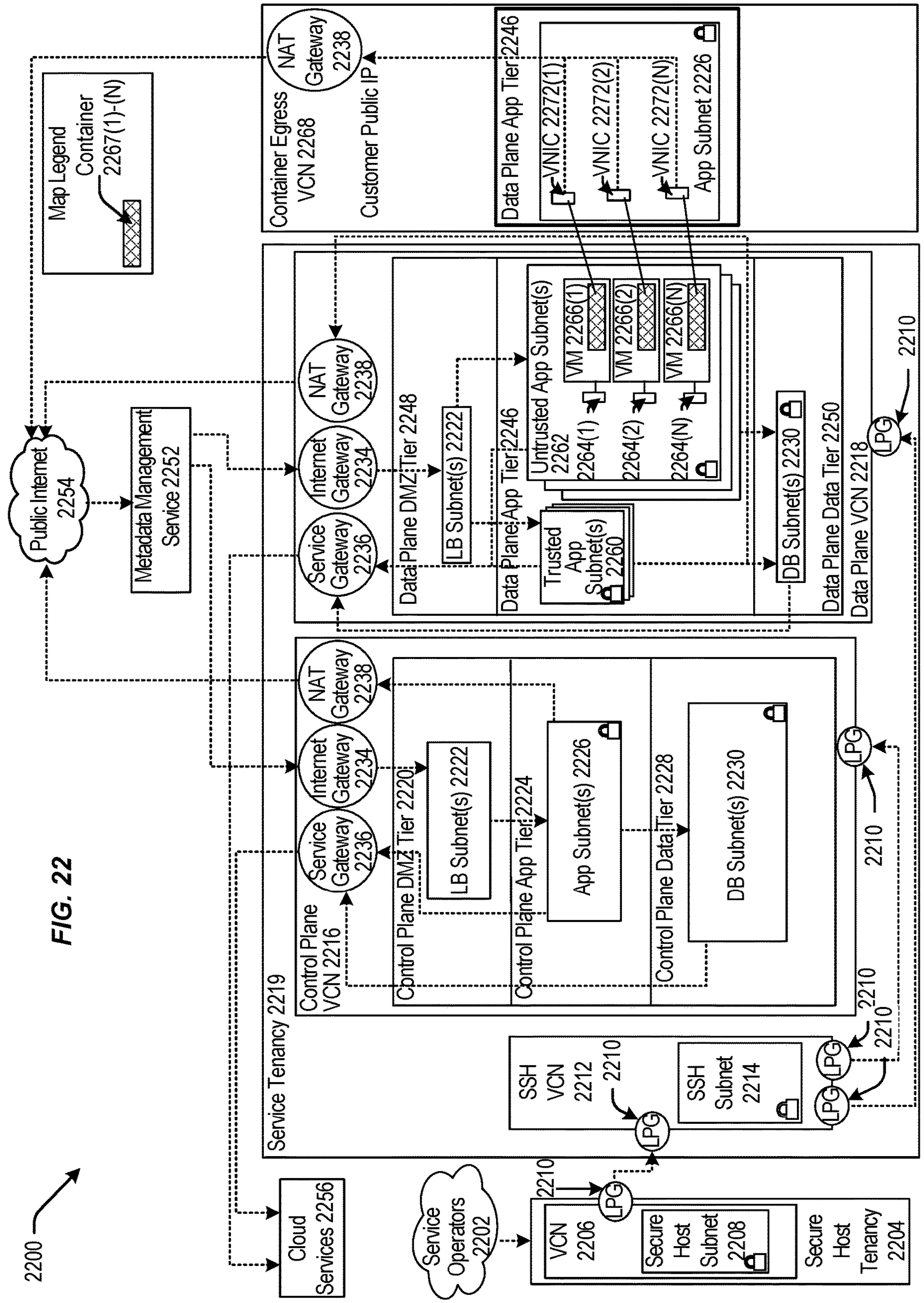

FIG. 22
Public Internet 2254
Map Legend
Container 2267(1)-(N)
Metadata Management Service 2252
Cloud Services 2256
Service Operators 2202
Service Tenancy 2219
Container Egress VCN 2268
NAT Gateway 2238
Customer Public IP
Data Plane App Tier 2246
VNIC 2272(1)
VNIC 2272(2)
VNIC 2272(N)
App Subnet 2226
Data Plane VCN 2218
Service Gateway 2236
Internet Gateway 2234
NAT Gateway 2238
Data Plane DMZ Tier 2248
LB Subnet(s) 2222
Data Plane App Tier 2246
Trusted App Subnet(s) 2260
Untrusted App Subnet(s) 2262
2264(1)
2264(2)
2264(N)
VM 2266(1)
VM 2266(2)
VM 2266(N)
DB Subnet(s) 2230
Data Plane Data Tier 2250
Control Plane VCN 2216
Service Gateway 2236
Internet Gateway 2234
NAT Gateway 2238
Control Plane DMZ Tier 2220
LB Subnet(s) 2222
Control Plane App Tier 2224
App Subnet(s) 2226
Control Plane Data Tier 2228
DB Subnet(s) 2230
SSH VCN 2212
SSH Subnet 2214
LPG
2210
VCN 2206
Secure Host Subnet 2208
Secure Host Tenancy 2204

LAYER-2 NETWORKING SPAN PORT IN A VIRTUALIZED CLOUD ENVIRONMENT

CROSS-REFERENCE TO RELATED APPLICATIONS

The present application claims the benefit of priority under 35 U.S.C. 119(e) and is a continuation of application Ser. No. 17/494,719 filed Oct. 5, 2021 entitled "LAYER-2 NETWORKING SPAN PORT IN A VIRTUALIZED CLOUD ENVIRONMENT", which claims benefit of priority to U.S. Application No. 63/132,377, filed on Dec. 30, 2020, entitled "LAYER-2 NETWORKING IN A VIRTUALIZED CLOUD ENVIRONMENT," the content of which is herein incorporated by reference in its entirety for all purposes.

BACKGROUND

Cloud computing provides on-demand availability of computing resources. Cloud computing can be based on data centers that are available to users over the internet. Cloud computing can provide Infrastructure as a Service (IaaS). A virtual network may be created for use by users. However, these virtual networks have limitations that limit their functionality and value. Accordingly, further improvements are desired.

BRIEF SUMMARY

The present disclosure relates to virtualized cloud environments. Techniques are described for providing Layer 2 networking functionality in a virtualized cloud environment. The Layer 2 functionality is provided in addition to and in conjunction with Layer 3 networking functionality provided by the virtualized cloud environment.

Some embodiments of the present disclosure relate to providing a Layer 2 virtual local area network (VLAN) in a private network to a customer, such as a virtual cloud network (VCN) of the customer. Different compute instances are connected in the Layer 2 VLAN. The customer is given the perception of an emulated single switch that connects the compute instances. In fact, this emulated switch is implemented as an infinitely scalable distributed switch that includes a collection of local switches. More specifically, each compute instance executes on a host machine connected to a network virtualization device (NVD). For each compute instance on a host connected to an NVD, the NVD hosts a Layer 2 virtual network interface card (VNIC) and a local switch associated with the compute instance. The Layer 2 VNIC represents a port of the compute instance on the Layer 2 VLAN. The local switch connects the VNIC to other VNICs (e.g., other ports) associated with other compute instances of the Layer 2 VLAN. Various Layer 2 network services are supported including, for instance, span port functionalities.

Various embodiments are described herein, including methods, systems, non-transitory computer-readable storage media storing programs, code, or instructions executable by one or more processors, and the like.

BRIEF DESCRIPTION OF THE DRAWINGS

FIG. 19 is a block diagram illustrating one pattern for implementing a cloud infrastructure as a service system, according to at least one embodiment.

FIG. 20 is a block diagram illustrating another pattern for implementing a cloud infrastructure as a service system, according to at least one embodiment.

FIG. 21 is a block diagram illustrating another pattern for implementing a cloud infrastructure as a service system, according to at least one embodiment.

FIG. 22 is a block diagram illustrating another pattern for implementing a cloud infrastructure as a service system, according to at least one embodiment.

DETAILED DESCRIPTION

Figure 1:
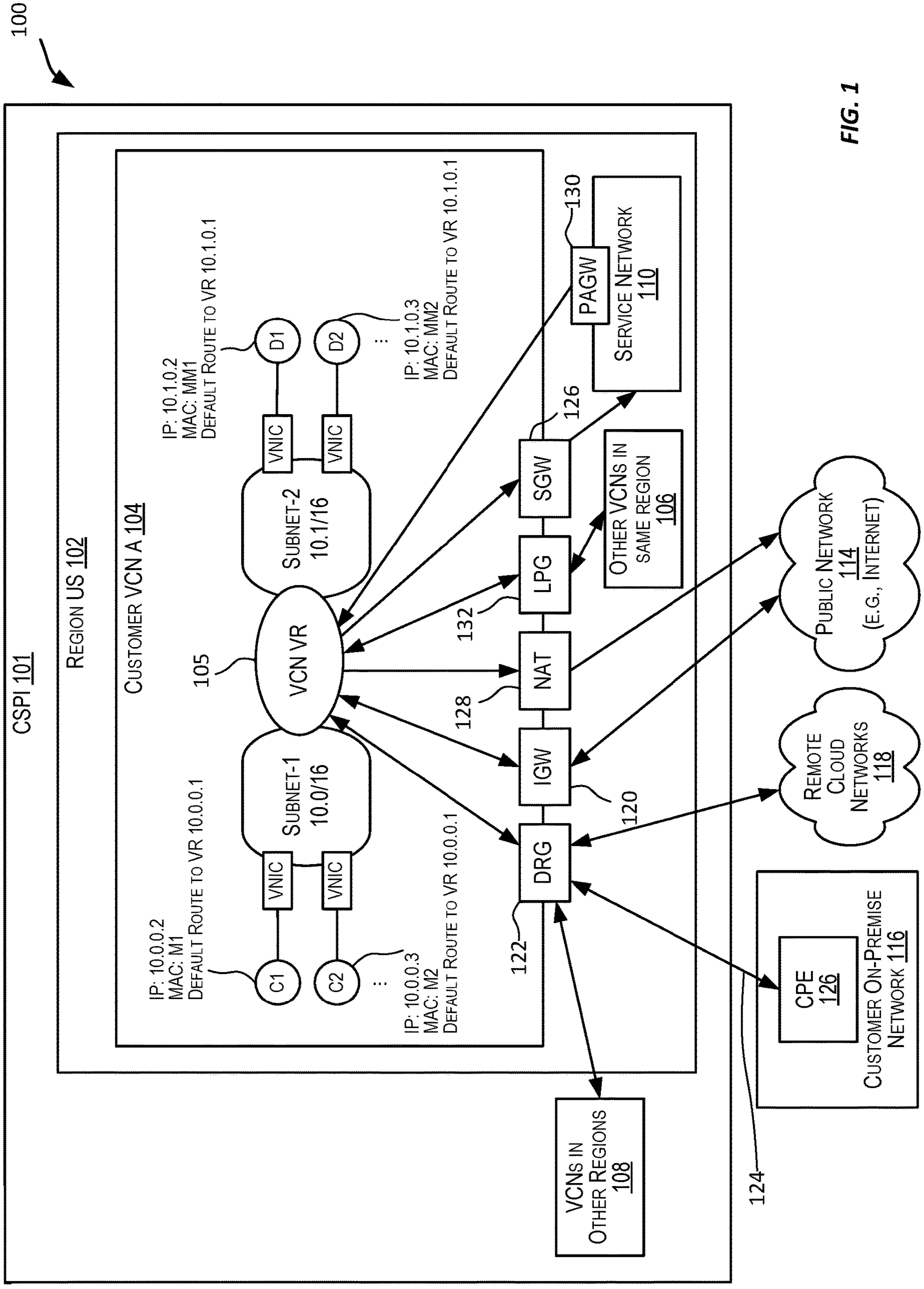
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary"

is used herein to mean "serving as an example, instance, or illustration." Any embodiment or design described herein as "exemplary" is not necessarily to be construed as preferred or advantageous over other embodiments or designs.

A—Example Virtual Networking Architectures

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant.

In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general, a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 17, 18, 19, and 20 (see references 1716, 1816, 1916, and 2016) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 17, 18, 19, and 21, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 17, 18, 19, and 20 (for example, gateways referenced by reference numbers 1734, 1736, 1738, 1834, 1836, 1838, 1934, 1936, 1938, 2034, 2036, and 2038) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 1120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. APE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
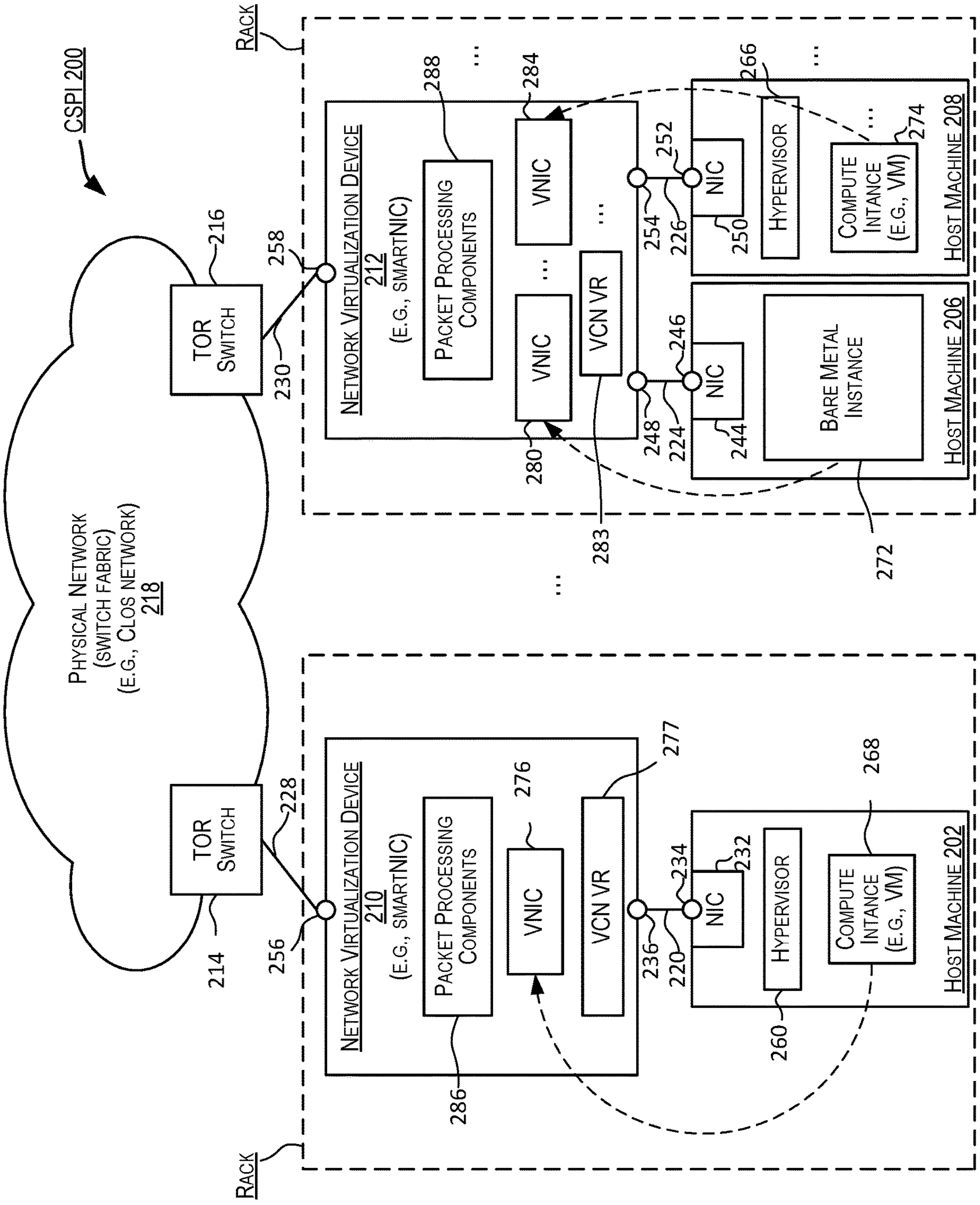
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
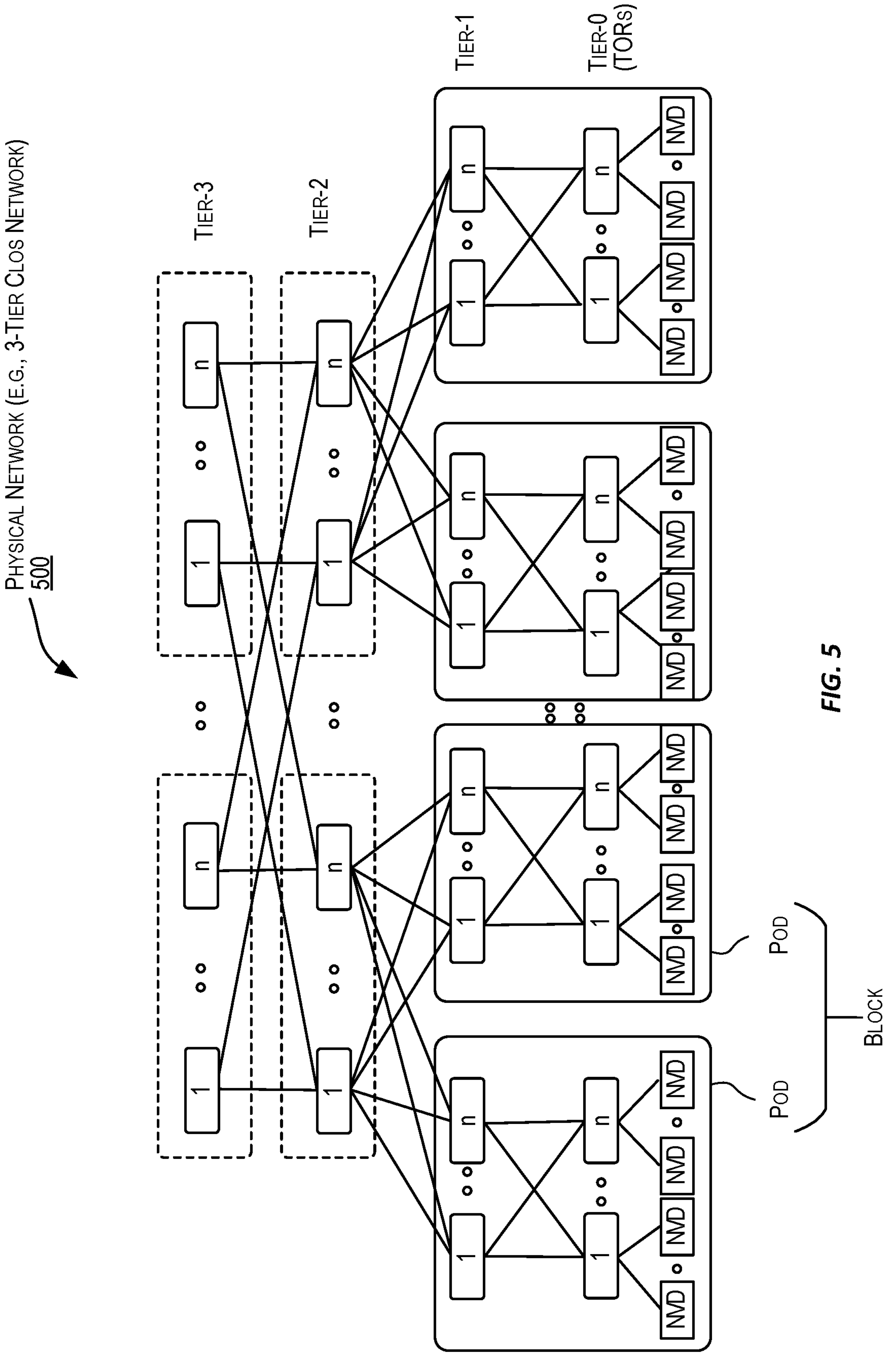
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
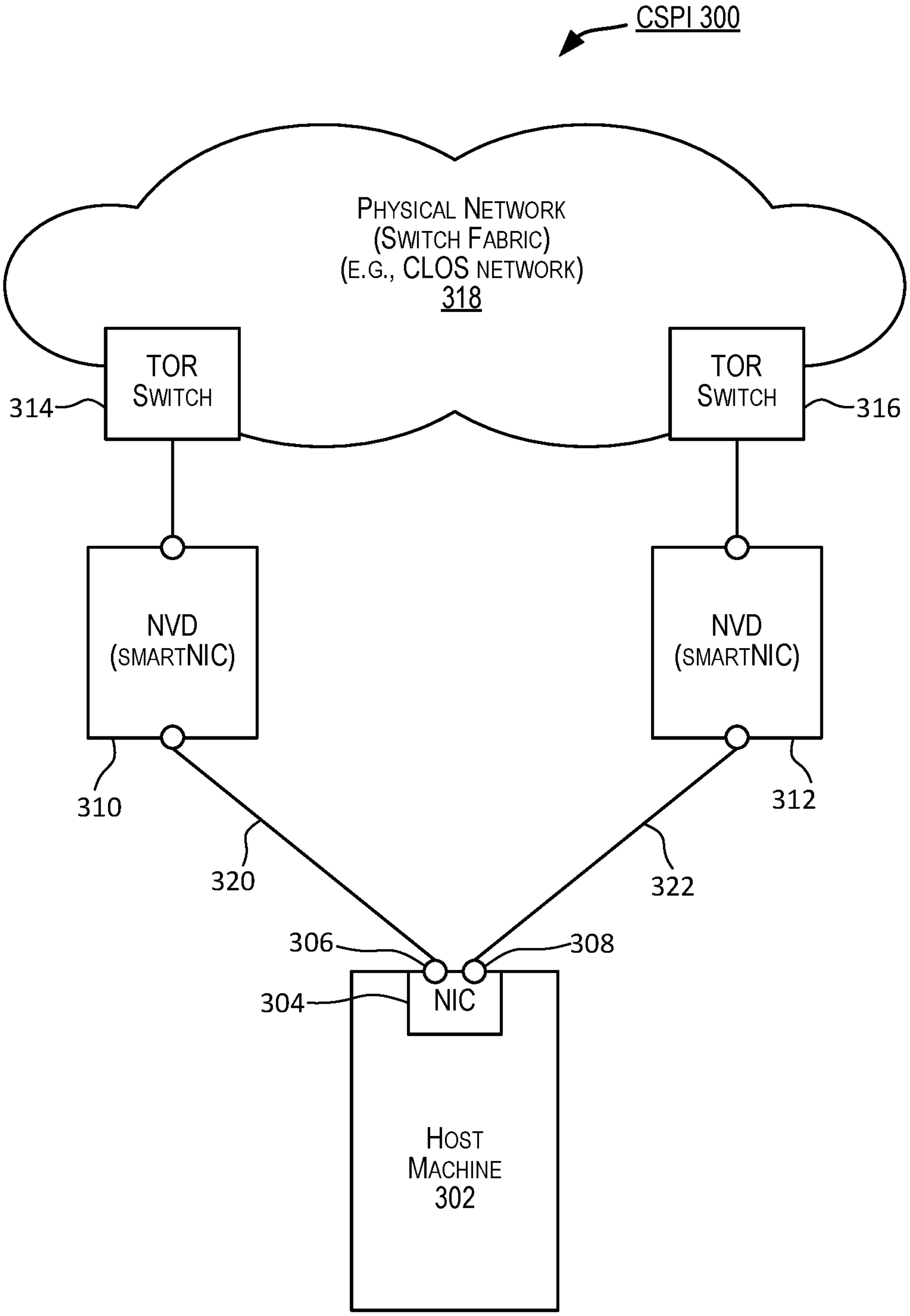
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 17, 18, 19, and 20 (see references 1716, 1816, 1916, and 2016) and described below. Examples of a VCN Data Plane are depicted in FIGS. 17, 18, 19, and 20 (see references 1718, 1818, 1918, and 2018) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
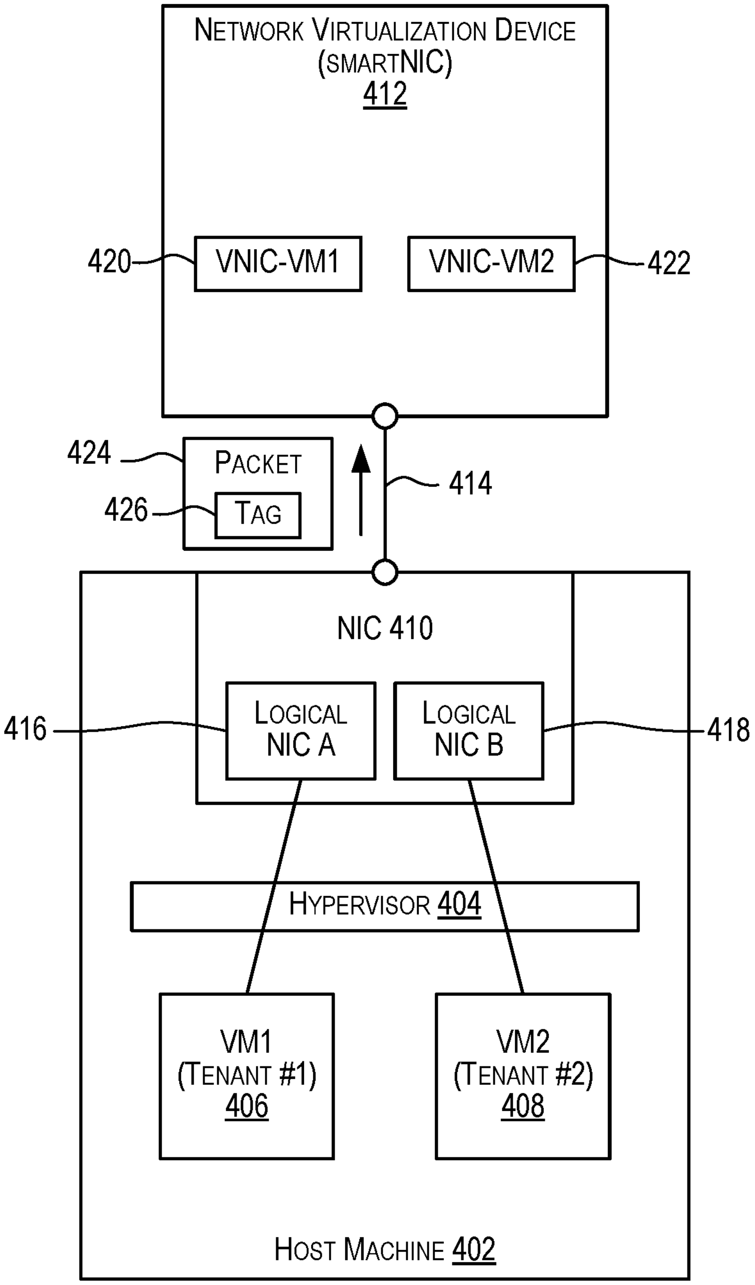
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0 switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

B—Example Layer 2 VLAN Architectures

This section describes techniques for providing Layer 2 networking functionality in a virtualized cloud environment. The Layer 2 functionality is provided in addition to and in conjunction with Layer 3 networking functionality provided by the virtualized cloud environment. In certain embodiments, the virtual Layer 2 and Layer 3 functionality is provided by Oracle Cloud Infrastructure (OCI) provided Oracle Corporation.

After an introduction of the Layer 2 network functionalities, the section describes the Layer 2 implementation of a VLAN. Thereafter, a description of Layer 2 VLAN services is provided, including span port functionalities.

Introduction

The number of enterprise customers transitioning their on-premise applications to a cloud environment provided by a cloud services provider (CSP) continues to increase rapidly. However, many of these customers are quickly realizing that the road to transitioning to a cloud environment can be quite bumpy requiring the customers to rearchitect and reengineer their existing applications to make them workable in the cloud environment. This is because applications written for an on-premise environment often depend on features of the physical network for monitoring, availability, and scale. These on-premise applications thus need to be rearchitected and reengineered before they can work in a cloud environment.

There are several reasons why on-premise applications cannot easily transition to the cloud environment. One of the main reasons is that current cloud virtual networks operate at the Layer-3 of the OSI model, for example at the IP layer, and do not provide Layer-2 capabilities, which are needed by the application. Layer-3-based routing or forwarding includes determining where a packet is to be sent (e.g., to which customer instance) based upon information contained in the Layer-3 header of the packet, for example, based upon the destination IP address contained in the Layer-3 header of the packet. To facilitate this, the location of IP addresses in the virtualized cloud network are determined through a centralized control and orchestration system or controller. These may include, for example, IP addresses associated with customer entities or resources in the virtualized cloud environment.

Many customers run applications in their on-premise environments that have strict requirements for Layer-2 networking capabilities which currently are not addressed by current cloud offerings and IaaS service providers. For example, traffic is current cloud offerings is routed using Layer-3 protocols that use Layer-3 headers, and Layer-2 features needed by the applications are not supported. These Layer-2 features may include features such as Address Resolution Protocol (ARP) processing, Medium Access Controls (MAC) address learning, and Layer-2 broadcast capabilities, Layer-2 (MAC based) forwarding, Layer-2 networking constructs, and others. By providing virtualized Layer-2 networking functionality in the virtualized cloud network, as described in this disclosure, customers can now migrate their legacy applications seamlessly to the cloud environment without requiring any substantial rearchitecting or reengineering. For example, the virtualized Layer-2 networking capabilities described herein enable such applications (e.g., VMware vSphere, vCenter, vSAN and NSX-T components) to communicate at Layer-2 as they do in the on-premise environment. These applications are able to run the same versions and configurations in the public cloud, thereby enabling customers to use their legacy on-premise applications including existing knowledge, tools, and processes associated with the legacy applications. Customers are also be able to access native cloud services from their applications (e.g., using VMware Software Defined Data Center (SDDC)).

As another example, there are several legacy on-premise applications (e.g., enterprise clustering software applications, network virtual appliances) that require Layer-2 broadcast support for failover. Example applications include Fortinet FortiGate, IBM QRadar, Palo Alto firewalls, Cisco ASA, Juniper SRX, and Oracle RAC (Real Application Clustering). By providing virtualized Layer-2 networking in the virtualized public cloud as described in this disclosure, these appliances are now able to run in a virtualized public cloud environment unaltered. AS described herein, virtualized Layer-2 networking functionality is provided that is comparable to on-premise. The virtualized Layer-2 networking functionality described in this disclosure supports traditional Layer-2 networking. This includes support of customer-defined VLANs as well as unicast, broadcast, and multicast Layer-2 traffic functions. Layer-2 based routing and forwarding of packets comprises using Layer-2 protocols and using information contained in the Layer-2 header of a packet, for example, based upon the destination MAC address contained in the Layer-2 header to route or forward the packet. Protocols used by enterprise applications (e.g., clustering software applications) such as ARP, Gratuitous Address Resolution Protocol (GARP), and Reverse Address Resolution Protocol (RARP) can also now work in the cloud environment.

There are several reasons why traditional virtualized cloud infrastructures support virtualized Layer-3 networking and not Layer-2 networking. Layer-2 networks typically do not scale as well as Layer-3 networks. Layer-2 network control protocols do not have the level of sophistication that is desired for scaling. For example, Layer-3 networks do not have to worry about packet looping that Layer-2 networks have to tackle. IP packets (i.e., Layer-3 packets) have the notion of a time to live (TTL), while Layer-2 packets do not. IP addresses, contained inside of Layer-3 packets, have a concept of topology, such as subnets, CIDR ranges, etc., while Layer-2 addresses (e.g., MAC addresses) do not. Layer-3 IP networks have inbuilt tools that facilitate troubleshooting, such as ping, traceroute, etc. for finding path information. Such tools are not available for Layer-2. Layer-3 networks support multi-pathing, which is not available at Layer-2. Because of the lack of sophisticated control protocols (e.g. Border Gateway Protocol (BGP) and Open Shortest Path First (OSPF)) especially for exchanging information between entities in a network, Layer-2 networks have to rely on broadcasting and multicasting in order to learn about the network, which can adversely impact network performance. As networks change, the learning process for Layer-2 has to be repeated, which is not needed at Layer-3. For these reasons and others, it is more desirable for cloud IaaS service providers to provide infrastructures that operate at Layer-3 rather than at Layer-2.

However, in spite of its multiple shortcomings, Layer-2 functionality is needed by many on-premise applications. For example, assume a virtualized cloud configuration where a customer (Customer 1) has two instances instance A with IP1 and instance B with IP2, in a virtual network "V" where an instance may be a compute instance (e.g. bare metal, virtual machine or container) or a service instance such as a load balancer, nfs mount point, or other service instance. The virtual network V is a distinct address space isolated from other virtual networks and the underlying physical network. For example, this isolation may be achieved using various techniques including packet encapsulation or NAT. For this reason the IP address for an instance in a customer's virtual network is distinct from an address in the physical network where it is hosted. A centralized SDN (Software Defined Networking) control plane is provided that knows the physical IP and virtual interfaces of all virtual IP addresses. When a packet is sent from instance A to a destination of IP2 in the virtual network V, the virtual network SDN stack needs to know where IP2 is located. It has to know this ahead of time so that it can send the packet to the IP in the physical network where virtual IP address IP2 for V is hosted. The location of a virtual IP address can be modified in the cloud thus changing the relationship between a physical IP and virtual IP address. Whenever a virtual IP address is to be moved (e.g., an IP address associated with a virtual machine is to be moved to another virtual machine or a virtual machine is migrated to a new physical host), an API call has to be made to the SDN control plane letting the controller know that the IP is being moved so that it can update all participants in the SDN stack including packet processors (data planes). There are classes of applications however that do not make such API calls. Examples include various on-premise applications, applications provided by various virtualization software vendors such as VMware, and others. The value of facilitating a virtual Layer-2 network in a virtualized cloud environment enables support for such applications that are not programmed to make such API calls or applications that rely on other Layer-2 networking features, such as support for non-IP Layer-3 and MAC learning.

A virtual Layer-2 network creates a broadcast domain wherein learning is performed by members of the broadcast domain. In a virtual Layer-2 domain, there can be any IP on any MAC on any host within this Layer-2 domain and the system will learn using standard Layer-2 networking protocols and the system will virtualize these networking primitives, without having to be explicitly told by a centralized controller as to where MACs and IPs live in that virtual Layer-2 network. This enables applications to be run that need low latency failover, applications that need to support broadcast or multicast protocols to multiple nodes, and legacy applications that do not know how to make API calls to a SDN control plane or to an API endpoint to determine where IP and MAC addresses live. Providing Layer-2 networking capabilities in the virtualized cloud environment is thus needed to be able to support functionality that is not available at the IP Layer-3 level.

Another technical advantage of providing virtual Layer-2 in a virtualized cloud environment is that it enables various different Layer-3 protocols (such as IPV4, IPV6) to be supported, including non-IP protocols. For example, various non-IP protocols can be supported, such as IPX, AppleTalk, and others. Because existing cloud IaaS providers do not provide Layer-2 functionality in their virtualized cloud networks, they cannot support these non-IP protocols. By providing Layer-2 networking functionality as described in this disclosure, support can be provided for protocols at Layer-3 and for applications that need and rely on the availability of Layer-2 level functionality.

Using the techniques described in this disclosure, both Layer-3 and Layer-2 functionality is provided in the virtualized cloud infrastructure. As previously described, Layer-3 based networking provides certain efficiencies, especially well-suited for scaling, that are not provided by Layer-2 networking. Providing Layer-2 functionality in addition to Layer-3 functionality allows such efficiencies provided by Layer-3 to be leveraged (e.g., to provide more scalable solutions) while providing Layer-2 functionality in a more scalable way. For example, virtualized Layer-3 avoids having to use broadcasting for learning purposes. By offering Layer-3 for its efficiencies, and at the same time offering a virtualized Layer-2 for enabling those applications that need it and applications that are not be able to function without having Layer-2 functionality, and for supporting non-IP protocols, etc., complete flexibility in the virtualized cloud environment is offered to customers.

Customers themselves have hybrid environments in which Layer-2 environments exist along with Layer-3 environments, and the virtualized cloud environment can now support both these environments. A customer can have Layer-3 networks such as subnets, and/or Layer-2 networks such as VLANs, and these two environments can talk to each other in the virtualized cloud environment.

The virtualized cloud environment also needs to support multitenancy. Multi-tenancy makes the provisioning of both Layer-3 functionality and Layer-2 functionality in the same virtualized cloud environment technically difficult and complicated. For example, the Layer-2 broadcast domain must be managed across many different customers in the cloud provider's infrastructure. The embodiments describe in this disclosure overcome these technical issues.

For a virtualization provider (e.g. VMware), a virtualized Layer-2 network that emulates a physical Layer-2 network allows workloads to be run unaltered. Applications provided by such a virtualization provider can then run on the virtualized Layer-2 network provided by the cloud infrastructure. For example, such applications may comprise a set of instances that need to run on a Layer-2 network. When a customer wants to lift and shift such an application from their on-premise environment to a virtualized cloud environment, they cannot just take the application and run it in the cloud because those applications rely on an underlying Layer-2 network (e.g., the Layer-2 network features are used to perform migration of virtual machines, or to move where MAC and IP addresses live), which is not provided by current virtualized cloud providers. For these reasons, such applications cannot run natively in a virtualized cloud environment. Using the techniques described herein, a cloud provider, in addition to providing a virtualized Layer-3 network, also provides a virtualized Layer-2 network. Now, such application stacks can run in the cloud environment unaltered and can run a nested virtualization in the cloud environment. Customers can now run their own Layer-2 applications in the cloud and manage them. Application providers do not have to make any changes to their software to facilitate this. Such legacy applications or workloads (e.g., legacy load balancers, legacy applications, KVMs, Openstack, clustering software) can now be run in the virtualized cloud environment unaltered.

By offering virtualized Layer-2 functionality as described herein, various Layer-3 protocols, including non-IP protocols, can be now be supported by the virtualized cloud environment. Taking Ethernet as an example, various different EtherTypes (a field in the Layer-2 header that tells what type of Layer-3 packet is being sent; tells what protocol to expect at Layer-3) can be supported, including various non-IP protocols. EtherType is a two-octet field in an Ethernet frame. It is used to indicate which protocol is encapsulated in the payload of the frame and is used at the receiving end by the data link layer to determine how the payload is processed. The EtherType is also used as the basis of 802.1Q VLAN tagging, encapsulating packets from VLANs for transmission multiplexed with other VLAN traffic over an Ethernet trunk. Examples of EtherTypes include IPV4, IPv6, Address Resolution Protocol (ARP), AppleTalk, IPX, and others. A cloud network that supports Layer-2 protocols can support any protocol at the Layer-3 layer. In a similar manner, when the cloud infrastructure provides support for a Layer-3 protocol, it can support various protocols at Layer-4 such as TCP, UDP, ICMP, and others. The network can be agnostic to the Layer-4 protocols when virtualization is provided at Layer-3. Similarly, the network can be agnostic to Layer-3 protocols when virtualization is provided at Layer-2. This technology can be extended to support any Layer-2 network type, including FDDI, Infiniband, etc.

Accordingly, many applications written for physical networks, especially ones that work with clusters of computer nodes that share a broadcast domain use Layer-2 features that are not supported by in an L3 virtual network. The following six examples highlight the complications that can result from not providing Layer-2 networking capabilities:

(1) Assignment of MACs and IPs without a preceding API call. Network appliances and Hypervisors (such as VMware) were not built for cloud virtual networks. They assume they are able to use a MAC so long as it is unique and either get a dynamic address from a DHCP server or use any IP that was assigned to the cluster. There is often no mechanism by which they can be configured to inform the control-plane about the assignment of these Layer-2 and Layer-3 addresses. If where the MACs and IPs are is not known, the Layer-3 virtual network does not know where to send the traffic.

(2) Low latency reassignment of MACs and IPs for high-availability and live migration. Many on-premises applications use ARP to reassign IPs and MACs for high availability—when an instance in a cluster or HA pair stops responding, the newly active instance will send a Gratuitous ARP (GARP) to reassign a service IP to its MAC or a Reverse ARP (RARP) to reassign a service MAC to its interface. This is also important when live-migrating an instance on a hypervisor: the new host must send a RARP when the guest has migrated so that guest traffic is sent to the new host. Not only is the assignment done without an API call, but it also needs to be extremely low latency (sub-millisecond). This cannot be accomplished with HTTPS calls to a REST endpoint.

(3) Interface multiplexing by MAC address. When hypervisors host multiple virtual machines on a single host, all of which are on the same network, guest interfaces are differentiated by their MAC. This requires support for multiple MACs on the same virtual interface.

(4) VLAN Support. A single physical virtual machine Host will need to be on multiple broadcast domains as indicated by the use of a VLAN tag. For example, VMware ESX uses VLANs for traffic separation (e.g. guest virtual machines may communicate on one VLAN, storage on another, and host virtual machines on yet another).

(5) Use of broadcast and multicast traffic. ARP requires L2 broadcast, and there are examples of on-premises applications using broadcast and multicast traffic for cluster and HA applications.

(6) Support for Non-IP traffic. Since the L3 network requires the IPv4 or IPv6 header to communicate, use of any L3 protocol other than IP will not work. L2 virtualization means that the network within the VLAN can be L3 protocol agnostic—the L3 header could by IPv4, IPv6, IPX, or anything else—even absent all together.

Layer 2 VLAN Implementation

As disclosed herein, a Layer 2 (L2) network can be created within a cloud network. This virtual L2 network includes one or several Layer 2 virtual networks, such as virtualized L2 VLANs which are referred to herein as VLANs. Each VLAN can include a plurality of compute instances, each of which can be associated with at least one L2 virtual network interface (e.g., a L2 VNIC) and an L2 virtual switch. In some embodiments, each pair of L2 virtual network interface and L2 virtual switch is hosted on an NVD. An NVD may host multiple of such pairs, where each pair is associated with a different compute instance. The collection of L2 virtual switches represent an emulated single L2 switch of the VLAN. The L2 virtual network interfaces represent a collection of L2 ports on the emulated single L2 switch. The VLAN can be connected, via a VLAN Switching and Routing Service (VSRS), also referred to herein as, a Real Virtual Router (RVR) or as an L2 VSRS, to other VLANs, Layer 3 (L3) networks, on-premise networks, and/or other networks. An example of this architecture is described herein below.

Figure 6:
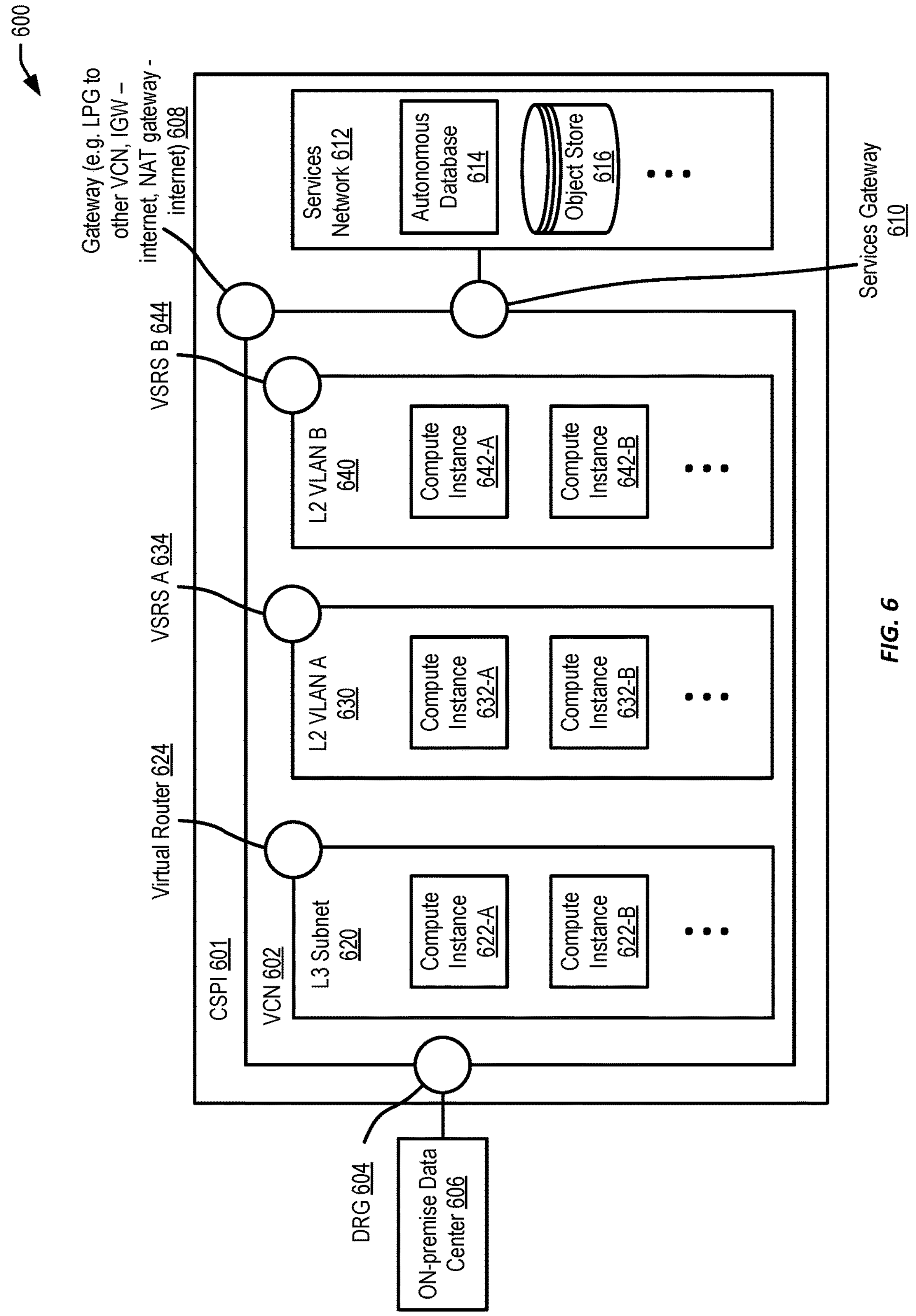
FIG. 6 is a schematic illustration of a computing network according to certain embodiments.

With reference now to FIG. 6, a schematic illustration of one embodiment of a computing network is shown. A VCN 602 resides in a CSPI 601. The VCN 602 includes a plurality gateways connecting the VCN 602 to other networks. These gateways include a DRG 604 which can connect the VCN 602 to, for example, an on-premise network such as on-premise data center 606. The gateways can further include a gateway 600, which can include, for example, a LPG for connecting the VCN 602 with another VCN, and/or an IGW and/or NAT gateway for connecting the VCN 602 to the internet. The gateways of the VCN 602 can further include a services gateway 610 which can connect the VCN 602 with a services network 612. The services network 612 can include one or several databases and/or stores including, for example, autonomous database 614 and/or object store 616. The services network can comprise a conceptual network comprising an aggregation of IP ranges, which can be, for example, public IP ranges. In some embodiments, these IP ranges can cover some or all of the public services offered by the CSPI 601 provider. These services can, for example, be accessed through an Internet Gateway or NAT Gateway. In some embodiments, the services network provides a way for the services in the services network to be accessed from the local region through a dedicated gateway for that purpose (a Service Gateway). In some embodiments, the backends of these services can be implemented in, for example, their own private networks. In some embodiments, the services network 612 can include further additional databases.

The VCN 602 can include a plurality of virtual networks. These networks can, each include one or several compute instances which can communicate within their respective networks, between networks, or outside of the VCN 602. One of the virtual networks of the VCN 602 is an L3 subnet 620. The L3 subnet 620 is a unit of configuration or a subdivision created within the VCN 602. The subnet 620 can comprise a virtual Layer 3 network in the virtualized cloud environment of the VCN 602, which VCN 602 is hosted on the underlying physical network of CPSI 601. Although FIG. 6 depicts a single subnet 620, the VCN 602 can have one or multiple subnets. Each subnet within the VCN 602 can be associated with a contiguous range of overlay IP addresses (e.g., 10.0.0.0/24 and 10.0.1.0/24) that do not overlap with other subnets in that VCN and which represent an address space subset within the address space of the VCN. In some embodiments, this IP address space can be isolated from an address space associated with CPSI 601.

The subnet 620 includes one or more compute instances, and specifically includes a first compute instance 622-A and a second compute instance 622-B. The compute instances 622-A, 622-B can communicate with each other within the subnet 620, or they can communicate with other instances, devices, and/or networks outside of the subnet 620. Communication outside of the subnet 620 is enabled by a virtual router (VR) 624. The VR 624 enables communications between the subnet 620 and other networks of the VCN 602. For the subnet 620, the VR 624 represents a logical gateway that enables the subnet 620 (e.g., the compute instances 622-A, 622-B) to communicate with endpoints on other networks within the VCN 602, and with other endpoints outside the VCN 602.

The VCN 602 can further include additional networks, and specifically can include one or several L2 VLANs (referred to herein as VLANs), which are examples of a virtual L2 network. These one or several VLANs can each comprise a virtual Layer 2 network that is localized in the cloud environment of the VCN 602 and/or that is hosted by the underlying physical network of the CPSI 601. In the embodiment of FIG. 6, the VCN 602 includes a VLAN A 630 and a VLAN B 640. Each VLAN 630, 640 within the VCN 602 can be associated with a contiguous range of overlay IP addresses (e.g., 10.0.0.0/24 and 10.0.1.0/24) that do not overlap with other networks in that VCN, such as other subnets or VLANs in that VCN, and which represent an address space subset within the address space of the VCN. In some embodiments, this IP address space of the VLAN can be isolated from an address space associated with CPSI 601. Each of the VLANs 630, 640 can include one or several compute instances, and specifically, the VLAN A 630 can include, for example, a first compute instance 632-A, and a second compute instance 632-B. In some embodiments the VLAN A 630 can include additional compute instances. The VLAN B 640 can include, for example, a first compute instance 642-A, and a second compute instance 642-B. Each of the compute instances 632-A, 632-B, 642-A, 642-B can have an IP address and a MAC address. These addresses can be assigned or generated in any desired manner. In some embodiments, these addresses can be within a CIDR of the VLAN of the compute instances, and in some embodiments, these addresses can be any addresses. In embodiments in which compute instances of a VLAN communicate with endpoints outside of the VLAN, then one or both of these addresses are from the VLAN CIDR, whereas when all communications are intra-VLAN, then these addresses are not limited to addresses within the VLAN CIDR. In contrast to a network in which addresses are assigned by a control plane, the IP and/or MAC addresses of the compute instances in the VLAN can be assigned by the user/customer of that VLAN, and these IP and/or MAC addresses can then be discovered and/or learned by the compute instances in the VLAN according to the processes for learning discussed below.

Each of the VLANs can include a VLAN Switching and Routing Service (VSRS), and specifically, the VLAN A 630 includes a VSRS A 634 and the VLAN B 640 includes a VSRS B 644. Each VSRS 634, 644 participates in Layer 2 switching and local learning within a VLAN and also performs all necessary Layer 3 network functions including ARP, NDP, and routing. VSRS performs ARP (which is a Layer 2 protocol) as the VSRS has to map IPs to MACs.

In these cloud-based VLANs, each virtual interface or virtual gateway can be associated with one or more media access control (MAC) addresses, which can be virtual MAC addresses. Within the VLAN, the one or several compute instances 632-A, 632-B, 642-A, 642-B, which can be, for example bare metal, VM, or container, and/or one or several service instances, can directly communicate with each other via a virtual switch. Communication outside of the VLAN, such as with other VLANs or with an L3 network is enabled via the VSRS 634, 644. The VSRS 634, 644 is a distributed service providing the Layer 3 functions, such as IP routing, for a VLAN network. In some embodiments, the VSRS 634, 644 is a horizontally scalable, highly available routing service that can sit at the intersection of IP networks and L2 networks and participate in IP routing and L2 learning within a cloud-based L2 domain.

The VSRS 634, 644 can be distributed across multiple nodes within the infrastructure, and the VSRS 634, 644 function can be scalable, and specifically can be horizontally scalable. In some embodiments, each of the nodes implementing the function of the VSRS 634, 644 share and replicate the function of a router and/or a switch with each other. Further, these nodes can present themselves as a single VSRS 634, 644 to all of the instances in the VLAN 630, 640. The VSRS 634, 644 can be implemented on any virtualization device within the CSPI 601, and specifically within the virtual network. Thus, in some embodiments, the VSRS 634, 644 can be implemented on any of the virtual network virtualization devices including NICs, SmartNICs, switches, Smart switches or general compute hosts.

The VSRS 634, 644 can be a service residing on one or several hardware nodes, such as one or several servers, such as for example, one or several x86 servers, or one or several networking devices, such as one or several NICs and specifically one or several SmartNICs, supporting the cloud network. In some embodiments, the VSRS 634, 644 can be implemented on a server fleet. Thus, the VSRS 634, 644 can be a service distributed across a fleet of nodes, which may be a centrally managed fleet or may be distributed to the edges, of virtual networking enforcers that participates in and shares L2 and L3 learning along with evaluating routing and security policies. In some embodiments each of the VSRS instances can update other VSRS instances with new mapping information as this new mapping information is learned by a VSRS instance. For example, when a VSRS instance learns IP, interface, and/or MAC mapping for one or several CIs in its VLAN, the VSRS instance can provide that updated information to other VSRS instances within the VCN. Via this cross-updating, a VSRS instance associated with a first VLAN can know the mappings, including IP, interface, and/or MAC mappings for CIs in other VLANs, in some embodiments, for CIs in other VLANs within the VCN 602. When the VSRS resides on a server fleet and/or is distributed across a fleet of nodes, these updates can be greatly expedited.

In some embodiments, the VSRS 634, 644 may also host one or several higher level services necessary for networking including, but not limited to: a DHCP relay; a DHCP (hosting); a DHCPv6; a neighbor discovery protocol such as IPv6 Neighbor Discovery Protocol; DNS; a hosting DNSv6; a SLAAC for IPv6; a NTP; a metadata service; and a blockstore mount points. In some embodiments, the VSRS can support one or several Network Address Translation (NAT) functions to translate between network address spaces. In some embodiments, the VSRS can incorporate anti-spoofing, anti-MAC spoofing, ARP-cache poisoning protection for IPv4, IPv6 Route Advertisement (RA) guarding, DHCP guarding, packet filtering using Access Control Lists (ACLs); and/or reverse path forwarding checks. The VSRS can implement functions including, for example, ARP, GARP, Packet Filters (ACLs), DHCP relay, and/or IP routing protocols. The VSRS 634, 644 can, for example, learn MAC addresses, invalidate expired MAC addresses, handle moves of MAC addresses, vet MAC address information, handling flooding of MAC information, handling of storm control, loop prevention, Layer 2 multicast via, for example, protocols such as IGNIP in the cloud, statistic gathering including logs, statistics using SNMP, monitoring, and/or gathering and using statistics for broadcast, total traffic, bits, spanning tree packets, or the like.

Within the virtual network, the VSRS 634, 644 can manifest as different instantiations. In some embodiments, each of these instantiations of the VSRS can be associated with a VLAN 630, 640, and in some embodiments each VLAN 630, 640 can have an instantiation of the VSRS 634, 644. In some embodiments, each instantiation of the VSRS 634, 644 can have one or several unique tables corresponding to the VLAN 630, 640 with which the instantiation of the VSRS 634, 644 is associated. Each instantiation of the VSRS 634, 644 can generate and/or curate the unique tables associated with that instantiation of the VSRS 634, 644. Thus, while a single service may provide VSRS 634, 644 functionality for one or several cloud networks, individual instantiations of the VSRS 634, 644 within the cloud network can have unique Layer 2 and Layer 3 forwarding tables, while multiple such customer networks can have over-lapping Layer 2 and Layer 3 forwarding tables.

In some embodiments, the VSRS 634, 644 can support conflicting VLAN and IP spaces across multiple tenants. This can include having multiple tenants on the same VSRS 634, 644. In some embodiments, some or all of these tenants could choose to use some or all of: the same IP address space, the same MAC space, and the same VLAN space. This can provide extreme flexibility for users in choosing addresses. In some embodiments, this multitenancy is supported via providing each tenant with a distinct virtual network, which virtual network is a private network within the cloud network. Each virtual network is given a unique identifier. Similarly, in some embodiments, each host can have a unique identifier, and/or each virtual interface or virtual gateway can have a unique identifier. In some embodiments, these unique identifiers, and specifically the unique identifier of the virtual network for a tenant can be encoded in each communication. By providing each virtual network with a unique identifier and including this within communications, a single instantiation of the VSRS 634, 644 can service multiple tenants having overlapping address and/or name spaces.

The VSRS 634, 644 can perform these switching and/or routing functions to facilitate and/or enable the creation and/or communication with an L2 network within the VLAN 630, 640. This VLAN 630, 640 can be found within a cloud computing environment, and more specifically within a virtual network in that cloud computing environment.

For example, each of VLAN 630, 640 include multiple compute instances 632-A, 632-B, 642-A, 642-B. The VSRS 634, 644 enables communication between a compute instance in one VLAN 630, 640 with a compute instance in another VLAN 630, 640 or in the subnet 620. In some embodiments, the VSRS 634, 644 enables communication between a compute instance in one VLAN 630, 640 with another VCN, another network outside of the VCN including the internet, an on-premise data center, or the like. In such an embodiment, for example, a compute instance, such as compute instance 632-A, can send a communication to an endpoint outside of the VLAN, in this instance, outside of VLAN A 630. The compute instance (632-A) can send a communication to VSRS A 634, which can direct the communication to a router 624, 644 or gateway 604, 608, 610 communicatively coupled with the desired endpoint. The router 624, 644 or gateway 604, 608, 610 communicatively coupled with the desired endpoint can receive the communication from the compute instance (632-A) and can direct the communication to the desired endpoint.

Figure 7:
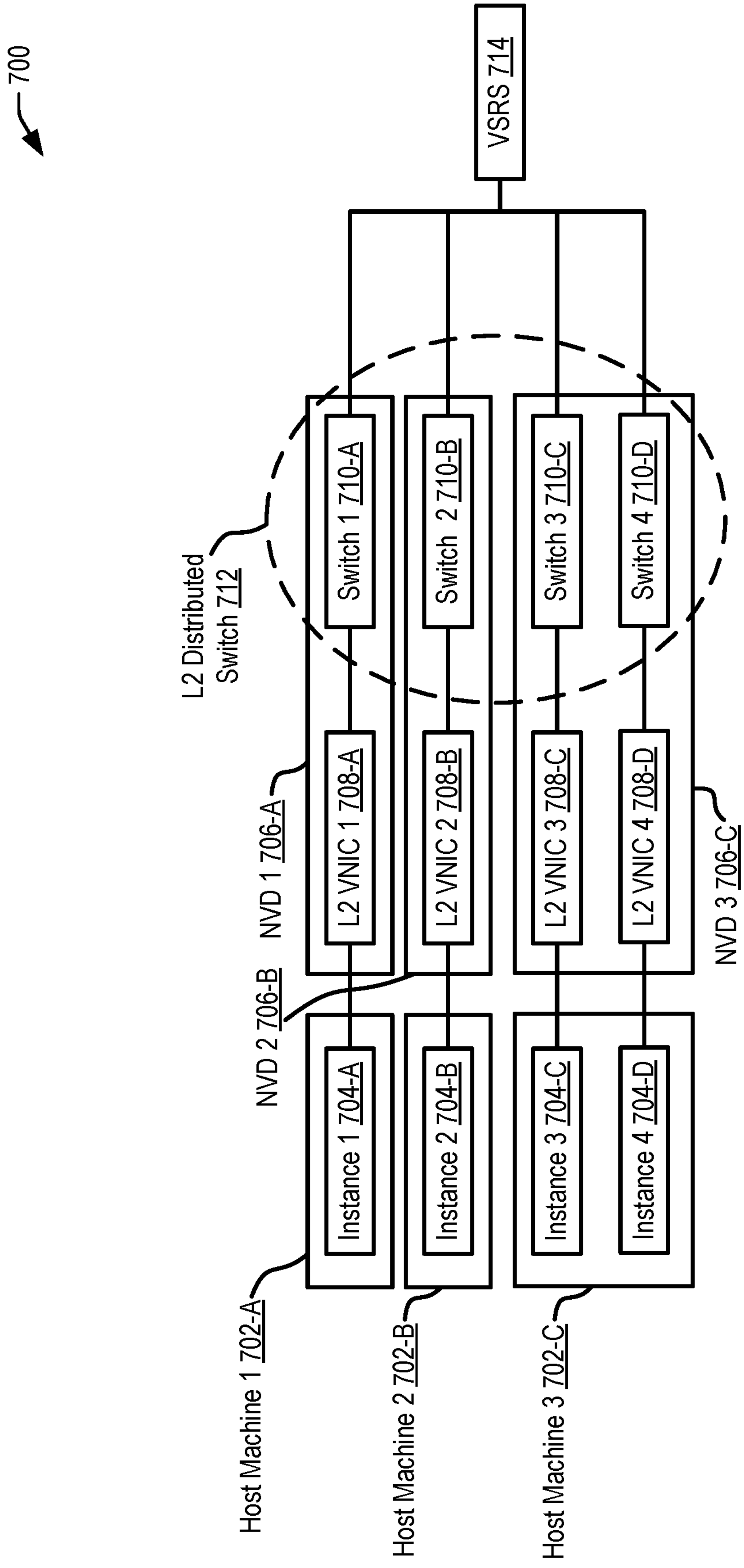
FIG. 7 is a logical and hardware schematic illustration of a VLAN is according to certain embodiments.

With reference now to FIG. 7, a logical and hardware schematic illustration of a VLAN 700 is shown. As seen, the VLAN 700 includes a plurality of endpoints, and specifically includes a plurality of compute instances and a VSRS. The plurality of compute instances (CIs) are instantiated on one or several host machines. In some embodiments, this can be in a one-to-one relationship such that each CI is instantiated on a unique host machine, and/or in some embodiments, this can be in a many-to-one relationship such that a plurality of CIs are instantiated on a single, common host machine. In the various embodiments, the CIs can be Layer 2 CIs by being configured to communicate with each other using L2 protocols. FIG. 7 depicts a scenario in which some CIs are instantiated on unique host machines and in which some CIs share a common host machine. As seen in FIG. 7, Instance 1 (CI1) 704-A is instantiated on host machine 1 702-A, instance 2 (CI2) 704-B is instantiated on host machine 2 702-B, and instances 3 (CI3) 704-C and instance 4 (CI4) 704-D are instantiated on a common host machine 702-C.

Each of the CIs 704-A, 704-B, 704-C, 704-D is communicatively coupled with other CIs 704-A, 704-B, 704-C, 704-D in the VLAN 700 and with VSRS 714. Specifically, each of the CIs 704-A, 704-B, 704-C, 704-D is connected to the other CIs 704-A, 704-B, 704-C, 704-D in the VLAN 700 and to the VSRS 714 via an L2 VNIC and a switch. Each CI 704-A, 704-B, 704-C, 704-D is associated with a unique L2 VNIC and a switch. The switch can be an L2 virtual switch that is local and uniquely associated with and deployed for the L2 VNIC. Specifically, CI1 704-A is associated with L2 VNIC 1 708-A and switch 1 710-A, CI2 704-B is associated with L2 VNIC 2 708-B and switch 710-B, CI3 704-C is associated with L2 VNIC 3 708-C and switch 3 710-C, and CI4 704-D is associated with L2 VNIC 4 708-D and switch 4 710-D.

In some embodiments, each L2 VNIC 708 and its associated switch 710 can be instantiated on an NVD 706. This instantiation can be in a one-to-one relationship such that a single L2 VNIC 708 and its associated switch 710 are instantiated on a unique NVD 706, or this instantiation can be in a many-to-one relationship such that multiple L2 VNICs 708 and their associated switches 710 are instantiated on a single, common NVD 706. Specifically, L2 VNIC 1 708-A and switch 1 710-A are instantiated on NVD 1 706-A, L2 VNIC 2 708-B and switch 2 710-B are instantiated on NVD 2, and both L2 VNIC 3 708-C and switch 3 710-C, and L2 VNIC 4 708-D, and switch 710-D are instantiated on a common NVD, namely, NVD 706-C.

In some embodiments, the VSRS 714 can support conflicting VLAN and IP spaces across multiple tenants. This can include having multiple tenants on the same VSRS 714. In some embodiments, some or all of these tenants could choose to use some or all of: the same IP address space, the same MAC space, and the same VLAN space. This can provide extreme flexibility for users in choosing addresses. In some embodiments, this multitenancy is supported via providing each tenant with a distinct virtual network, which virtual network is a private network within the cloud network. Each virtual network (e.g., each VLAN or VCN) is given a unique identifier, such as a VCN identifier which can be a VLAN identifier. This unique identifier can be selected by, for example, the control plane, and specifically by the control plane of the CSPI. In some embodiments, this unique VLAN identifier can comprise one or several bits that can be included and/or used in packet encapsulation. Similarly, in some embodiments, each host can have a unique identifier, and/or each virtual interface or virtual gateway can have a unique identifier. In some embodiments, these unique identifiers, and specifically the unique identifier of the virtual network for a tenant can be encoded in each communication. By providing each virtual network with a unique identifier and including this within communications, a single instantiation of the VSRS can service multiple tenants having overlapping address and/or name spaces. In some embodiments, a VSRS 714 can determine to which tenant a packet belongs based on the VCN identifier and/or the VLAN identifier associated with a communication, and specifically inside of the VCN header of the communication. In embodiments disclosed herein, a communication leaving or entering a VLAN can have a VCN header which can include a VLAN identifier. Based on the VCN header containing the VLAN identifier, the VSRS 714 can determine tenancy, or in other words, the recipient VSRS can determine to which VLAN and/or to which tenant to send the communication. In addition, each compute instance that belongs to a VLAN (e.g., an L2 compute instance) is given a unique interface identifier that identifies the L2 VNIC that is associated with the compute instance. The interface identifier can be included in traffic from and/or to the computer instance (e.g., by being included in a header of a frame) and can be used by an NVD to identify the L2 VNIC associated with the compute instance. In other words, the interface identifier can uniquely indicate the compute instance and/or its associated L2 VNIC.

As indicated in FIG. 7, the switches 710-A, 710-B, 710-C, 710-D can together form an L2 distributed switch 712, also referred to herein as distributed switch 712. From a customer standpoint, each switch 710-A, 710-B, 710-C, 710-D in the L2 distributed switch 712 is a single switch that connects to all of the CIs in the VLAN. However, the L2 distributed switch 712, which emulates the user experience of a single switch, is infinitely scalable and includes a collection of local switches (e.g., in the illustrative example of FIG. 7, the switches 710-A, 710-B, 710-C, 710-D). As shown in FIG. 7, each CI executes on a host machine connected to a NVD. For each CI on a host connected to an NVD, the NVD hosts a Layer 2 VNIC and a local switch associated with the compute instance (e.g., an L2 virtual switch, local to the NVD, associated with the Layer 2 VNIC, and being one member or component of the L2 distributed switch 712). The Layer 2 VNIC represents a port of the compute instance on the Layer 2 VLAN. The local switch connects the VNIC to other VNICs (e.g., other ports) associated with other compute instances of the Layer 2 VLAN.

Each of the CIs 704-A, 704-B, 704-C, 704-D can communicate with the others of the CIs 704-A, 704-B, 704-C, 704-D in the VLAN 700 or with the VSRS 714. One of CIs 704-A, 704-B, 704-C, 704-D sends a frame to another of the CIs 704-A, 704-B, 704-C, 704-D or to the VSRS 714 by sending the frame to the MAC address and the interface identifier of the recipient one of the CIs 704-A, 704-B, 704-C, 704-D or the VSRS 714. The MAC address and the interface identifier can be included in a header of the frame. As explained herein above, the interface identifier can indicate the L2 VNIC of the recipient one of the CIs 704-A, 704-B, 704-C, 704-D or of the VSRS 714.

In one embodiment, the CI1 704-A can be a source CI, the L2 VNIC 708-A can be a source L2 VNIC, and the switch 710-A can be a source L2 virtual switch. In this embodiment, CI3 704-C can be the destination CI, and the L2 VNIC 3 708-C can be the destination L2 VNIC. The source CI can send a frame with a source MAC address and a destination MAC address. This frame can be intercepted by the NVD 706-A instantiating the source VNIC and the source switch.

The L2 VNICs 708-A, 708-B, 708-C, 708-D can, for the VLAN 700, each learn mapping of MAC addresses to interface identifiers of the L2 VNICs. This mapping can be learned based on frames and/or communications received from within the VLAN 700. Based on this previously determined mapping, the source VNIC can determine the interface identifier of the destination interface associated with the destination CI within the VLAN, and can encapsulate the frame. In some embodiments, this encapsulation can comprise a GENEVE encapsulation, and specifically an L2 GENEVE encapsulation, which encapsulation include the L2 (Ethernet) header of the frame being encapsulated. The encapsulated frame can identify the destination MAC, the destination interface identifier, the source MAC, and the source interface identifier.

The source VNIC can pass the encapsulated frame to the source switch, which can direct the frame to the destination VNIC. Upon receipt of the frame, the destination VNIC can decapsulate the frame and can then provide the frame to the destination CI.

Figure 8:
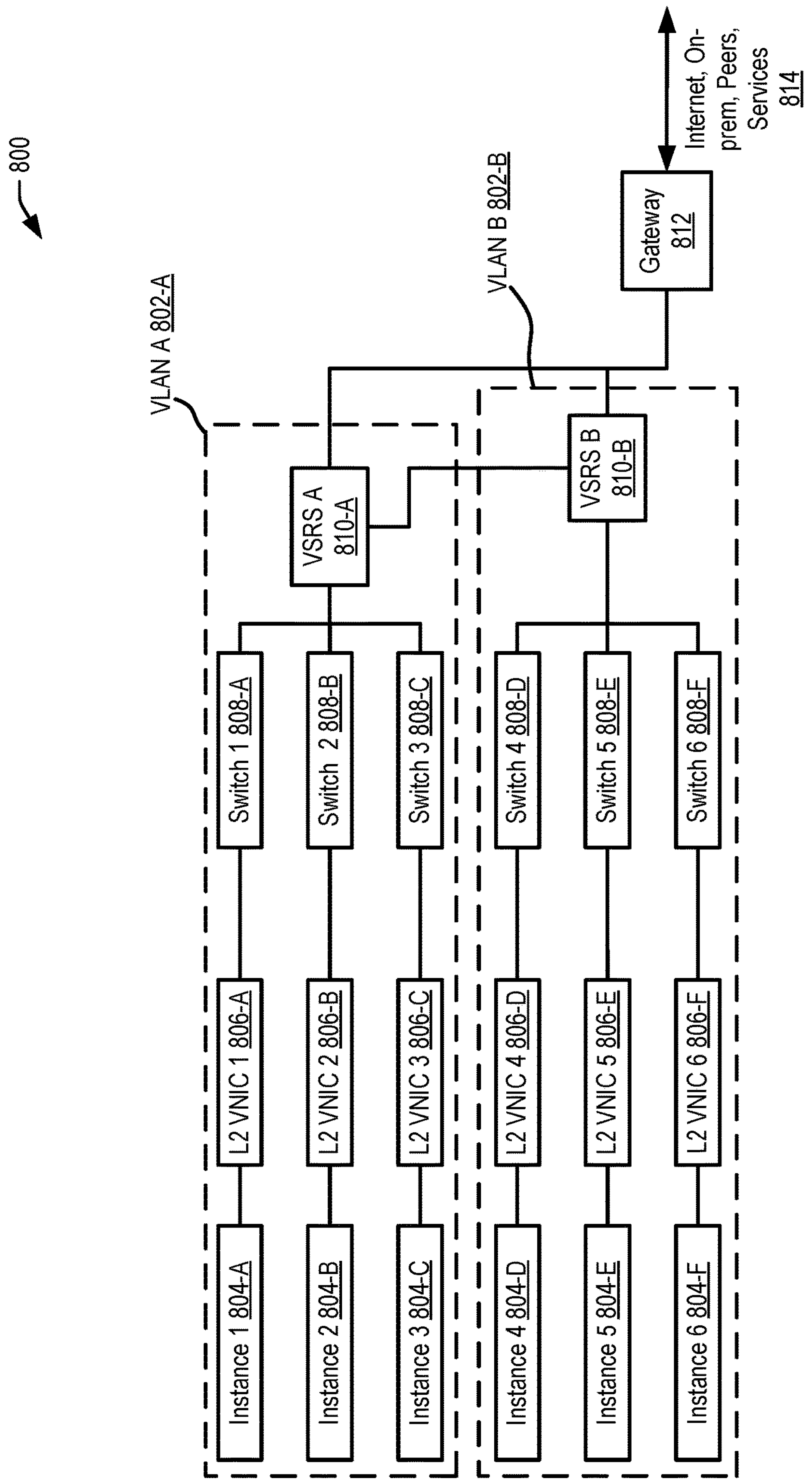
FIG. 8 is a logical schematic illustration of multiple connected L2 VLANs according to certain embodiments.

With reference now to FIG. 8, a logical schematic illustration of multiple connected L2 VLANs 800 is shown. In the specific embodiment depicted in FIG. 8, both VLANs are located in the same VCN. As seen, the multiple connected L2 VLANs 800 can include a first VLAN, VLAN A 802-A and a second VLAN, VLAN B 802-B. Each of these VLANs 802-A, 802-B can include one or several CIs, each of which can have an associated L2 VNIC and an associated L2 virtual switch. Further, each of these VLANs 802-A, 802-B can include a VSRS.

Specifically, VLAN A 802-A can include instance 1 804-A connected to L2 VNIC 1 806-A and switch 1 808-A, instance 2 804-B connected to L2 VNIC 2 806-B and switch 808-B, and instance 3 804-C connected to L2 VNIC 3 806-C and switch 3 808-C. VLAN B 802-B can include instance 4 804-D connected to L2 VNIC 4 806-D and switch 4 808-D, instance 5 804-E connected to L2 VNIC 5 806-E and switch 808-E, and instance 6 804-F connected to L2 VNIC 6 806-F and switch 3 808-F. VLAN A 802-A can further include VSRS A 810-A, and VLAN B 802-B can include VSRS B 810-B. Each of the CIs 804-A, 804-B, 804-C of VLAN A 802-A can be communicatively coupled to VSRS A 810-A, and each of the CIS 804-D, 804-E, 804-F of VLAN B 802-B can be communicatively coupled to VSRS B 810-B.

The VLAN A 802-A can be communicatively coupled to the VLAN B 802-B via their respective VSRS 810-A, 810-B. Each VSRS can likewise be coupled to a gateway 812, which can provide access to CIs 804-A, 804-B, 804-C, 804-D, 804-E, 804-F in each VLAN 802-A, 802-B to other networks outside of the VCN in which the VLANs are 802-A, 802-B are located. In some embodiments, these networks can include, for example, one or several on-premise networks, another VCN, a services network, a public network such as the internet, or the like.

Each of the CIs 804-A, 804-B, 804-C in the VLAN A 802-A can communicate with the CIs 804-D, 804-E, 804-F in the VLAN B 802-B via the VSRS 810-A, 810-B of each VLAN 802-A, 802-B. For example, one of CIs 804-A, 804-B, 804-C, 804-D, 804-E, 804-F in one of the VLANs 802-A, 802-B can send a frame to a CI 804-A, 804-B, 804-C, 804-D, 804-E, 804-F in the other of the VLANs 802-A, 802-B. This frame can exit the source VLAN via the VSRS of the source VLAN and can enter the destination VLAN, and be routed to the destination CI via the destination VSRS.

In one embodiment, the CI 1 804-A can be a source CI, the VNIC 806-A can be a source VNIC, and a switch 808-A can be a source switch. In this embodiment, the CI 5 804-E can be the destination CI, and the L2 VNIC 5 806-E can be the destination VNIC. The VSRS A 810-A can be the source VSRS identified as SVSRS, and the VSRS B 810-B can be the destination VSRS, identified as DVSRS.

The source CI can send a frame with a MAC address. This frame can be intercepted by the NVD instantiating source VNIC and the source switch. The source VNIC, encapsulates the frame. In some embodiments, this encapsulation can comprise a GENEVE encapsulation, and specifically an L2 GENEVE encapsulation. The encapsulated frame can identify a destination address of the destination CI. In some embodiments, this destination address can also comprise a destination address of the destination VSRS. The destination address of the destination CI can include a destination IP address, a destination MAC of the destination CI, and/or a destination interface identifier of the destination VNIC associated with the destination CI. The destination address of the destination VSRS can include the IP address of the destination VSRS, an interface identifier of the destination VNIC associated with the destination VSRS, and/or the MAC address of the destination VSRS.

The source VSRS can receive the frame from the source switch, can look up the VNIC mapping from the destination address of the frame, which destination address can be a destination IP address, and can forward the packet to the destination VSRS. The destination VSRS can receive the frame. Based on the destination address contained in the frame, the destination VSRS can forward the frame to the destination VNIC. The destination VNIC can receive and decapsulate the frame and can then provide the frame to the destination CI.

Figure 9:
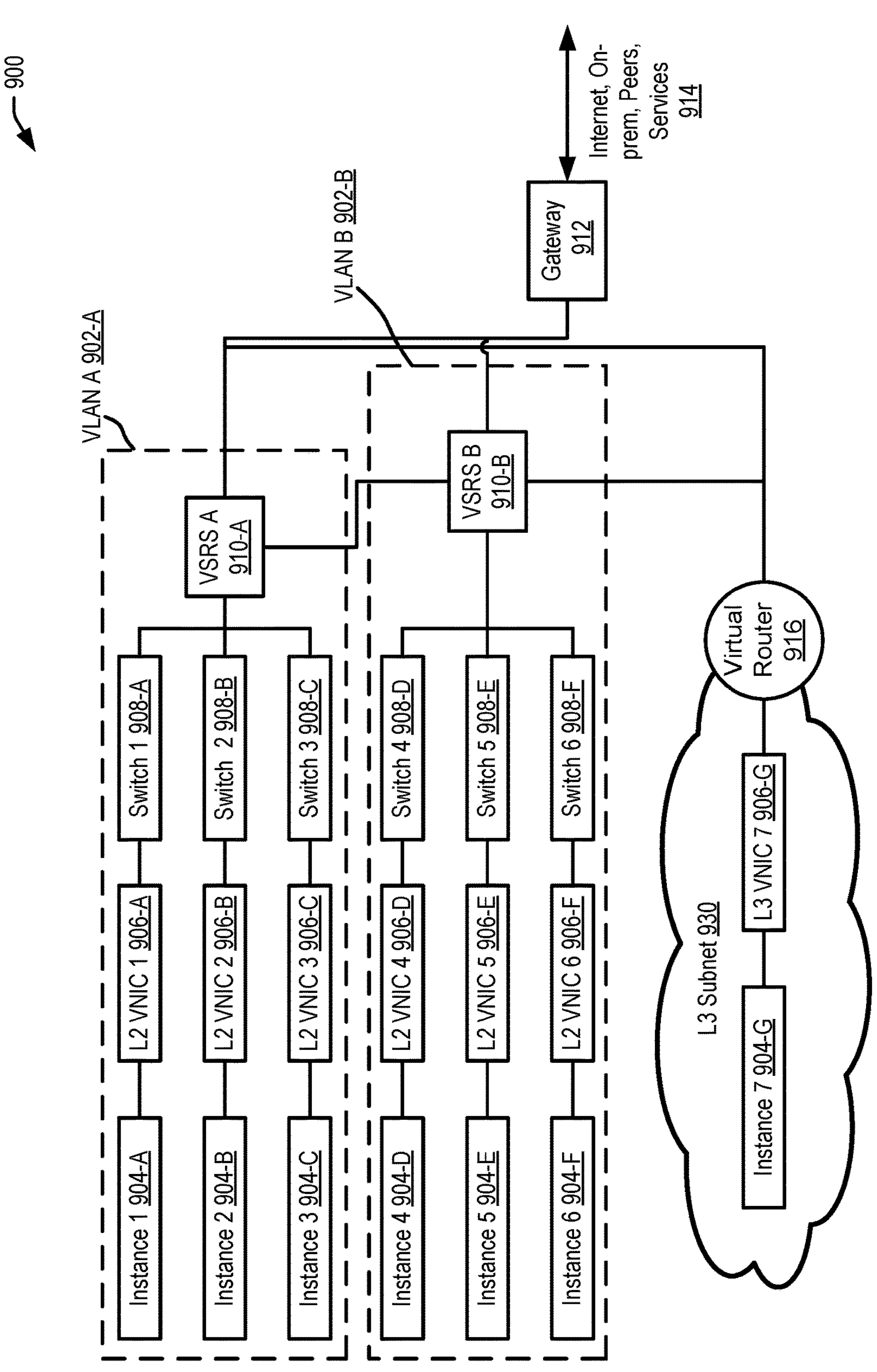
FIG. 9 is a logical schematic illustration of multiple connected L2 VLANs and a subnet 900 according to certain embodiments.

With reference now to FIG. 9, a logical schematic illustration of multiple connected L2 VLANs and a subnet 900 is shown. In the specific embodiment depicted in FIG. 9, both VLANs and the subnet are located in the same VCN. This is indicated as the virtual router and the VSRS of both of the VLANs and the subnet are directly connected, as opposed to connected through a gateway.

As seen, this can include a first VLAN, VLAN A 902-A, a second VLAN, VLAN B 902-B, and subnet 930. Each of these VLANs 902-A, 902-B can include one or several CIs, each of which can have an associated L2 VNIC and an associated L2 switch. Further, each of these VLANs 902-A, 902-B can include a VSRS. Likewise, the subnet 930, which can be an L3 subnet, can include one or several CIs, each of which can have an associated L3 VNIC, and the L3 subnet 930 can include a virtual router 916.

Specifically, the VLAN A 902-A can include instance 1 904-A connected to L2 VNIC 1 906-A and switch 1 908-A, instance 2 904-B connected to L2 VNIC 2 906-B and switch 908-B, and instance 3 904-C connected to L2 VNIC 3 906-C and switch 3 908-C. VLAN B 902-B can include instance 4 904-D connected to L2 VNIC 4 906-D and switch 4 908-D, instance 5 904-E connected to L2 VNIC 5 906-E and switch 908-E, and instance 6 904-F connected to L2 VNIC 6 906-F and switch 3 908-F. The VLAN A 902-A can further include a VSRS A 910-A, and the VLAN B 902-B can include a VSRS B 910-B. Each of the CIs 904-A, 904-B, 904-C of VLAN A 902-A can be communicatively coupled to the VSRS A 910-A, and each of the CIs 904-D, 904-E, 904-F of VLAN B 902-B can be communicatively coupled to the VSRS B 910-B. The L3 subnet 930 can include one or several CIs, and specifically can include instance 7 904-G, which is communicatively coupled to L3 VNIC 7 906-G. The L3 subnet 930 can include a virtual router 916.

The VLAN A 902-A can be communicatively coupled to the VLAN B 902-B via their respective VSRS 910-A, 910-B. The L3 subnet 930 can be communicatively coupled with the VLAN A 902-A and VLAN B 902-B via the virtual router 916. Each of the virtual router 916 and VSRS instances 910-A, 910-B can likewise be coupled to a gateway 912, which can provide access for CIs 904-A, 904-B, 904-C, 904-D, 904-E, 904-F, 904-G in each VLAN 902-A, 902-B and in the subnet 930 to other networks outside of the VCN in which the VLANs are 902-A, 902-B and subnet 930 are located. In some embodiments, these networks can include, for example, one or several on-premise networks, another VCN, a services network, a public network such as the internet, or the like.

Each VSRS instance 910-A, 910-B can provide an egress pathway for frames leaving the associated VLAN 902-A, 902-B, and an ingress pathway for frames entering the associated VLAN 902-A, 902-B. From the VSRS instance 910-A, 910-B of a VLAN 902-A, 902-B, frames can be sent to any desired endpoint, including an L2 endpoint such as an L2 CI in another VLAN either on the same VCN or on a different VCN or network, and/or to an L3 endpoint such as an L3 CI in a subnet either on the same VCN or one a different VCN or network.

In one embodiment, the CI 1 904-A can be a source CI, the VNIC 906-A can be a source VNIC, and the switch 908-A can be a source switch. In this embodiment, the CI 7 904-G can be the destination CI, and the VNIC 7 906-G can be the destination VNIC. VSRS A 910-A can be the source VSRS identified as SVSRS, and the virtual router (VR) 916 can be the destination VR.

The source CI can send a frame with a MAC address. This frame can be intercepted by the NVD instantiating the source VNIC and the source switch. The source VNIC, encapsulates the frame. In some embodiments, this encapsulation can comprise a GENEVE encapsulation, and specifically an L2 GENEVE encapsulation. The encapsulated frame can identify a destination address of the destination CI. In some embodiments, this destination address can also comprise a destination address of the VSRS of the VLAN of the source CI. The destination address of the destination CI can include a destination IP address, a destination MAC of the destination CI, and/or a destination interface identifier of the destination VNIC of the destination CI.

The source VSRS can receive the frames from the source switch, can look up the VNIC mapping from the destination address of the frame, which destination address can be a destination IP address, and can forward the frame to the destination VR. The destination VR can receive the frame. Based on the destination address contained in the frame, the destination VR can forward the frame to the destination VNIC. The destination VNIC can receive and decapsulate the frame and can then provide the frame to the destination CI.

Learning by an L2 VNIC and/or an L2 Virtual Switch within a Virtual L2 Network

Figure 10:
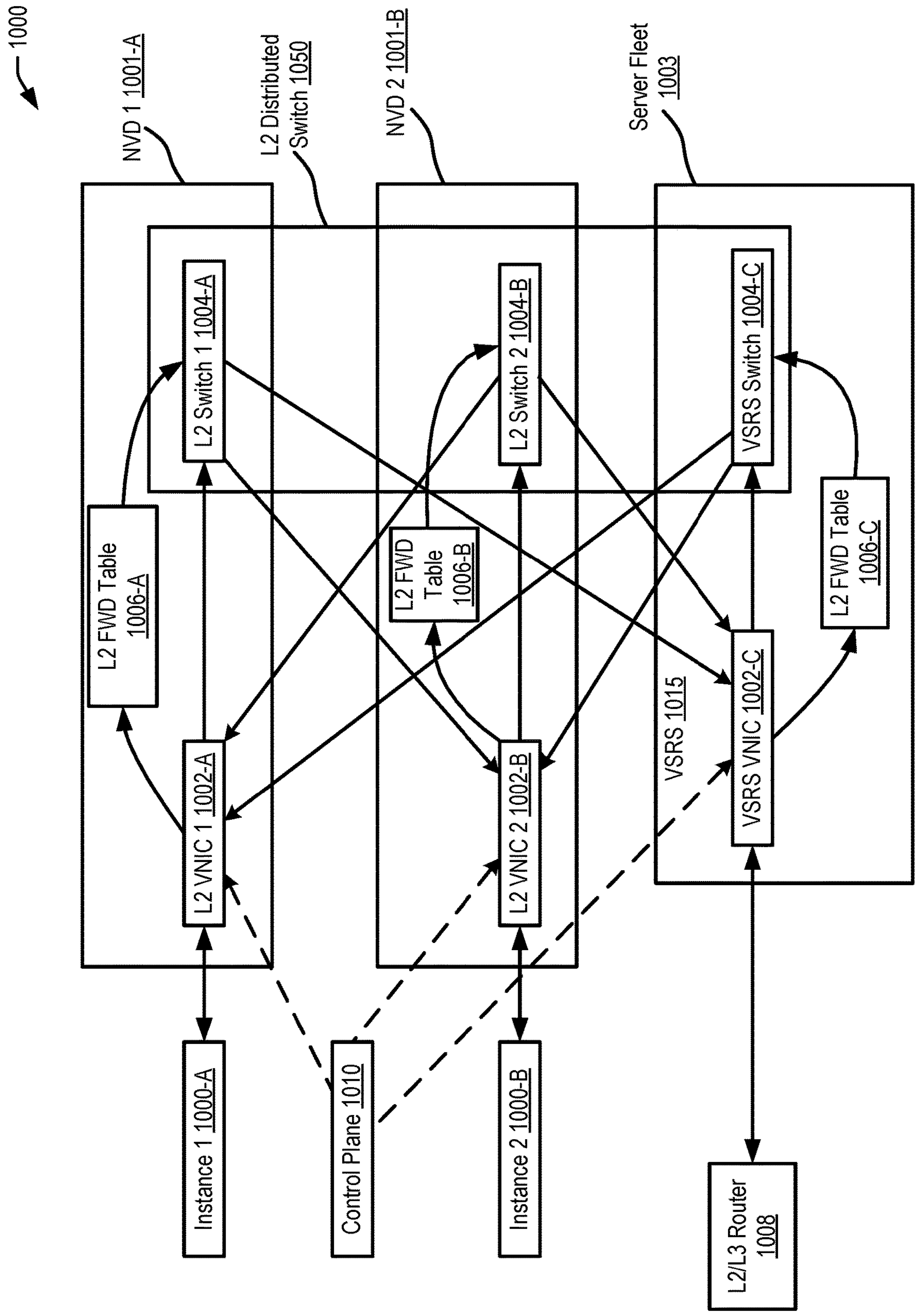
FIG. 10 is a schematic illustration of intra-VLAN communication and learning within a VLAN according to certain embodiments.

With reference now to FIG. 10, a schematic illustration of one embodiment of intra-VLAN communication and learning within a VLAN 1000 is shown. The learning here is specific to how an L2 VNIC, VSRS of the VLAN of the source CI, and/or an L2 virtual switch learn associations between MAC addresses and L2 VNICs/VSRS VNICs (more specifically, between MAC addresses associated with L2 compute instances or a VSRS and interface identifiers associated with L2 VNICS of these L2 compute instances associated with a VSRS VNIC). Generally, the learning is based on ingress traffic. This learning, for an aspect of interface-to-MAC address learning is different from a learning process (e.g., an ARP process) that an L2 compute instance may implement to learn a destination MAC address. The two learning processes (e.g., of an L2 VNIC/L2 virtual switch and of an L2 compute instance) are illustrated as being jointly implemented in FIG. 12.

As seen, the VLAN 1000 includes compute instance 1 1000-A communicatively coupled with NVD 1 1001-A which instantiates L2 VNIC 1 1002-A and L2 switch 1 1004-A. The VLAN 1000 also include compute instance 2 1000-B communicatively coupled with NVD 2 1001-B which instantiates L2 VNIC 2 1002-B and L2 switch 2 1004-A. The VLAN 1000 also includes VSRS 1015 running on a server fleet, and which includes VSRS VNIC 1002-C and VSRS switch 1004-C. All of the switches 1004-A, 1004-B, 1004-C together form an L2 distributed switch 1050. The VSRS 1015 is communicatively coupled with an endpoint 1008 which can comprise a gateway, and specifically can comprise L2/L3 router in, for example, the form of another VSRS, or an L3 router in, for example, the form of a virtual router.

A control plane 1010 of a VCN hosting the VLAN 1000 maintains information identifying each L2 VNIC on the VLAN 1000 and network placement of the L2 VNIC. For example, this information can include for an L2 VNIC, the interface identifier associated with the L2 VNIC, and/or the physical IP address of the NVD hosting the L2 VNIC. The control plane 1010 updates (e.g., periodically or on demand) interfaces in the VLAN 1000 with this information. Thus, each L2 VNIC 1002-A, 1002-B, 1002-C in the VLAN 1000 receives the information from the control plane 1010 identifies the interfaces in the VLAN, and populates a table with this information. The table populated by an L2 VNIC can be stored locally to the NVD hosting the L2 VNIC. In the event that a VNIC 1002-A, 1002-B, 1002-C already includes a current table, the VNIC 1002-A, 1002-B, 1002-C can determine any discrepancy between the VNIC's 1002-A, 1002-B, 1002-C current table and the information/table received from the control plane 1010. The VNIC 1002-A, 1002-B, 1002-C can, in some embodiments, update its table to match information received from the control plane 1010.

As seen in FIG. 10, frames are sent via an L2 switch 1004-A, 1004-B, 1004-C, and are received by a recipient VNIC 1002-A, 1002-B, 1002-C. As frames are received by a VNIC 1002-A, 1002-B, 1002-C, that VNIC learns the mapping of the source interface (source VNIC) and source MAC address of that frame. Based on its table of information received from the control plane 1010, the VNIC can map the source MAC address (from a received frame) to an interface identifier of the source VNIC and the IP address of the VNIC and/or IP address of the NVD hosting the VNIC (where the interface identifier and IP address(es) are available from the table). As such, an L2 VNIC 1002-A, 1002-B, 1002-C learns mapping of interface identifiers to MAC addresses based on received communications and/or frames. Each VNIC 1002-A, 1002-B, 1002-C can its L2 forwarding (FWD) table 1006-A, 1006-B, 1006-C with this learned mapping information. In some embodiments, an L2 forwarding table includes and associates a MAC address with at least one of an interface identifier, or a physical IP address. In such embodiments, the MAC address is an address assigned to an L2 compute instance and can correspond to a port emulated by an L2 VNIC associated with the L2 compute instance. The interface identifier can uniquely identify the L2 VNIC and/or the L2 compute instance. The virtual IP address can be that of the L2 VNIC. And the physical IP address can be that of the NVD hosting the L2 VNIC. The L2 forwarding updated by an L2 VNIC can be stored locally on the NVD hosting the L2 VNIC and used by the L2 virtual switch associated with the L2 VNIC to direct frames. In some embodiments, VNICs within a common VLAN can share all or portions of their mapping table with each other.

In light of the above network architecture, traffic flows are described herein next. In the interest of clarity of explanation, the traffic flows are described in connection with compute instance 2 1000-B, L2 VNIC 2 10002-B, L2 switch 2 1004-B, and NVD 2 1001-B. The description equivalently applies to traffic flows to and/or from other compute instances.

As explained herein above, the VLAN is implemented within a VCN as an overlay L2 network on top of an L3 physical network. An L2 compute instance of the VLAN can send or receive an L2 frame that includes overlay MAC addresses (also referred to as virtual MAC addresses) as source and destination MAC addresses. The L2 frame can also encapsulate a packet that includes overlay IP addresses (also referred to as virtual IP addresses) as source and destination IP addresses. The overlay IP address of the compute instance can, in some embodiments, belong to a CIDR range of the VLAN. The other overlay IP address can belong to the CIDR range (in which case, the L2 frame flows within the VLAN) or outside the CIDR range (in which case, the L2 frame is destined to or received from another network). The L2 frame can also include a VLAN tag that uniquely identifies the VLAN and that can be used to distinguish against multiple L2 VNICs on the same NVD. The L2 frame can be received in an encapsulated packet by the NVD via a tunnel from the host machine of the compute instance, from another NVD, or from the server fleet hosting the VSRS. In these different cases, the encapsulated packet can be an L3 packet sent on the physical network, where the source and destination IP addresses are physical IP addresses. Different types of encapsulation are possible, including GENEVE encapsulation. The NVD can decapsulate the received packet to extract the L2 frame. Similarly, to send an L2 frame, the NVD can encapsulate it in an L3 packet and send it on the physical substrate.

For intra-VLAN egress traffic from the instance 2 1000-B, NVD 2 1001-B receives a frame from the host machine of instance 2 1000-B over an Ethernet link. The frame includes an interface identifier that identifies L2 VNIC 2 1000-B. The frame includes the overlay MAC address of instance 2 1000-B (e.g., M.2) as the source MAC address and the overlay MAC address of instance 1 1000-A (e.g., M.1) as the destination MAC address. Given the interface identifier, NVD 2 1001-B passes the frame to L2 VNIC 2 1002-B for further processing. L2 VNIC 2 1002-B forwards the frame to L2 switch 2 1004-B. Based on L2 forwarding table 1006-B, L2 switch 2 1004-B determines whether the destination MAC address is known (e.g., matches with an entry in L2 forwarding table 1006-B).

If known, the L2 switch 2 1004-B determines that the L2 VNIC 1 1002-A is the relevant tunnel endpoint and forwards the frame to the L2 VNIC 1 1002-A. The forwarding can include encapsulation of the frame in a packet and decapsulation of the packet (e.g., GENEVE encapsulation and decapsulation), where the packet includes the frame, the physical IP address of NVD 1 1001-A (e.g., IP.1) as the destination address, and the physical IP address of the NVD 2 1001-B (e.g., IP.2) as the source address.

If unknown, the L2 switch 2 1004-B broadcasts the frame to the various VNICs of the VLAN (e.g., including the L2 VNIC 1 1002-A and any other L2 VNIC of the VLAN), where the broadcasted frames are processed (e.g., encapsulated, sent, decaspulated) between the relevant NVDs. In some embodiments, this broadcast can be performed, or more specifically, emulated, at the physical network, encapsulating the frame separately to each L2 VNIC, including the VSRS in the VLAN. Thus, the broadcast is emulated via a series of replicated unicast packets at the physical network. In turn, each L2 VNIC receives the frame and learns the association between the interface identifier of the L2 VNIC 2 1002-B and the source MAC address (e.g., M.2) and the source physical IP address (e.g., IP.2).

For intra-VLAN ingress traffic to compute instance 2 1000-B from compute instance 1 1000-A, NVD 2 1001-B receives a packet from NVD 1. The packet has IP.1 as the source address and a frame, where the frame includes M.2 as the destination MAC address and M.1 as the source MAC address. The frame also includes the network identifier of L2 VNIC 1 1002-A. Upon decapsulation, VNIC 2 receives the frame and learns that this interface identifier is associated with M.1 and/or with IP.1 and stores, if previously unknown, this learned information in L2 forwarding table 1006-B, at switch 2, for subsequent egress traffic. Alternatively, upon decapsulation, the L2 VNIC 2 1002-B receives the frame and learns that this interface identifier is associated with M.1 and/or with IP.1 and refreshes the expiration time if this information is already known.

For egress traffic sent from instance 2 1000-B in the VLAN 1000 to an instance in another VLAN, a similar flow as the above egress traffic can exist, except that the VSRS VNIC and VSRS switch are used. In particular, the destination MAC address is not within the L2 broadcast of the VLAN 1000 (it is within the other L2 VLAN). Accordingly, the overlay destination IP address (e.g., IP.A) of the destination instance is used for this egress traffic. For example, L2 VNIC 2 1002-B determines that IP.A is outside of the CIDR range of the VLAN 1000. Accordingly, L2 VNIC 2 1002-B sets a destination MAC address to a default gateway MAC address (e.g., M.DG). Based on M.DG, the L2 switch 2 1004-B sends the egress traffic to the VSRS VNIC (e.g., via a tunnel, with the proper end-to-end encapsulation). The VSRS VNIC forwards the egress traffic to the VSRS switch. In turn, the VSRS switch performs a routing function, where, based on the overlay destination IP address (e.g., IP.A), the VSRS switch of the VLAN 1000 sends the egress traffic to the VSRS switch of the other VLAN (e.g., via the virtual router between these two VLANs, also with the proper end-to-end encapsulation). Next, the VSRS switch of the other VLAN performs a switching function by determining that IP.A is within the CIDR range of this VLAN and performs a look-up of its ARP cache based on IP.A to determine the destination MAC address associated with IP.A. If no match exists in the ARP cache, ARP requests are sent to the different L2 VNICs of the other VLAN to determine the destination MAC address. Otherwise, the VSRS switch sends the egress traffic to the relevant VNIC (e.g., via a tunnel, with the proper encapsulation).

For ingress traffic to an instance in the VLAN 1000 from an instance in another VLAN, the traffic flow is similar to the above, except in the opposite direction. For egress traffic from an instance in the VLAN 1000 to an L3 network, the traffic flow is similar to the above except that the VSRS switch of the VLAN 1000 routes the packet directly to the destination VNIC in the virtual L3 network via the virtual router (e.g., without having to route the packet through another VSRS switch). For ingress traffic to an instance in the VLAN 1000 from a virtual L3 network, the traffic flow is similar to the above except that the packet is received by the VSRS switch of the VLAN 1000 A that sends it within the VLAN as a frame. For traffic (egress or ingress) between the VLAN 1000 and other networks, the VSRS switch is similarly used, where its routing function is used on the egress to send a packet via the proper gateway (e.g., IGW, NGW, DRG, SGW, LPG), and where its switching function is used on the ingress to send a frame within the VLAN 1000.

Figure 11:
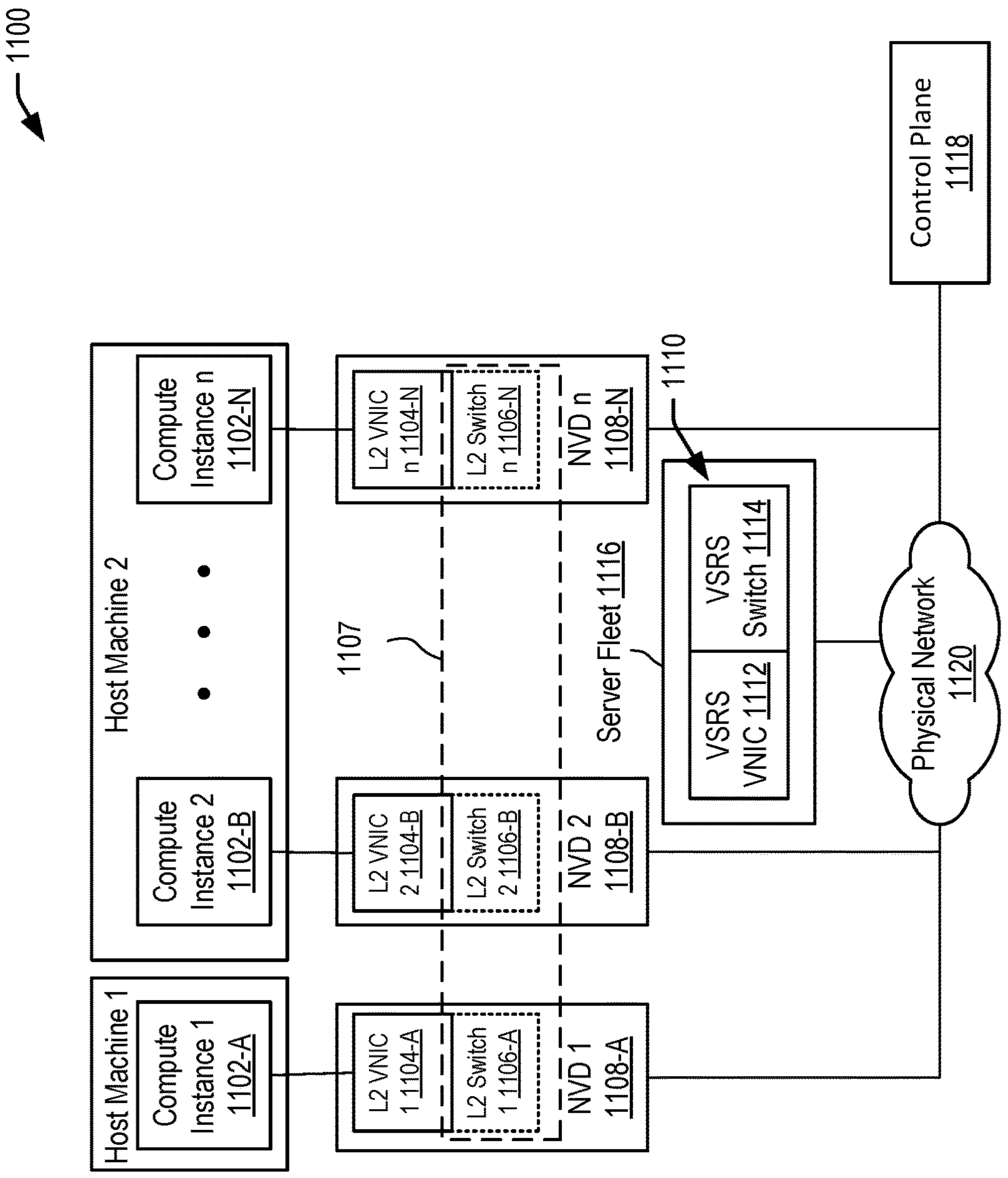
FIG. 11 is a schematic illustration a VLAN according to certain embodiments.

With reference now to FIG. 11, a schematic illustration of an embodiment of a VLAN 1100 (e.g., a cloud-based Virtual L2 network) is shown, and specifically an implementation view of the VLAN is shown.

As described herein above, the VLAN can include "n" compute instances 1102-A, 1102-B, 1102-N, each of which executes on a host machine. As previously discussed, there can be a one-to-one association between a compute instance and a host machine, or a many-to-one association between a plurality of compute instances and a single host machine. Each compute instance 1102-A, 1102-B, 1102-N can be an L2 compute instance, in which case, it is associated with at least one virtual interface (e.g., an L2 VNIC) 1104-A, 1104-B, 1104-N and a switch 1106-A, 1106-B, 1106-N. The switches 1106-A, 1106-B, 1106-N are L2 virtual switches and together form an L2 distributed switch 1107.

The pair of L2 VNIC 1104-A, 1104-B, 1104-N and switch 1106-A, 1106-B, 1106-N associated with a compute instance 1102-A, 1102-B, 1102-N on a host machine is a pair of software modules on a NVD 1108-A, 1108-B, 1108-N connected to the host machine. Each L2 VNIC 1104-A, 1104-B, 1104-N represents an L2 port of the customer's perceived single switch (referred to herein as vswitch). Generally, a host machine "i" executes a compute instance "i" and is connected to an NVD "i". In turn, the NVD "i" executes an L2 VNIC "i" and a "switch "i". The L2 VNIC "i" represents an L2 port "i" of the vswitch. "i" is a positive integer between 1 and "n". Here also, although one-to-one associations are described, other types of associations are possible. For instance, a single NVD can be connected to multiple hosts, each executing one or more compute instances that belong to the VLAN. If so, the NVD hosts multiple pairs of L2 VNIC and switch, each corresponding to one of the compute instances.

The VLAN can include an instance of a VSRS 1110. The VSRS 1110 performs switching and routing functionalities and includes an VSRS VNIC 1112 and an instance of a VSRS switch 1114. The VSRS VNIC 1112 represents a port on the vswitch, where this port connects the vswitch to other networks via a virtual router. As shown, the VSRS 1110 can be instantiated on a server fleet 1116.

A control plane 1118 can track information identifying L2 VNICs 1104-A, 1104-B, 1104-N and their placements in the VLAN. The control plane 1110 can further provide this information to the L2 interfaces 1104-A, 1104-B, 1104-N in the VLAN.

As shown in FIG. 11, the VLAN can be a cloud-based virtual L2 network that can be built on top of the physical network 1120. In some embodiments, this physical network 1120 can include the NVDs 1108-A, 1108-B, 1108-N.

Generally, a first L2 compute instance of the VLAN (e.g., compute instance 1 1102-A) can communicate with a second compute instance of the VLAN (e.g., compute instance 2 1102-B) using L2 protocols. For instance, a frame can be sent between these two L2 compute instances over the VLAN. Nonetheless, the frame can be encapsulated, tunneled, routed, and/or subject to other processing such that the frame can sent over the underlying physical network 1120.

For example, the compute instance 1 1102-A sends a frame destined to the compute instance 2 1102-B. Depending on the network connections between host machine 1 and NVD 1, NVD1 and the physical network 1120, the physical network 1120 NVD 2, and NVD 2 and host machine 2 (e.g., TCP/IP connections, Ethernet connections, tunneling connections, etc.), different types of processing can be applied to the frame. For instance, the frame is received by NVD 1 and encapsulated, and so on and so forth, until the frame reaches the compute instance 2. This processing such that the frame can be sent between the underlying physical resources is assumed and, for the purpose of brevity and clarity, its description is omitted from the description the VLAN and the related L2 operations.

Virtual L2 Network Communication

Multiple forms of communication can occur within or with a virtual L2 network. These can include intra-VLAN communications. In such an embodiments, a source compute instance can send a communication to a destination compute instance that is in the same VLAN as the source compute instance (CI). The communication can be also sent to an endpoint outside of the VLAN of the source CI. This can include, for example, a communication between a source CI in a first VLAN to a destination CI in a second VLAN, a communication between a source CI in a first VLAN to a destination CI in a L3 subnet, and/or a communication from a source CI in a first VLAN to a destination CI outside of the VCN containing the VLAN of the source CI. This communication can further include, for example, receiving a communication at a destination CI from a source CI outside of the VLAN of the destination CI. This source CI can be in another VLAN, in a L3 subnet, or outside of the VCN containing the VLAN of the source CI.

Each CI within a VLAN can play an active role in the traffic flow. This includes learning interface identifier-to-MAC address, also referred to herein as interface-to-MAC address, mapping of instances within the VLAN to maintain L2 forwarding tables within the VLAN, and the sending and/or receiving of communications (e.g. frames in case of L2 communications). The VSRS can play an active role in communication within the VLAN and in communication with source or destination CIs outside of the VLAN. The VSRS can maintain a presence in the L2 network and in the L3 network to enable the egress and ingress communication.

Figure 12:
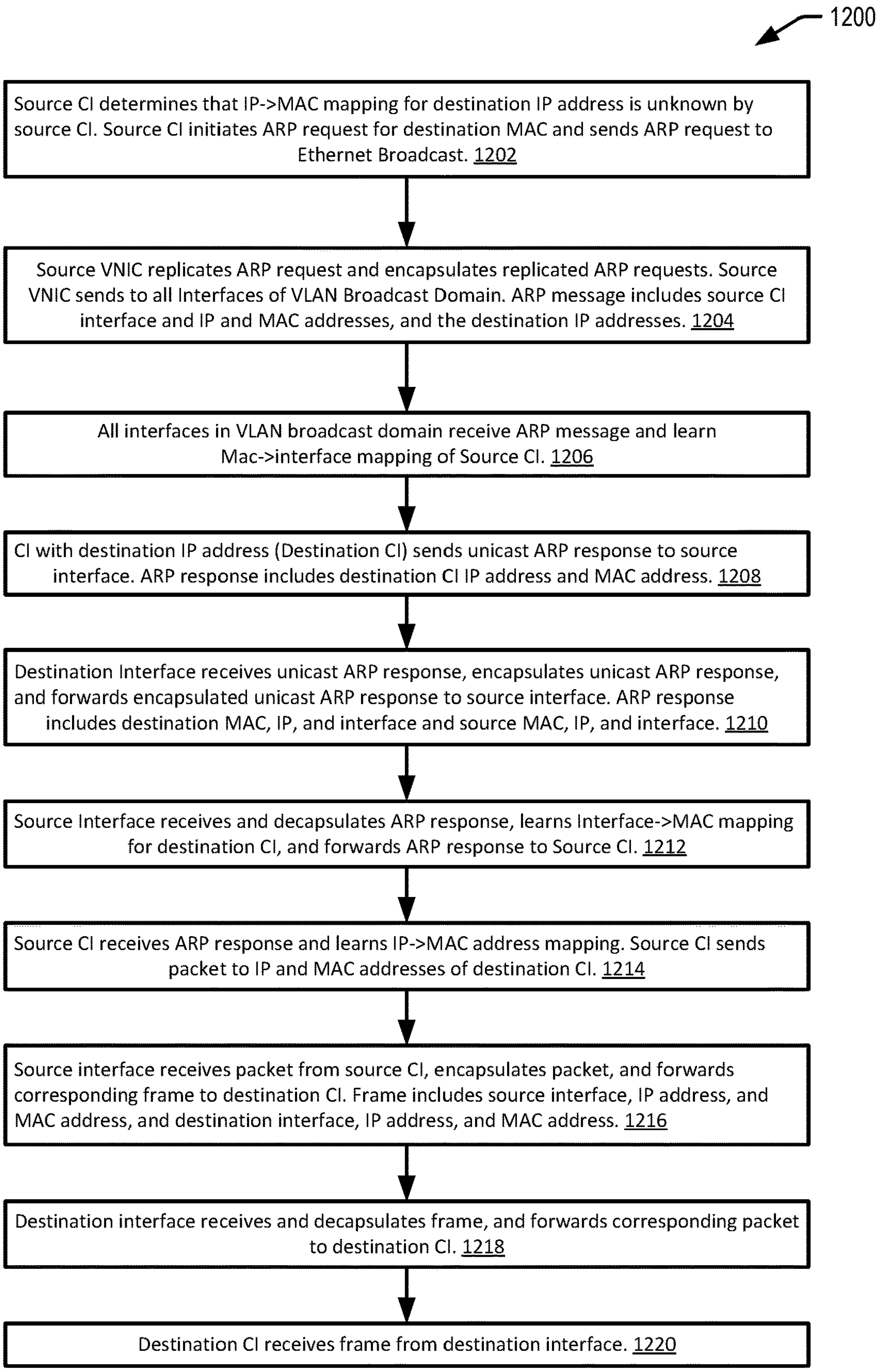
FIG. 12 is a flowchart illustrating a process 1200 for intra-VLAN communication according to certain embodiments.

With reference now to FIG. 12, a flowchart illustrating one embodiment of a process 1200 for intra-VLAN communication is shown. In some embodiments, the process 1200 can be performed by the compute instances within a common VLAN. The process can be specifically performed in the event that a source CI sends a communication to a destination CI within the VLAN, but does not know the IP-to-MAC address mapping of that destination CI. This can occur, for example, when a source CI sends a packet to a destination CI having an IP address in the VLAN, but the source CI does not know the MAC address for that IP address. In this case, an ARP process can be performed to learn the destination MAC address and the IP-to-MAC address mapping.

In the event that the source CI knows the IP-to-MAC address mapping, the source CI can send the packet directly to the destination CI, and the ARP process need not be performed. In some embodiments, this packet can be intercepted by the source VNIC, which source VNIC in intra-VLAN communication is an L2 VNIC. If the source VNIC knows the interface-to-MAC address mapping for the destination MAC address, then the source VNIC can encapsulate the packet, for example in an L2 encapsulation, and can forward the corresponding frame to the destination VNIC, which destination VNIC in intra-VLAN communication is an L2 VNIC, for the destination MAC address.

If the source VNIC does not know the interface-to-MAC address mapping for the MAC address, then the source VNIC can perform an aspect of an interface-to-MAC address learning process. This can include the source VNIC sending the frame to all interfaces within the VLAN. In some embodiments, this frame can be sent via broadcast to all of the interfaces within the VLAN. In some embodiments, this broadcast can be implemented at the physical network in the form of serial unicast. This frame can include the destination MAC and IP addresses, the interface identifier, and the MAC address and IP address of the source VNIC. Each of the VNICs in the VLAN can receive this frame and can learn the interface-to-MAC address mapping of the source VNIC.

Each of the receiving VNICs can further decapsulate the frame and forward the decapsualted frame (e.g., corresponding packet) to their associated CI. Each CI can include a network interface which can evaluate the forwarded packet. If the network interface determines that the CI having received the forwarded packet does not match the destination MAC and/or IP address, then the packet is dropped. If the network interface determines that the CI having received the forwarded frame matches the destination MAC and/or IP address, then the packet is received by the CI. In some embodiments, the CI having a MAC and/or IP address matching the destination MAC and/or IP address of the packet can send a response to the source CI, whereby the source VNIC can learn the interface-to-MAC address mapping of the destination CI, and whereby the source CI can learn the IP-to-MAC address mapping of the destination CI.

When the source CI does not know the IP-to-MAC address mapping, or when the source CI's IP-to-MAC address mapping for the destination CI is stale, then the process 1200 can be performed. Thus, when the IP-to-MAC address mapping is known, then the source CI can send the packet. When the IP-to-MAC address mapping is not known, then the process 1200 can be performed. When the interface-to-MAC address mapping is not known, the interface-to-MAC address learning process outlined above can be performed. When the interface-to-MAC address mapping is known, then the source VNIC can send the corresponding frame to the destination VNIC. The process 1200 begins at block 1202, wherein the source CI determines that the IP-to-MAC address mapping of the destination CI is unknown to the source CI. In some embodiments, this can include the source CI determining a destination IP address for a packet, and determining that the destination IP address is not associated with a MAC address stored in a mapping table of the source CI. Alternatively, the source CI can determine that the IP-to-MAC address mapping for the destination CI is stale. A mapping can be stale, in some embodiments, if the mapping has not been updated and/or verified within some time limit. Upon determining that the IP-to-MAC address mapping of the destination CI is unknown and/or stale to the source CI, the source CI initiates an ARP request for the destination IP address and sends the ARP request for Ethernet broadcast.

At block 1204, the source VNIC, also referred to herein as the source interface, receives the ARP request from the source CI. The source interface identifies all interfaces on the VLAN, and sends the ARP request to all interfaces on the VLAN broadcast domain. As previously mentioned, as the control plane knows all of the interfaces on the VLAN and provides that information to the interfaces with the VLAN, the source interface likewise knows all of the interfaces in the VLAN and is able to send the ARP request to each of the interfaces in the VLAN. To do this, the source interface replicates the ARP request and encapsulates one of the ARP requests for each of the interfaces on the VLAN. Each encapsulated ARP request includes the source CI interface identifier and source CI MAC and IP addresses, the target IP address, and the destination CI interface identifier. The source CI interface replicates an Ethernet broadcast by sending the replicated and encapsulated ARP requests (e.g., ARP messages) as serial unicast, one sent to each interface in the VLAN.

At block 1206, each interface in the VLAN broadcast domain receives and decapsulates an ARP messages. Each of the interfaces in the VLAN broadcast domain that receives the ARP message learns the interface-to-MAC address mapping of the source VNIC of the source CI (e.g., interface identifier of the source interface to MAC address of the source CI) as this message identifies the source CI MAC and IP addresses and the source CI interface identifier. As part of learning the interface-to-MAC address mapping for the source CI, each of the interfaces can update its mapping table (e.g., its L2 forwarding table), and can provide the updated mapping to its associated switch and/or CI. Each recipient interface, except the VSRS, can forward a decapsualted packet to their associated CI. The CI recipient of the forwarded decapsulated packet, and specifically the network interface of that CI, can determine if the target IP address matches the IP address of the CI. If the IP address of the CI associated with that interface does not match the destination CI IP address, then, in some embodiments, the packet is dropped by that CI, and no further action is taken. In the case of the VSRS, the VSRS can determine if the target IP address matches the IP address of the VSRS. If the IP address of the VSRS does not match the target IP address specified in the received packet, then, in some embodiments, the packet is dropped by the VSRS and no further action is taken.

If it is determined that the destination CI IP address specified in the received packet matches the IP address of the CI associated with the recipient interface (destination CI), then, and as indicated in block 1208, the destination CI sends a response, which can be a unicast ARP response to the source interface. This response includes the destination CI MAC address and destination CI IP address, and the source CI IP and MAC addresses. This response is received by the destination interface which encapsulates the unicast ARP response as indicated in block 1210. In some embodiments, this encapsulation can comprise GENEVE encapsulation. The destination interface can forward the encapsulated ARP response via the destination switch to the source interface. This response includes the destination CI MAC and IP addresses and destination CI interface identifier, and the source CI MAC and IP addresses and the source CI interface identifier.

At block 1212, the source interface receives and decapsulates the ARP response. The source interface can further learn the interface-to-MAC address mapping for the destination CI based on information contained in the encapsulation and/or in the encapsulated frame. The source interface can, in some embodiments, forward the ARP response to the source CI.

At block 1214, the source CI receives the ARP response. In some embodiments, the source CI can update a mapping table based on information contained in the ARP response, and specifically update a mapping table to reflect the IP-to-MAC address mapping based on the MAC and IP addresses of the destination CI. Subsequently, the source CI can then send a packet to the destination CI based on this MAC address. This packet can include the MAC address and interface identifier of the source CI as the source MAC address and source interface and the MAC address and interface identifier of the destination CI as the destination MAC address and destination interface.

At block 1216, the source interface can receive the packet from the source CI. The source interface can encapsulate the packet, and in some embodiments, this encapsulation uses a GENEVE encapsulation. The source interface can forward the corresponding frame to the destination CI, and specifically to the destination interface. The encapsulated frame can include the MAC address and interface identifier of the source CI as the source MAC address and source interface identifier and the MAC address and interface identifier of the destination CI as the destination MAC address and destination interface.

At block 1218, the destination interface receives the frame form the source interface. The destination interface can decapsulate the frame, and then can forward the corresponding packet to the destination CI. At block 1220, the destination CI receives the packet from the destination interface.

Span Ports

In an L2 physical network, a network administrator can configure a switch to copy frames received on a port and send the copies via another port. Such functionality can be referred to as span port functionality. Another similar functionality for targeted copying and transmission can be also provided by a network test access point (TAP). Generally, a TAP can be a device that is connected to the L2 physical network and that sits between two other devices of the L2 physical network. Using an internal splitter, the TAP generates and sends copies of the traffic for monitoring while the original traffic continues unimpeded through the L2 physical network.

In comparison, a customer of an L2 virtual network can similarly take advantage of span port functionalities and/or TAP functionalities despite the distributed nature of the L2 switch of the L2 virtual network. In addition, the L2 virtual network's architecture provides additional flexibility not available otherwise at an L2 physical network. For example, the customer can specify filtering criteria to trigger the copying, processing criteria (e.g., adding particular encapsulation to a copy), and a destination (which may reside in the L2 virtual network or in another network).

In the interest of clarity of explanation, embodiments of the present disclosure are described in connection with span ports. However, the embodiments similarly apply to TAP functionalities. In particular, a customer can specify filtering and processing criteria for copying frames. Information about such criteria is generated by a control plane and used by an NVD. Based on traffic to an L2 VNIC or from an L2 virtual switch hosted by the NVD, the NVD can apply the criteria to generate and send copies of the traffic without impeding the original traffic. This functionality can be implemented by the L2 virtual switch (as program code thereof) for egress traffic and corresponds, by the L2 VNIC (as program code thereof) for ingress traffic, and/or by another software module hosted by the NVD (in which case, the functionalities corresponds to tap functionalities).

Accordingly, the terms "span port" and "TAP" are used interchangeably herein and the description related to "span port" refers to the functionality of copying and sending copies of traffic without impeding the original traffic, and this functionality can be implemented as a true span port functionality (e.g., as part of the distributed L2 switch), as a pseudo-span port functionalities (e.g., as part of an L2 VNIC that is associated with an L2 virtual switch and emulates a port of a switch), or as a true TAP functionality (e.g. some other module hosted by an NVD).

Figure 13:
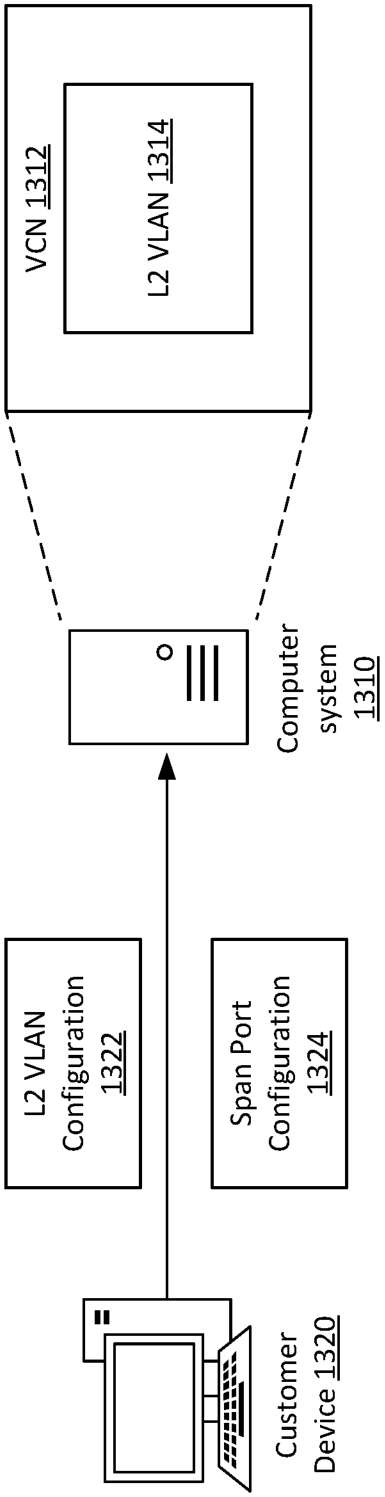
FIG. 13 illustrates an example environment suitable to define span ports for an L2 virtual network according to certain embodiments.

FIG. 13 illustrates an example environment suitable to define span ports for an L2 virtual network. In embodiments, the environment includes a computer system 1310 in communication with a customer device 1320 over one or more networks (not shown). The computer system 1310 can include a set of hardware computing resources that host a VCN 1312. A control plane hosted by one or more of the hardware computing resources can receive and process input from the customer device 1320 to deploy an L2 virtual network (shown as an L2 VLAN 1314 in FIG. 13) within the VCN 1312.

In an example, the input from the customer device 1320 can include various types of information. This information can be specified via a console or API calls and can include an L2 VLAN configuration 1322 and a span port configuration 1324, among other customer-specified configurations.

The L2 VLAN configuration 1322 can indicate, for instance, the number, type(s), and configuration(s) of L2 compute instances to be included in the L2 VLAN 1314. In addition, the L2 VLAN configuration 1322 can indicate customer-specified names of ports on the customer-perceived vswitch, MAC addresses of L2 compute instances, and the associations between the ports and the MAC addresses (or, more generally, the L2 compute instances). For example, the customer can specify that the L2 VLAN 1314 needs to includes two L2 compute instances, the first one having a MAC address M.1 and is associated with a first port named P1, the first one having a MAC address M.2 and is associated with a second port named P2.

The span port configuration 1324 can indicate, for instance, one or more criteria for copying frames and, possibly, further processing the copied frames. These criteria generally include filtering criteria that can be applied to determine whether a copy needs to be made and processing criteria that indicate the type of processing to apply to the copy. In an example, the customer can specify filtering criteria on any header information including, for instance, source MAC address, destination MAC address, source IP address, destination IP address, and/or protocol. The filtering criteria can additionally or alternatively indicate a source port, a destination port, a source of the traffic (e.g., a compute instance within the L2 VLAN or a source outside of the L2 VLAN), and/or a destination of the traffic (e.g., a compute instance within the L2 VLAN or a source outside of the L2 VLAN). As far as the processing criteria, the customer can specify, among other things, the number of copies to make, any encapsulation to add to a copy (e.g., add generic routing encapsulation (GRE) or virtual extensible LAN (VXLAN) encapsulation to a frame copy). Adding encapsulation can allow a destination to distinguish received copies as being span traffic from other received traffic that is regular or non-span traffic. For the destination, the customer can specify a MAC address, an IP address, a port, a compute instance within the L2 VLAN, a compute instance on another L2 VLAN, a compute instance on a virtual L3 network, a host outside the L2 VLAN (e.g., a host in an on-premise network of the customer), or any other type of destination to receive copies. Although a single destination is described, the customer can specify multiple destinations of the same type or of different types. Further, the customer may specify whether the filtering and processing (e.g., copying and, as applicable, encapsulation) is to be performed on the egress (e.g., at the source port or source L2 VNIC) or ingress (e.g., at the destination port or destination L2 VNIC).

For example, the customer may specify that traffic received on port 1 (corresponding to L2 VNIC 1) should be copied and sent to port n (corresponding to L2 VNIC n). In a more elaborate definition, the customer can specify that traffic with IP address X.1, MAC address A.1, TCP port 80 and should be copied and sent to port n. In a further illustration, rather than sending or in addition to sending the copies to port n, the customer can specify that the copied traffic is to be encapsulated with a particular encapsulation scheme and sent to a host on the customer's on-premise network.

The control plane receives the various information to then deploy and manage the different resources of the L2 VLAN 1314, and generate and distribute the relevant span port information to these resources. For instance, the L2 VLAN 1314 is configured according to the L2 VLAN configuration 1322 and includes the requested L2 compute instances hosted on host machines, and L2 VNIC-L2 virtual switch pairs hosted on NVDs. To generate the span port information, the control plane translates, based on a mapping between the customer-specified L2 VLAN configuration 1322 and the actual topology of the L2 VLAN 1314, the customer definitions from criteria that use the span port configuration 1324 to criteria that use the actual topology of the L2 VLAN 1314. For instance, each L2 VNIC emulates a port and the control plane associates the L2 VNIC (e.g., its interface identifier, its IP address, and/or the IP address of the NVD hosting the L2 VNIC) with the port's name and with the specified MAC address. Rather than using the port names, the span port information indicates frame copying and, possibly, further processing by identifying the relevant L2 VNICs (e.g., their interface identifiers, their IP addresses, and/or the IP addresses of the NVDs hosting the L2 VNICs). An NVD hosting an L2 VNIC with which span port information is associated receives and applies this span port information so that the NVD can perform traffic-flow enforcement.

Figure 14:
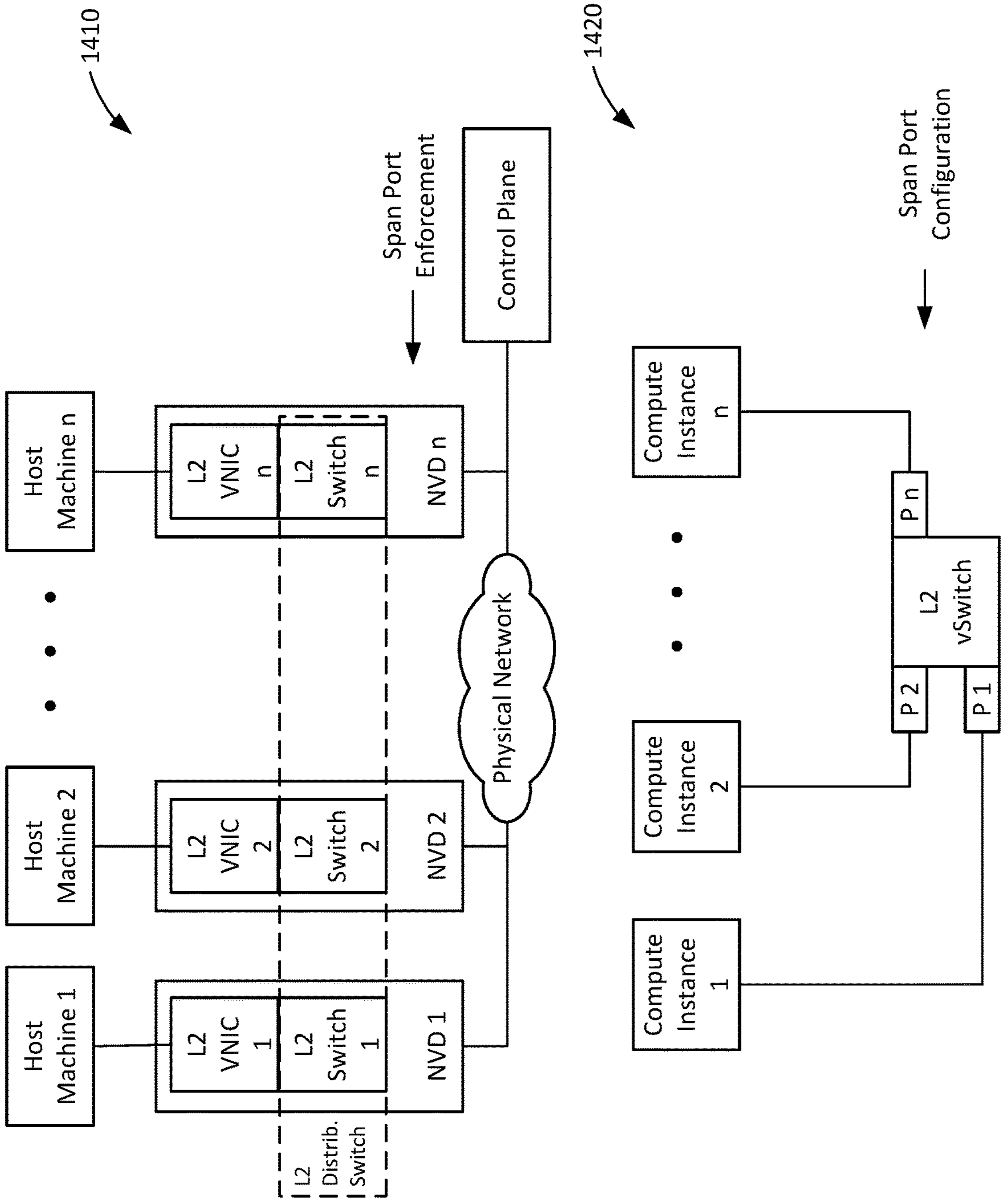
FIG. 14 illustrates an example span port technique in a VLAN according to certain embodiments.

FIG. 14 illustrates an example span port technique in a VLAN according to certain embodiments. The Layer 2 virtual network is referred to herein as a VLAN. The top portion of FIG. 14 illustrates an implementation view 1410 of the VLAN. The bottom portion of FIG. 14 illustrates a customer presentation 1420 of the VLAN.

As described herein above, the VLAN can include "n" compute instances, each of which executes on a host machine. Although FIG. 14 illustrates a one-to-one association between a compute instance and a host machine, a many-to-one association is possible, where one host machine can execute multiple compute instances. Each compute instance is associated with at least one virtual interface (e.g., an L2 VNIC) and a switch (e.g., an L2 virtual switch). The pair of VNIC and switch associated with a compute instance on a host machine can be a pair of software module on a NVD connected to the host machine. Each L2 VNIC represents an L2 port of the customer's vswitch. In the illustration of FIG. 14, host machine "i" executes a compute instance "i" and is connected to NVD "i". In turn, NVD "i" executes VNIC "i" and "switch "i". VNIC "i" represents an L2 port "i" of the vswitch. "i" is a positive integer between 1 and "n". Here also, although one-to-one associations are described, other types of associations are possible. For instance, a single NVD can be connected to multiple hosts, each executing one or more compute instances that belong to the VLAN. If so, the NVD hosts multiple pairs of VNIC and switch, each corresponding to one of the compute instances.

Input of the customer can be received by a system of the VCN that includes the VLAN (e.g., a control plane of the VCN). The input can be received via API calls and/or a console and can specify a VLAN configuration, as well as a span port configuration for the VLAN. The span port configuration can include filtering criteria and processing criteria, indicate one or more destinations to receive frame copies, and can be specific to a port, a set of ports, or the entire vswitch.

In an example, and as described herein above, an L2 VNIC of an NVD learns interface-to-MAC address mapping based on the ingress traffic. Such a mapping can be sent to the system, along with an identifier of the VLAN. The system can receive similar mappings from the different NVDs hosting different L2 VNICs and generate a mapping between interface identifiers, MAC addresses, physical IP addresses (e.g., of NVDs), and VLAN identifiers.

For example, VNIC 1 learns that M.2 (the overlay MAC address of compute instance 2) is associated with ID.2 (the interface identifier of L2 VNIC 2) and with IP.2 (the physical address of NVD 2), and that M.n (the overlay MAC address of compute instance n) is associated with ID.n (the interface identifier of L2 VNIC n) and with IP.n (the physical address of NVD n). Similarly, VNIC 2 learns that M.1 (the overlay MAC address of compute instance 1) is associated with ID.1 (the interface identifier of L2 VNIC 1) and with IP.1 (the physical address of NVD 1). These associations are reported as part of the mappings to the system that, in turn, can generate a mapping of: {customer 1; M.1→ID.1, IP.1; VLAN A}, {customer 1, M.2→ID.2, IP.2; VLAN A}, . . . , {customer 1, M.n→ID.n, IP.n; VLAN A}.

Further, the system can generate and maintain a mapping between the port VLAN configuration and a distribution of resources of the VLAN on the physical network. For example, this mapping indicates that port "i" is configured for compute instance "i" and corresponds to L2 VNIC "i," which is in turn is associated with L2 virtual switch "i," and this pair is hosted by NVD "i." This mapping can be expressed as {customer 1; CI.1→P.1; P.1→M.1; M.1→ID.1, SW.1, IP.1; VLAN A}, wherein "CI.1" identifies compute instance 1 (using the nomenclature defined by the customer), P.1 identifies port 1 (using the nomenclature defined by the customer), M.1 identifies the MAC address associated with compute instance 1, ID.1 identifies the L2 VNIC 1, SW.1 identifies the L2 virtual switch 1, IP.1 identifies the IP address of NVD 1, and VLAN A identifies the VLAN.

Based on the mapping between the VLAN configuration and the distribution of resources of the VLAN on the physical network, the system can generate, from the customer-specified span port information, updated span port information that includes updated criteria can indicate updated destinations. Generally, the customer-specified filtering criteria uses customer-perceived parameters (e.g., indicate a port using a nomenclature defined by the customer in the VLAN configuration). These parameters can be updated to use the L2 VLAN topology parameters (e.g., an identifier of the corresponding L2 VNIC). The processing criteria typically do not use customer-perceived parameters and need not be updated. A destination indicated by the customer-specified span port may be updated also (e.g., if the customer identifies a port to which copies could be sent, this port destination is updated to indicate a corresponding L2 VNIC; in comparison, if the customer identified an L2 compute instance as the destination, no update may be needed).

To illustrate, consider the following three examples that reference the NVDs. In a first example, the customer specifies that ingress frames received on port 1 are to be copied and sent to port n. In this case, the control plane generates span port information indicating that frames having M.1 as the destination MAC address are to be copied and sent to L2 VNIC n. NVD 1 receives and stores this span information for L2 VNIC 1. Upon receiving a frame originating from M.2 (e.g., compute instance 2) and destined to M.1, L2 VNIC 1 determines that the filtering criteria is met and makes a copy, replacing M.1 with M.n. This copy is forwarded to L2 switch 1 that then sends it L2 VNIC n.

In a second example, the customer specifies that egress frames received on port 1 from port 2 are to be copied and sent to port n. In this case, the control plane generates span information indicating that frames having M.1 as the destination MAC address and M.2 as the source MAC address are to be copied and sent to VNIC n. NVD 2, instead of NVD 1, receives and stores this span information for VNIC 2. Upon receiving a frame of L2 compute instance 2 having M.1 and M.2 as the destination and source MAC addresses, L2 VNIC 2 determines that the filtering criteria is met and makes a copy, replacing M.1 with M.n. This copy is forwarded to L2 switch 2 that then sends it L2 VNIC n.

In a third example, the customer specifies that frames received on port 1 from port 2 are to be copied, GRE encapsulated, and sent to a host having IP address X.1 on its on-premise network. In this case, the control plane generates span information indicating that frames having M.1 as the destination MAC address and M.2 as the source MAC address are to be copied and sent to the VSRS VNIC. NVD 1 for ingress and/or NVD 2 for egress receive and store this span information for L2 VNIC 1. For illustrative purpose, this example assumes ingress filtering and processing but similarly apply to egress. Upon receiving a frame originating from M.2 (e.g., compute instance 2) and destined to M.1, L2 VNIC 1 determines that the filtering criteria is met and makes a copy, replacing M.1 with the default gateway MAC address (e.g., M.DG). Further, L2 VNIC 1 adds GRE encapsulation and the host's IP address to the header. This copy is forwarded to the VSRS VNIC for routing to the on-premise network.

Figure 15:
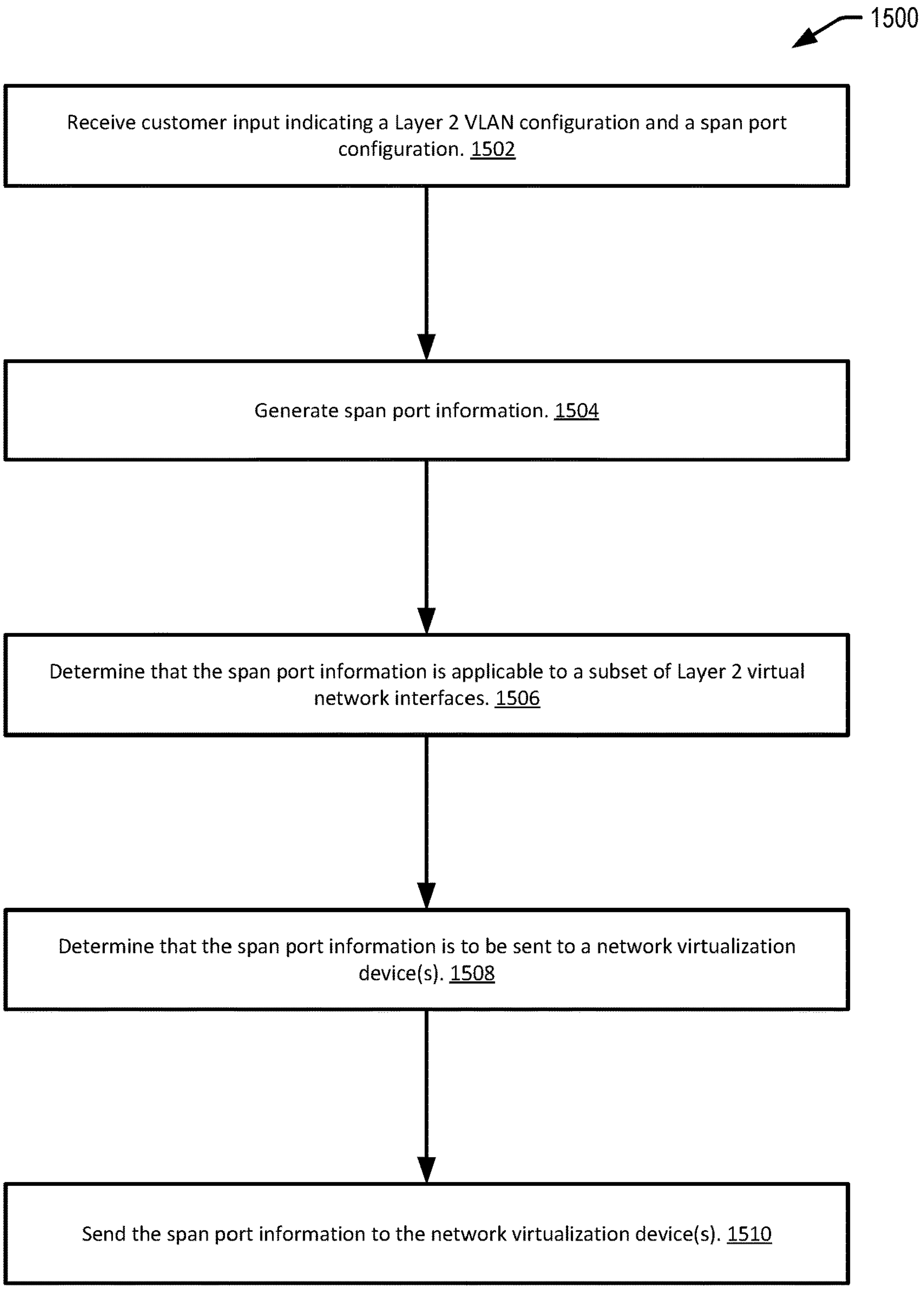
FIG. 15 is a flowchart illustrating a process for distributing span port information in a Layer 2 virtual network according to certain embodiments.

With reference now to FIG. 15, a flowchart illustrating a process 1500 for distributing span port information in a Layer 2 virtual network is shown. In some embodiments, the process 1500 can be performed by a control plane, or another VCN system, that manages the deployment of the Layer 2 virtual network on an underlying physical network.

The process 1500 begins at block 1502, where the control plane receives customer input indicating a Layer 2 VLAN configuration and a span port configuration. In some embodiments, the customer input is received from a customer device via API calls and/or a console.

At block 1504, the control plane generates span port information based on the customer input. In some embodiments, the control plane deploys the L2 VLAN according to the L2 VLAN configuration indicated in the customer input. Based on this deployment, the control plane determines and tracks over time the topology of the L2 VLAN by determining and tracking the placement of the L2 compute instances on host machines and the placement of L2 VNICs and L2 virtual switches on NVDs, where the L2 VLAN includes the L2 compute instances, L2 VNICs, and L2 virtual switches. The topology information can indicate, per L2 compute instance, the associated L2 VNIC (and corresponding interface identifier), the associated MAC address (which can be indicated in the customer input), the associated IP address of the L2 VNIC (which can also be indicated in the customer input), and the associated IP address of the NVD hosting the L2 VNIC, among other attributes of the L2 VLAN's topology. Further, the control plane can translate customer-specified names of ports to topology information about the corresponding L2 VNICs that emulate these ports and can then generate the span port information by updating the customer-specified span port configuration to use the topology information rather than the customer definitions.

At block 1506, the control plane determines that the span port information is applicable to a subset of the L2 VNICs. In some embodiments, the customer can indicate, in the above described input, that the span port configuration is applicable to some but not all the ports of the customer perceived vswitch. In addition, the span port configurations can differ between these ports. In this case, the control plane can determine the L2 VNICs that correspond to the indicated ports and can generate the relevant span port information for each of such L2 VNICS. Further, the control plane can maintain a mapping of the specific span port information that applies to each L2 VNIC.

At block 1508, the control plane determines that the span port information is to be sent to a set of NVDs. In some embodiments, the control plane uses the mapping of block 1506 to determine the subset of L2 VNICs subject to span ports. Based on the topology information, the control plane determine the NVDs that host such L2 VNICs. Accordingly, the control plane determines the specific span port information that each NVD should receive. For instance, if a first NVD hosts two L2 VNICs each associated with its own specific span port information, this first NVD is to receive the first span port information specific to the first L2 VNIC and the second span port information specific to the second L2 VNIC. Similarly, if a second NVD hosts one L2 VNIC associated with its own specific span port information, the second NVD is to receive this span port information. Yet, if a third NVD hosts one or more L2 VNICs that are not associated with any span port information, the third NVD is not to receive any span port information.

At block 1510, the control plane sends the span port information to the set of NVDs. In an example, each span port information is sent to the relevant NVD during the deployment of the L2 VLAN and/or in a push mechanism or a pull mechanism after deployment.

Figure 16:
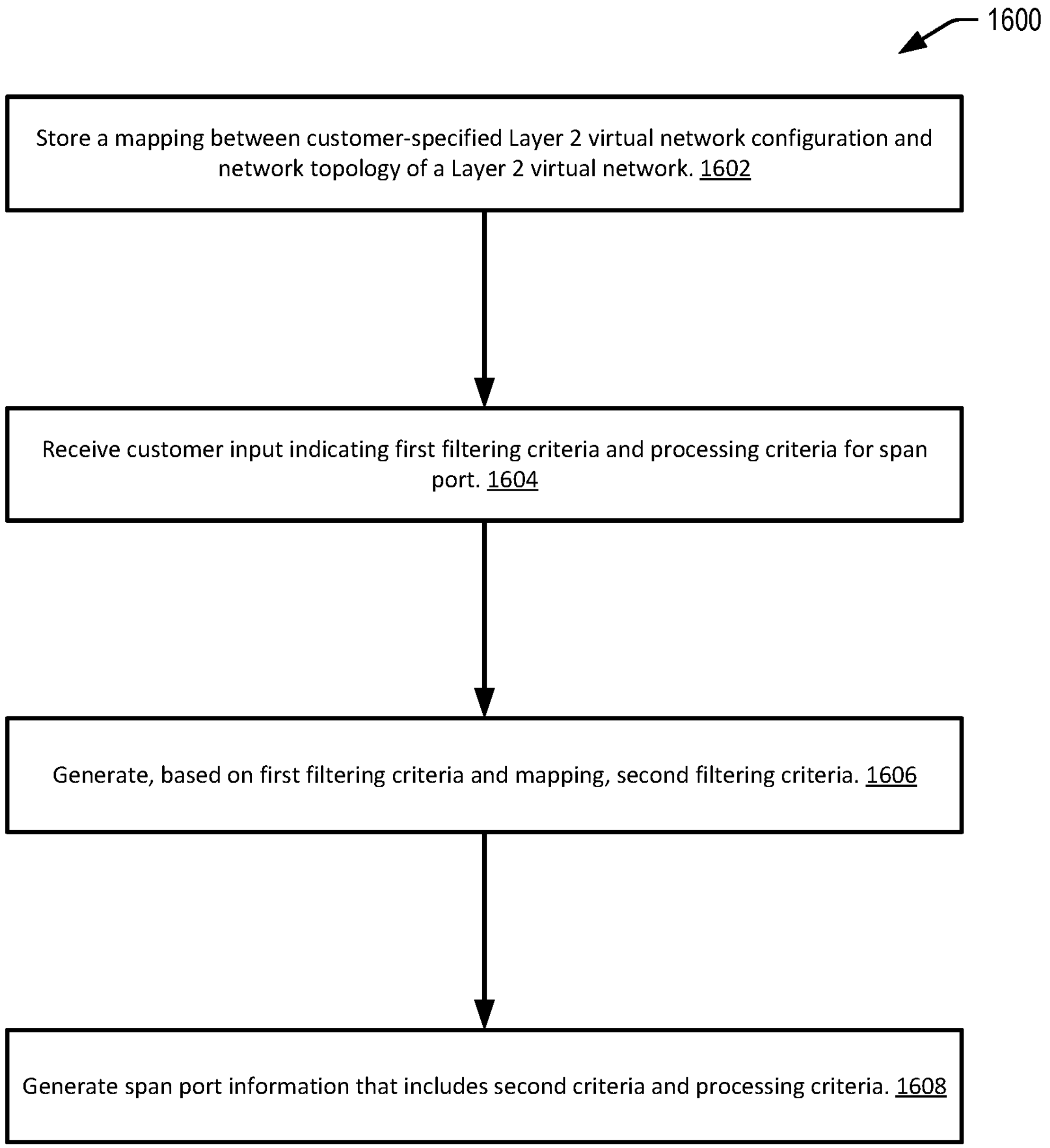
FIG. 16 is a flowchart illustrating a process for generating span port information according to certain embodiments.

With reference now to FIG. 16, a flowchart illustrating a process 1600 for generating span port information according to certain embodiments. In some embodiments, the process 1600 can be performed by a control plane, or another VCN system, that manages the deployment of the Layer 2 virtual network on an underlying physical network.

The process 1600 begins at block 1602, where the control plane stores a mapping between customer-specified Layer 2 virtual network configuration and network topology of a Layer 2 virtual network. In some embodiments, the control plane receives input of the customer that specifies a VLAN configuration. The control plane also tracks the deployment of the resources of the L2 virtual network on the physical network and receives information from the NVD about ingress traffic learning. Given the deployment and the ingress traffic learning, the control plane generates the mapping.

At block 1604, the control plane receives customer input indicating first filtering criteria and processing criteria for span port. In some embodiments, the customer input can be received from a customer device via API calls and/or a console. The first filtering criteria can use customer-defined parameters (e.g., copy frames received on a particular port having a nomenclature defined by the customer). In comparison, the processing criteria may use network definitions of parameters (e.g., GRE encapsulate a copy). In addition, the customer input can indicate a destination to which a frame copy can be sent. This destination may be specified using a customer definition (e.g., send the frame copy to a particular port) or a network definition (e.g., send the frame copy to an L2 compute instance).

At block 1606, the control plane generates, based on the first filtering criteria and the mapping, second filtering criteria. In some embodiments, the control plane translates the customer-defined parameters to parameters specific to the topology of the L2 virtual network. For instance, whereas the first filtering criteria include an identifier of port, an identifier of a corresponding L2 VNIC is included instead in the second filtering criteria. Similarly, if a destination is specified using a customer definition, this customer definition can be updated to a network definition based on the mapping, and the network definition can be included instead in the span port information.

At block 1608, the control plane generates span port information that includes the second criteria and the processing criteria. In some embodiments, the span port configuration specified by the customer is updated, whereby the first filtering criteria is replaced with the second filtering criteria. Further, if a destination is updated, the updated destination is included in the span port information.

Figure 17:
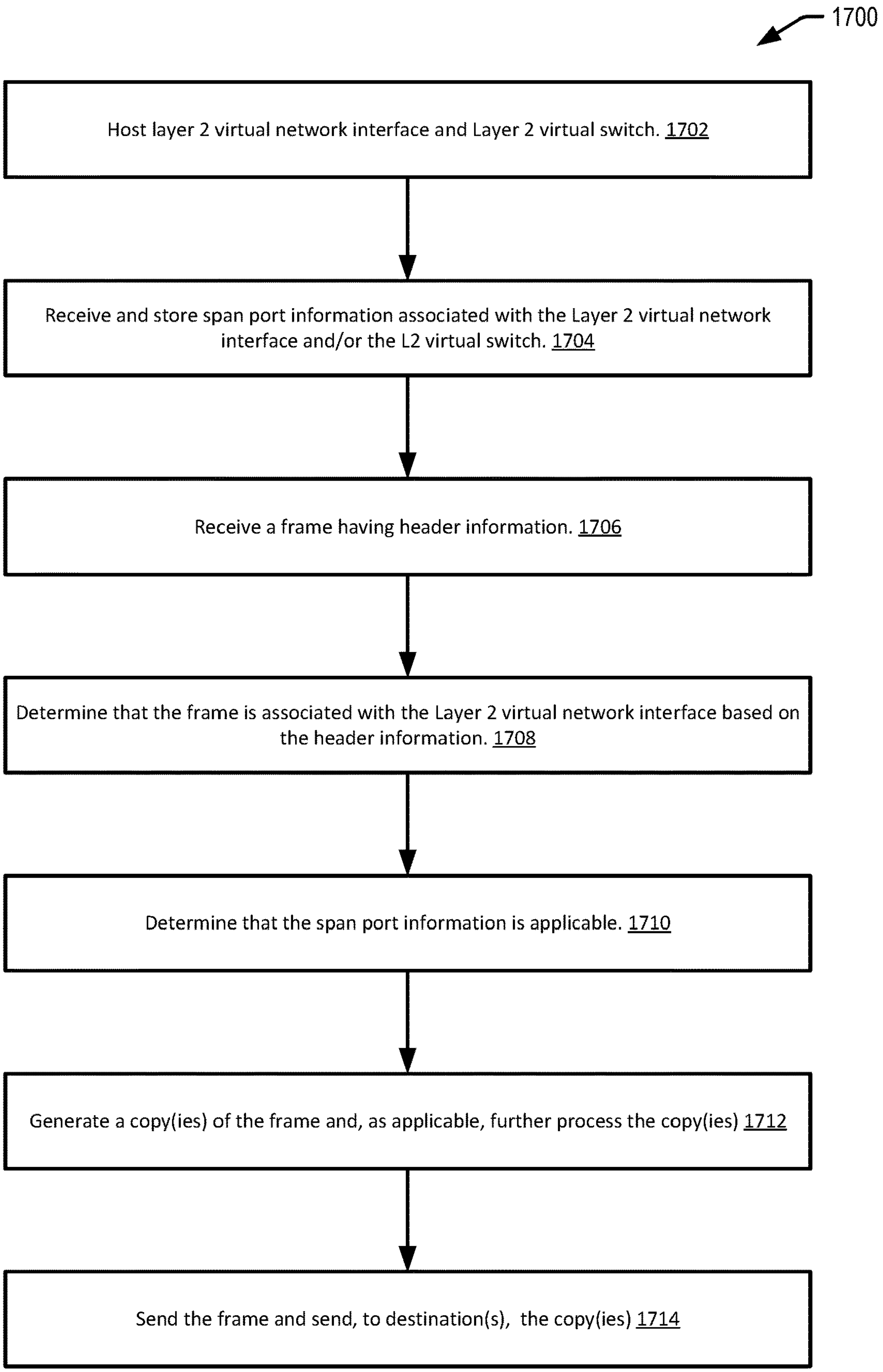
FIG. 17 is a flowchart illustrating a process for using span port information according to certain embodiments.

With reference now to FIG. 17, a flowchart illustrating a process 1700 for using span port information. In some embodiments, the process 1700 can be performed by an NVD that hosts an L2 VNIC-L2 virtual switch pair to which span port can be applicable.

The process 1700 begins at block 1702, wherein the NVD hosts an L2 VNIC and an L2 virtual switch that belong to an L2 virtual network of a customer (e.g., a VLAN). In some embodiments, the L2 VNIC and the L2 virtual switch are associated with an L2 compute instance of the L2 virtual network. This L2 compute instance can be hosted on a host machine communicatively coupled to the NVD.

At block 1704, the NVD receives and stores span port information associated with the L2 VNIC and/or the L2 virtual switch. In some embodiments, the NVD receives the span port information from a control plane. The span port information can include one or more filtering criteria and/or one or more processing criteria, and can indicate one or more destinations for receiving frame copies.

At block 1706, the NVD receives a frame having a header information. In some embodiments, the frame can be received from the L2 compute instance via the host machine (in which case, the frame is an egress frame being sent from the L2 compute instance). In some embodiments, the frame can be received from another L2 compute instance via another host machine (in which case, the frame is an ingress frame being sent to the L2 compute instance).

At block 1708, the NVD determines that the frame is associated with the L2 VNIC based on the header information. In the various embodiments, the header information includes an interface identifier and/or a MAC address associated with the L2 VNIC. The NVD can use the interface identifier and/or MAC address to determine that the frame is to be processed by the L2 VNIC.

At block 1710, the NVD determines that the span port information is applicable. In some embodiments, the span port information indicates one or more filtering criteria. The NVD parses the header information for comparison with the one or more filtering criteria. If a match is found based on the comparison, the NVD determines that the frame is to be copied. Based on the one or more processing criteria, the NVD determines the number of copies to generate and any additional processing to apply thereto (e.g., any encapsulation). Further, the NVD determines, based on the span port information, one or more destinations to receive the frame copy(ies).

At block 1712, the NVD generates a copy(ies) of the frame and, as applicable, further process the copy(ies). In some embodiments, the NVD does not alter the payload of the frame. Instead, the NVD updates the header information and uses the updated header information to form, with the original payload, a frame copy. The updated header information can change a destination address, a protocol identifier, and/or can include encapsulation information.

At block 1712, the NVD sends the frame and sends, to the destination(s), the copy(ies) of the frame. In some embodiments, the NVD does not alter the original frame. For example, if the frame is an ingress frame to the L2 compute instance, the L2 VNIC processes this frame for passing it to the L2 compute instance. If the frame is an egress frame from the L2 compute instance, the L2 VNIC passes this frame to the L2 virtual switch for further processing and sending to a destination L2 VNIC. In comparison, sending a copy typically involves an egress path. Accordingly, the L2 VNIC passes a frame copy to the L2 virtual switch for further processing and sending to a destination L2 VNIC.

Figure 18:
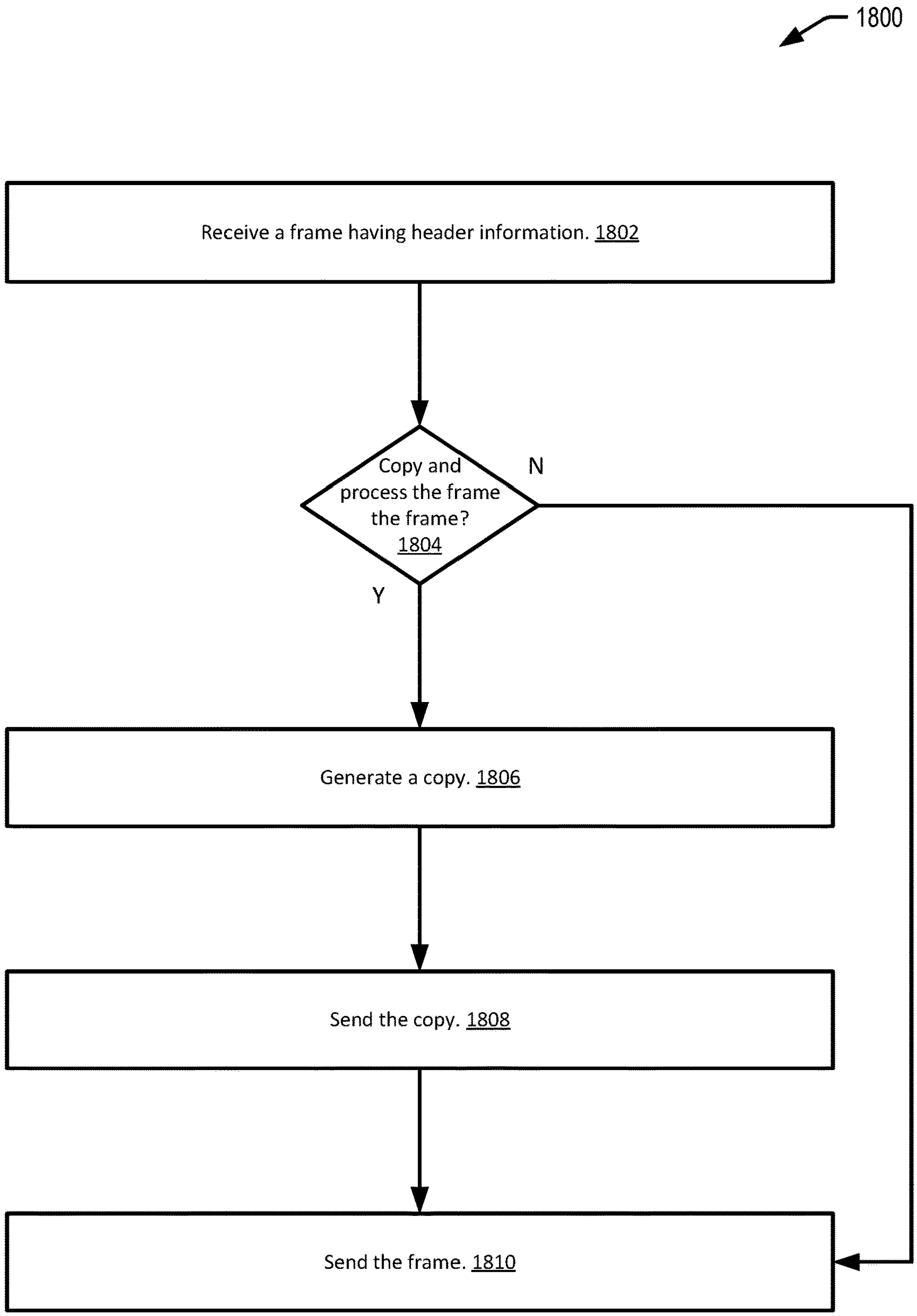
FIG. 18 is a flowchart illustrating a process for determining whether span port information is applicable according to certain embodiments.

With reference now to FIG. 18, a flowchart illustrating a process 1800 for determining whether span port information is applicable. In some embodiments, the process 1800 can be performed by an NVD that hosts an L2 VNIC to which the span port can be applicable. In comparison to the process 1700, the process 1800 can include adding the span port information (or a portion thereof) in a frame such that the enforcement of the span port information can be performed at various nodes between the source compute instance and the destination compute instance.

The process 1800 begins at block 1802, wherein the NVD receives a frame having header information. In some embodiments, the frame can be received from the L2 compute instance via the host machine (in which case, the frame is an egress frame being sent from the L2 compute instance). In some embodiments, the frame can be received from another L2 compute instance via another host machine (in which case, the frame is an ingress frame being sent to the L2 compute instance).

At block 1804, the NVD determines whether the frame can be copied and whether the copy should be further processed. If the frame is to be copied, block 1806 follows block 1804, Otherwise, block 1810 follows block 1804. In some embodiments, the determination involves the header information and the span port information. In particular, the NVD parses the header information for comparison with the filtering criteria. If a match is found based on the comparison, the NVD determines that the frame is to be copied. Based on the processing criteria, the NVD determines the type of processing to apply to the copy. Although a filtering criteria match may be found, the applicability of the span port information can depend on whether the customer requested the copying on the ingress flow and/or the egress flow. This flow directionality can be indicated in the span port information. Accordingly, prior to or after determining the filtering criteria match, the NVD can determine a flow match (e.g., if the frame is being received and the flow directionality is ingress, or if the frame is being sent and the flow directionality is egress). When also a flow match is found, the NVD determines that the frame can be copied.

At block 1806, the NVD generates a copy to the frame. In some embodiments, the NVD copies the payload and alters the header information per the filtering and processing criteria to generate the copy. Alternatively, the NVD copies the payload and the header information and adds encapsulating header information per the filtering and processing criteria to generate the copy.

At block 1808, the NVD sends the copy. In some embodiments, the copy is sent to a destination indicated by the span port information.

At block 1810, the NVD sends the frame. In some embodiments, the frame is sent to the destination indicated by the header information. The frame sending can be performed prior to, in parallel with, or subsequent to any of blocks 1804, 1806, 1808, or 1810.

C—Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 19 is a block diagram 1900 illustrating an example pattern of an IaaS architecture, according to at least one embodiment. Service operators 1902 can be communicatively coupled to a secure host tenancy 1904 that can include a virtual cloud network (VCN) 1906 and a secure host subnet 1908. In some examples, the service operators 1902 may be using one or more client computing devices, which may be portable handheld devices (e.g., an iPhone®, cellular telephone, an iPad®, computing tablet, a personal digital assistant (PDA)) or wearable devices (e.g., a Google Glass® head-mounted display), running software such as Microsoft Windows Mobile®, and/or a variety of mobile operating systems such as iOS, Windows Phone, Android, BlackBerry 8, Palm OS, and the like, and be Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as, for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1906 and/or the Internet.

The VCN 1906 can include a local peering gateway (LPG) 1910 that can be communicatively coupled to a secure shell (SSH) VCN 1912 via an LPG 1910 contained in the SSH VCN 1912. The SSH VCN 1912 can include an SSH subnet 1914, and the SSH VCN 1912 can be communicatively coupled to a control plane VCN 1916 via the LPG 1910 contained in the control plane VCN 1916. Also, the SSH VCN 1912 can be communicatively coupled to a data plane VCN 1918 via an LPG 1910. The control plane VCN 1916 and the data plane VCN 1918 can be contained in a service tenancy 1919 that can be owned and/or operated by the IaaS provider.

The control plane VCN 1916 can include a control plane demilitarized zone (DMZ) tier 1920 that acts as a perimeter network (e.g., portions of a corporate network between the corporate intranet and external networks). The DMZ-based servers may have restricted responsibilities and help keep security breaches contained. Additionally, the DMZ tier 1920 can include one or more load balancer (LB) subnet(s) 1922, a control plane app tier 1924 that can include app subnet(s) 1926, a control plane data tier 1928 that can include database (DB) subnet(s) 1930 (e.g., frontend DB subnet(s) and/or backend DB subnet(s)). The LB subnet(s) 1922 contained in the control plane DMZ tier 1920 can be communicatively coupled to the app subnet(s) 1926 contained in the control plane app tier 1924 and an Internet gateway 1934 that can be contained in the control plane VCN 1916, and the app subnet(s) 1926 can be communicatively coupled to the DB subnet(s) 1930 contained in the control plane data tier 1928 and a service gateway 1936 and a network address translation (NAT) gateway 1938. The control plane VCN 1916 can include the service gateway 1936 and the NAT gateway 1938.

The control plane VCN 1916 can include a data plane mirror app tier 1940 that can include app subnet(s) 1926. The app subnet(s) 1926 contained in the data plane mirror app tier 1940 can include a virtual network interface controller (VNIC) 1942 that can execute a compute instance 1944. The compute instance 1944 can communicatively couple the app subnet(s) 1926 of the data plane mirror app tier 1940 to app subnet(s) 1926 that can be contained in a data plane app tier 1946.

The data plane VCN 1918 can include the data plane app tier 1946, a data plane DMZ tier 1948, and a data plane data tier 1950. The data plane DMZ tier 1948 can include LB subnet(s) 1922 that can be communicatively coupled to the app subnet(s) 1926 of the data plane app tier 1946 and the Internet gateway 1934 of the data plane VCN 1918. The app subnet(s) 1926 can be communicatively coupled to the service gateway 1936 of the data plane VCN 1918 and the NAT gateway 1938 of the data plane VCN 1918. The data plane data tier 1950 can also include the DB subnet(s) 1930 that can be communicatively coupled to the app subnet(s) 1926 of the data plane app tier 1946.

The Internet gateway 1934 of the control plane VCN 1916 and of the data plane VCN 1918 can be communicatively coupled to a metadata management service 1952 that can be communicatively coupled to public Internet 1954. Public Internet 1954 can be communicatively coupled to the NAT gateway 1938 of the control plane VCN 1916 and of the data plane VCN 1918. The service gateway 1936 of the control plane VCN 1916 and of the data plane VCN 1918 can be communicatively coupled to cloud services 1956.

In some examples, the service gateway 1936 of the control plane VCN 1916 or of the data plane VCN 1918 can make application programming interface (API) calls to cloud services 1956 without going through public Internet 1954. The API calls to cloud services 1956 from the service gateway 1936 can be one-way: the service gateway 1936 can make API calls to cloud services 1956, and cloud services 1956 can send requested data to the service gateway 1936. However, cloud services 1956 may not initiate API calls to the service gateway 1936.

In some examples, the secure host tenancy 1904 can be directly connected to the service tenancy 1919, which may be otherwise isolated. The secure host subnet 1908 can communicate with the SSH subnet 1914 through an LPG 1910 that may enable two-way communication over an otherwise isolated system. Connecting the secure host subnet 1908 to the SSH subnet 1914 may give the secure host subnet 1908 access to other entities within the service tenancy 1919.

The control plane VCN 1916 may allow users of the service tenancy 1919 to set up or otherwise provision desired resources. Desired resources provisioned in the control plane VCN 1916 may be deployed or otherwise used in the data plane VCN 1918. In some examples, the control plane VCN 1916 can be isolated from the data plane VCN 1918, and the data plane mirror app tier 1940 of the control plane VCN 1916 can communicate with the data plane app tier 1946 of the data plane VCN 1918 via VNICs 1942 that can be contained in the data plane mirror app tier 1940 and the data plane app tier 1946.

In some examples, users of the system, or customers, can make requests, for example create, read, update, or delete (CRUD) operations, through public Internet 1954 that can communicate the requests to the metadata management service 1952. The metadata management service 1952 can communicate the request to the control plane VCN 1916 through the Internet gateway 1934. The request can be received by the LB subnet(s) 1922 contained in the control plane DMZ tier 1920. The LB subnet(s) 1922 may determine that the request is valid, and in response to this determination, the LB subnet(s) 1922 can transmit the request to app subnet(s) 1926 contained in the control plane app tier 1924. If the request is validated and requires a call to public Internet 1954, the call to public Internet 1954 may be transmitted to the NAT gateway 1938 that can make the call to public Internet 1954. Memory that may be desired to be stored by the request can be stored in the DB subnet(s) 1930.

In some examples, the data plane mirror app tier 1940 can facilitate direct communication between the control plane VCN 1916 and the data plane VCN 1918. For example, changes, updates, or other suitable modifications to configuration may be desired to be applied to the resources contained in the data plane VCN 1918. Via a VNIC 1942, the control plane VCN 1916 can directly communicate with, and can thereby execute the changes, updates, or other suitable modifications to configuration to, resources contained in the data plane VCN 1918.

In some embodiments, the control plane VCN 1916 and the data plane VCN 1918 can be contained in the service tenancy 1919. In this case, the user, or the customer, of the system may not own or operate either the control plane VCN 1916 or the data plane VCN 1918. Instead, the IaaS provider may own or operate the control plane VCN 1916 and the data plane VCN 1918, both of which may be contained in the service tenancy 1919. This embodiment can enable isolation of networks that may prevent users or customers from interacting with other users', or other customers', resources.

Also, this embodiment may allow users or customers of the system to store databases privately without needing to rely on public Internet 1954, which may not have a desired level of security, for storage.

In other embodiments, the LB subnet(s) 1922 contained in the control plane VCN 1916 can be configured to receive a signal from the service gateway 1936. In this embodiment, the control plane VCN 1916 and the data plane VCN 1918 may be configured to be called by a customer of the IaaS provider without calling public Internet 1954. Customers of the IaaS provider may desire this embodiment since database(s) that the customers use may be controlled by the IaaS provider and may be stored on the service tenancy 1919, which may be isolated from public Internet 1954.

FIG. 20 is a block diagram 2000 illustrating another example pattern of an IaaS architecture, according to at least one embodiment. Service operators 2002 (e.g., service operators 1902 of FIG. 19) can be communicatively coupled to a secure host tenancy 2004 (e.g., the secure host tenancy 1904 of FIG. 19) that can include a virtual cloud network (VCN) 2006 (e.g., the VCN 1906 of FIG. 19) and a secure host subnet 2008 (e.g., the secure host subnet 1908 of FIG. 19). The VCN 2006 can include a local peering gateway (LPG) 2010 (e.g., the LPG 1910 of FIG. 19) that can be communicatively coupled to a secure shell (SSH) VCN 2012 (e.g., the SSH VCN 1912 of FIG. 19) via an LPG 1910 contained in the SSH VCN 2012. The SSH VCN 2012 can include an SSH subnet 2014 (e.g., the SSH subnet 1914 of FIG. 19), and the SSH VCN 2012 can be communicatively coupled to a control plane VCN 2016 (e.g., the control plane VCN 1916 of FIG. 19) via an LPG 2010 contained in the control plane VCN 2016. The control plane VCN 2016 can be contained in a service tenancy 2019 (e.g., the service tenancy 1919 of FIG. 19), and the data plane VCN 2018 (e.g., the data plane VCN 1918 of FIG. 19) can be contained in a customer tenancy 2021 that may be owned or operated by users, or customers, of the system.

The control plane VCN 2016 can include a control plane DMZ tier 2020 (e.g., the control plane DMZ tier 1920 of FIG. 19) that can include LB subnet(s) 2022 (e.g., LB subnet(s) 1922 of FIG. 19), a control plane app tier 2024 (e.g., the control plane app tier 1924 of FIG. 19) that can include app subnet(s) 2026 (e.g., app subnet(s) 1926 of FIG. 19), a control plane data tier 2028 (e.g., the control plane data tier 1928 of FIG. 19) that can include database (DB) subnet(s) 2030 (e.g., similar to DB subnet(s) 1930 of FIG. 19). The LB subnet(s) 2022 contained in the control plane DMZ tier 2020 can be communicatively coupled to the app subnet(s) 2026 contained in the control plane app tier 2024 and an Internet gateway 2034 (e.g., the Internet gateway 1934 of FIG. 19) that can be contained in the control plane VCN 2016, and the app subnet(s) 2026 can be communicatively coupled to the DB subnet(s) 2030 contained in the control plane data tier 2028 and a service gateway 2036 (e.g., the service gateway of FIG. 19) and a network address translation (NAT) gateway 2038 (e.g., the NAT gateway 1938 of FIG. 19). The control plane VCN 2016 can include the service gateway 2036 and the NAT gateway 2038.

The control plane VCN 2016 can include a data plane mirror app tier 2040 (e.g., the data plane mirror app tier 1940 of FIG. 19) that can include app subnet(s) 2026. The app subnet(s) 2026 contained in the data plane mirror app tier 2040 can include a virtual network interface controller (VNIC) 2042 (e.g., the VNIC of 1942) that can execute a compute instance 2044 (e.g., similar to the compute instance 1944 of FIG. 19). The compute instance 2044 can facilitate communication between the app subnet(s) 2026 of the data plane mirror app tier 2040 and the app subnet(s) 2026 that can be contained in a data plane app tier 2046 (e.g., the data plane app tier 1946 of FIG. 19) via the VNIC 2042 contained in the data plane mirror app tier 2040 and the VNIC 2042 contained in the data plane app tier 2046.

The Internet gateway 2034 contained in the control plane VCN 2016 can be communicatively coupled to a metadata management service 2052 (e.g., the metadata management service 1952 of FIG. 19) that can be communicatively coupled to public Internet 2054 (e.g., public Internet 1954 of FIG. 19). Public Internet 2054 can be communicatively coupled to the NAT gateway 2038 contained in the control plane VCN 2016. The service gateway 2036 contained in the control plane VCN 2016 can be communicatively coupled to cloud services 2056 (e.g., cloud services 1956 of FIG. 19).

In some examples, the data plane VCN 2018 can be contained in the customer tenancy 2021. In this case, the IaaS provider may provide the control plane VCN 2016 for each customer, and the IaaS provider may, for each customer, set up a unique compute instance 2044 that is contained in the service tenancy 2019. Each compute instance 2044 may allow communication between the control plane VCN 2016, contained in the service tenancy 2019, and the data plane VCN 2018 that is contained in the customer tenancy 2021. The compute instance 2044 may allow resources that are provisioned in the control plane VCN 2016 that is contained in the service tenancy 2019, to be deployed or otherwise used in the data plane VCN 2018 that is contained in the customer tenancy 2021.

In other examples, the customer of the IaaS provider may have databases that live in the customer tenancy 2021. In this example, the control plane VCN 2016 can include the data plane mirror app tier 2040 that can include app subnet(s) 2026. The data plane mirror app tier 2040 can reside in the data plane VCN 2018, but the data plane mirror app tier 2040 may not live in the data plane VCN 2018. That is, the data plane mirror app tier 2040 may have access to the customer tenancy 2021, but the data plane mirror app tier 2040 may not exist in the data plane VCN 2018 or be owned or operated by the customer of the IaaS provider. The data plane mirror app tier 2040 may be configured to make calls to the data plane VCN 2018 but may not be configured to make calls to any entity contained in the control plane VCN 2016. The customer may desire to deploy or otherwise use resources in the data plane VCN 2018 that are provisioned in the control plane VCN 2016, and the data plane mirror app tier 2040 can facilitate the desired deployment, or other usage of resources, of the customer.

In some embodiments, the customer of the IaaS provider can apply filters to the data plane VCN 2018. In this embodiment, the customer can determine what the data plane VCN 2018 can access, and the customer may restrict access to public Internet 2054 from the data plane VCN 2018. The IaaS provider may not be able to apply filters or otherwise control access of the data plane VCN 2018 to any outside networks or databases. Applying filters and controls by the customer onto the data plane VCN 2018, contained in the customer tenancy 2021, can help isolate the data plane VCN 2018 from other customers and from public Internet 2054.

In some embodiments, cloud services 2056 can be called by the service gateway 2036 to access services that may not exist on public Internet 2054, on the control plane VCN 2016, or on the data plane VCN 2018. The connection between cloud services 2056 and the control plane VCN 2016 or the data plane VCN 2018 may not be live or continuous. Cloud services 2056 may exist on a different network owned or operated by the IaaS provider. Cloud services 2056 may be configured to receive calls from the service gateway 2036 and may be configured to not receive calls from public Internet 2054. Some cloud services 2056 may be isolated from other cloud services 2056, and the control plane VCN 2016 may be isolated from cloud services 2056 that may not be in the same region as the control plane VCN 2016. For example, the control plane VCN 2016 may be located in "Region 1," and cloud service "Deployment 19" may be located in Region 1 and in "Region 2." If a call to Deployment 19 is made by the service gateway 2036 contained in the control plane VCN 2016 located in Region 1, the call may be transmitted to Deployment 19 in Region 1. In this example, the control plane VCN 2016, or Deployment 19 in Region 1, may not be communicatively coupled to, or otherwise in communication with, Deployment 19 in Region 2.

FIG. 21 is a block diagram 2100 illustrating another example pattern of an IaaS architecture, according to at least one embodiment. Service operators 2102 (e.g., service operators 1902 of FIG. 19) can be communicatively coupled to a secure host tenancy 2104 (e.g., the secure host tenancy 1904 of FIG. 19) that can include a virtual cloud network (VCN) 2106 (e.g., the VCN 1906 of FIG. 19) and a secure host subnet 2108 (e.g., the secure host subnet 1908 of FIG. 19). The VCN 2106 can include an LPG 2110 (e.g., the LPG 1910 of FIG. 19) that can be communicatively coupled to an SSH VCN 2112 (e.g., the SSH VCN 1912 of FIG. 19) via an LPG 2110 contained in the SSH VCN 2112. The SSH VCN 2112 can include an SSH subnet 2114 (e.g., the SSH subnet 1914 of FIG. 19), and the SSH VCN 2112 can be communicatively coupled to a control plane VCN 2116 (e.g., the control plane VCN 1916 of FIG. 19) via an LPG 2110 contained in the control plane VCN 2116 and to a data plane VCN 2118 (e.g., the data plane 1918 of FIG. 19) via an LPG 2110 contained in the data plane VCN 2118. The control plane VCN 2116 and the data plane VCN 2118 can be contained in a service tenancy 2119 (e.g., the service tenancy 1919 of FIG. 19).

The control plane VCN 2116 can include a control plane DMZ tier 2120 (e.g., the control plane DMZ tier 1920 of FIG. 19) that can include load balancer (LB) subnet(s) 2122 (e.g., LB subnet(s) 1922 of FIG. 19), a control plane app tier 2124 (e.g., the control plane app tier 1924 of FIG. 19) that can include app subnet(s) 2126 (e.g., similar to app subnet(s) 1926 of FIG. 19), and a control plane data tier 2128 (e.g., the control plane data tier 1928 of FIG. 19) that can include DB subnet(s) 2130. The LB subnet(s) 2122 contained in the control plane DMZ tier 2120 can be communicatively coupled to the app subnet(s) 2126 contained in the control plane app tier 2124 and to an Internet gateway 2134 (e.g., the Internet gateway 1934 of FIG. 19) that can be contained in the control plane VCN 2116, and the app subnet(s) 2126 can be communicatively coupled to the DB subnet(s) 2130 contained in the control plane data tier 2128 and to a service gateway 2136 (e.g., the service gateway of FIG. 19) and a network address translation (NAT) gateway 2138 (e.g., the NAT gateway 1938 of FIG. 19). The control plane VCN 2116 can include the service gateway 2136 and the NAT gateway 2138.

The data plane VCN 2118 can include a data plane app tier 2146 (e.g., the data plane app tier 1946 of FIG. 19), a data plane DMZ tier 2148 (e.g., the data plane DMZ tier 1948 of FIG. 19), and a data plane data tier 2150 (e.g., the data plane data tier 1950 of FIG. 19). The data plane DMZ tier 2148 can include LB subnet(s) 2122 that can be communicatively coupled to trusted app subnet(s) 2160 and untrusted app subnet(s) 2162 of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include one or more primary VNICs 2164(1)-(N) that can be communicatively coupled to tenant virtual machines (VMs) 2166(1)-(N). Each tenant VM 2166(1)-(N) can be communicatively coupled to a respective app subnet 2167(1)-(N) that can be contained in respective container egress VCNs 2168(1)-(N) that can be contained in respective customer tenancies 2170(1)-(N). Respective secondary VNICs 2172(1)-(N) can facilitate communication between the untrusted app subnet(s) 2162 contained in the data plane VCN 2118 and the app subnet contained in the container egress VCNs 2168(1)-(N). Each container egress VCNs 2168(1)-(N) can include a NAT gateway 2138 that can be communicatively coupled to public Internet 2154 (e.g., public Internet 1954 of FIG. 19).

The Internet gateway 2134 contained in the control plane VCN 2116 and contained in the data plane VCN 2118 can be communicatively coupled to a metadata management service 2152 (e.g., the metadata management system 1952 of FIG. 19) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively coupled to cloud services 2156.

In some embodiments, the data plane VCN 2118 can be integrated with customer tenancies 2170. This integration can be useful or desirable for customers of the IaaS provider in some cases such as a case in which support may be desired when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 2146. Code to run the function may be executed in the VMs 2166(1)-(N), and the code may not be configured to run anywhere else on the data plane VCN 2118. Each VM 2166(1)-(N) may be connected to one customer tenancy 2170. Respective containers 2171(1)-(N) contained in the VMs 2166(1)-(N) may be configured to run the code. In this case, there can be a dual isolation (e.g., the containers 2171(1)-(N) running code, where the containers 2171(1)-(N) may be contained in at least the VMs 2166(1)-(N) that are contained in the untrusted app subnet(s) 2162), which may help prevent incorrect or otherwise undesirable code from damaging the network of the IaaS provider or from damaging a network of a different customer. The containers 2171(1)-(N) may be communicatively coupled to the customer tenancy 2170 and may be configured to transmit or receive data from the customer tenancy 2170. The containers 2171(1)-(N) may not be configured to transmit or receive data from any other entity in the data plane VCN 2118. Upon completion of running the code, the IaaS provider may kill or otherwise dispose of the containers 2171(1)-(N).

In some embodiments, the trusted app subnet(s) 2160 may run code that may be owned or operated by the IaaS provider. In this embodiment, the trusted app subnet(s) 2160 may be communicatively coupled to the DB subnet(s) 2130 and be configured to execute CRUD operations in the DB subnet(s) 2130. The untrusted app subnet(s) 2162 may be communicatively coupled to the DB subnet(s) 2130, but in this embodiment, the untrusted app subnet(s) may be configured to execute read operations in the DB subnet(s) 2130. The containers 2171(1)-(N) that can be contained in the VM 2166(1)-(N) of each customer and that may run code from the customer may not be communicatively coupled with the DB subnet(s) 2130.

In other embodiments, the control plane VCN 2116 and the data plane VCN 2118 may not be directly communicatively coupled. In this embodiment, there may be no direct communication between the control plane VCN 2116 and the data plane VCN 2118. However, communication can occur indirectly through at least one method. An LPG 2110 may be established by the IaaS provider that can facilitate communication between the control plane VCN 2116 and the data plane VCN 2118. In another example, the control plane VCN 2116 or the data plane VCN 2118 can make a call to cloud services 2156 via the service gateway 2136. For example, a call to cloud services 2156 from the control plane VCN 2116 can include a request for a service that can communicate with the data plane VCN 2118.

FIG. 22 is a block diagram 2200 illustrating another example pattern of an IaaS architecture, according to at least one embodiment. Service operators 2202 (e.g., service operators 1902 of FIG. 19) can be communicatively coupled to a secure host tenancy 2204 (e.g., the secure host tenancy 1904 of FIG. 19) that can include a virtual cloud network (VCN) 2206 (e.g., the VCN 1906 of FIG. 19) and a secure host subnet 2208 (e.g., the secure host subnet 1908 of FIG. 19). The VCN 2206 can include an LPG 2210 (e.g., the LPG 1910 of FIG. 19) that can be communicatively coupled to an SSH VCN 2212 (e.g., the SSH VCN 1912 of FIG. 19) via an LPG 2210 contained in the SSH VCN 2212. The SSH VCN 2212 can include an SSH subnet 2214 (e.g., the SSH subnet 1914 of FIG. 19), and the SSH VCN 2212 can be communicatively coupled to a control plane VCN 2216 (e.g., the control plane VCN 1916 of FIG. 19) via an LPG 2210 contained in the control plane VCN 2216 and to a data plane VCN 2218 (e.g., the data plane 1918 of FIG. 19) via an LPG 2210 contained in the data plane VCN 2218. The control plane VCN 2216 and the data plane VCN 2218 can be contained in a service tenancy 2219 (e.g., the service tenancy 1919 of FIG. 19).

The control plane VCN 2216 can include a control plane DMZ tier 2220 (e.g., the control plane DMZ tier 1920 of FIG. 19) that can include LB subnet(s) 2222 (e.g., LB subnet(s) 1922 of FIG. 19), a control plane app tier 2224 (e.g., the control plane app tier 1924 of FIG. 19) that can include app subnet(s) 2226 (e.g., app subnet(s) 1926 of FIG. 19), a control plane data tier 2228 (e.g., the control plane data tier 1928 of FIG. 19) that can include DB subnet(s) 2230 (e.g., DB subnet(s) 2130 of FIG. 21). The LB subnet(s) 2222 contained in the control plane DMZ tier 2220 can be communicatively coupled to the app subnet(s) 2226 contained in the control plane app tier 2224 and to an Internet gateway 2234 (e.g., the Internet gateway 1934 of FIG. 19) that can be contained in the control plane VCN 2216, and the app subnet(s) 2226 can be communicatively coupled to the DB subnet(s) 2230 contained in the control plane data tier 2228 and to a service gateway 2236 (e.g., the service gateway of FIG. 19) and a network address translation (NAT) gateway 2238 (e.g., the NAT gateway 1938 of FIG. 19). The control plane VCN 2216 can include the service gateway 2236 and the NAT gateway 2238.

The data plane VCN 2218 can include a data plane app tier 2246 (e.g., the data plane app tier 1946 of FIG. 19), a data plane DMZ tier 2248 (e.g., the data plane DMZ tier 1948 of FIG. 19), and a data plane data tier 2250 (e.g., the data plane data tier 1950 of FIG. 19). The data plane DMZ tier 2248 can include LB subnet(s) 2222 that can be communicatively coupled to trusted app subnet(s) 2260 (e.g., trusted app subnet(s) 2160 of FIG. 21) and untrusted app subnet(s) 2262 (e.g., untrusted app subnet(s) 2162 of FIG. 21) of the data plane app tier 2246 and the Internet gateway 2234 contained in the data plane VCN 2218. The trusted app subnet(s) 2260 can be communicatively coupled to the service gateway 2236 contained in the data plane VCN 2218, the NAT gateway 2238 contained in the data plane VCN 2218, and DB subnet(s) 2230 contained in the data plane data tier 2250. The untrusted app subnet(s) 2262 can be communicatively coupled to the service gateway 2236 contained in the data plane VCN 2218 and DB subnet(s) 2230 contained in the data plane data tier 2250. The data plane data tier 2250 can include DB subnet(s) 2230 that can be communicatively coupled to the service gateway 2236 contained in the data plane VCN 2218.

The untrusted app subnet(s) 2262 can include primary VNICs 2264(1)-(N) that can be communicatively coupled to tenant virtual machines (VMs) 2266(1)-(N) residing within the untrusted app subnet(s) 2262. Each tenant VM 2266(1)-(N) can run code in a respective container 2267(1)-(N), and be communicatively coupled to an app subnet 2226 that can be contained in a data plane app tier 2246 that can be contained in a container egress VCN 2268. Respective secondary VNICs 2272(1)-(N) can facilitate communication between the untrusted app subnet(s) 2262 contained in the data plane VCN 2218 and the app subnet contained in the container egress VCN 2268. The container egress VCN can include a NAT gateway 2238 that can be communicatively coupled to public Internet 2254 (e.g., public Internet 1954 of FIG. 19).

The Internet gateway 2234 contained in the control plane VCN 2216 and contained in the data plane VCN 2218 can be communicatively coupled to a metadata management service 2252 (e.g., the metadata management system 1952 of FIG. 19) that can be communicatively coupled to public Internet 2254. Public Internet 2254 can be communicatively coupled to the NAT gateway 2238 contained in the control plane VCN 2216 and contained in the data plane VCN 2218. The service gateway 2236 contained in the control plane VCN 2216 and contained in the data plane VCN 2218 can be communicatively coupled to cloud services 2256.

In some examples, the pattern illustrated by the architecture of block diagram 2200 of FIG. 22 may be considered an exception to the pattern illustrated by the architecture of block diagram 2100 of FIG. 21 and may be desirable for a customer of the IaaS provider if the IaaS provider cannot directly communicate with the customer (e.g., a disconnected region). The respective containers 2267(1)-(N) that are contained in the VMs 2266(1)-(N) for each customer can be accessed in real-time by the customer. The containers 2267(1)-(N) may be configured to make calls to respective secondary VNICs 2272(1)-(N) contained in app subnet(s) 2226 of the data plane app tier 2246 that can be contained in the container egress VCN 2268. The secondary VNICs

2272(1)-(N) can transmit the calls to the NAT gateway 2238 that may transmit the calls to public Internet 2254. In this example, the containers 2267(1)-(N) that can be accessed in real-time by the customer can be isolated from the control plane VCN 2216 and can be isolated from other entities contained in the data plane VCN 2218. The containers 2267(1)-(N) may also be isolated from resources from other customers.

In other examples, the customer can use the containers 2267(1)-(N) to call cloud services 2256. In this example, the customer may run code in the containers 2267(1)-(N) that requests a service from cloud services 2256. The containers 2267(1)-(N) can transmit this request to the secondary VNICs 2272(1)-(N) that can transmit the request to the NAT gateway that can transmit the request to public Internet 2254. Public Internet 2254 can transmit the request to LB subnet(s) 2222 contained in the control plane VCN 2216 via the Internet gateway 2234. In response to determining the request is valid, the LB subnet(s) can transmit the request to app subnet(s) 2226 that can transmit the request to cloud services 2256 via the service gateway 2236.

It should be appreciated that IaaS architectures 1900, 2000, 2100, 2200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 23:
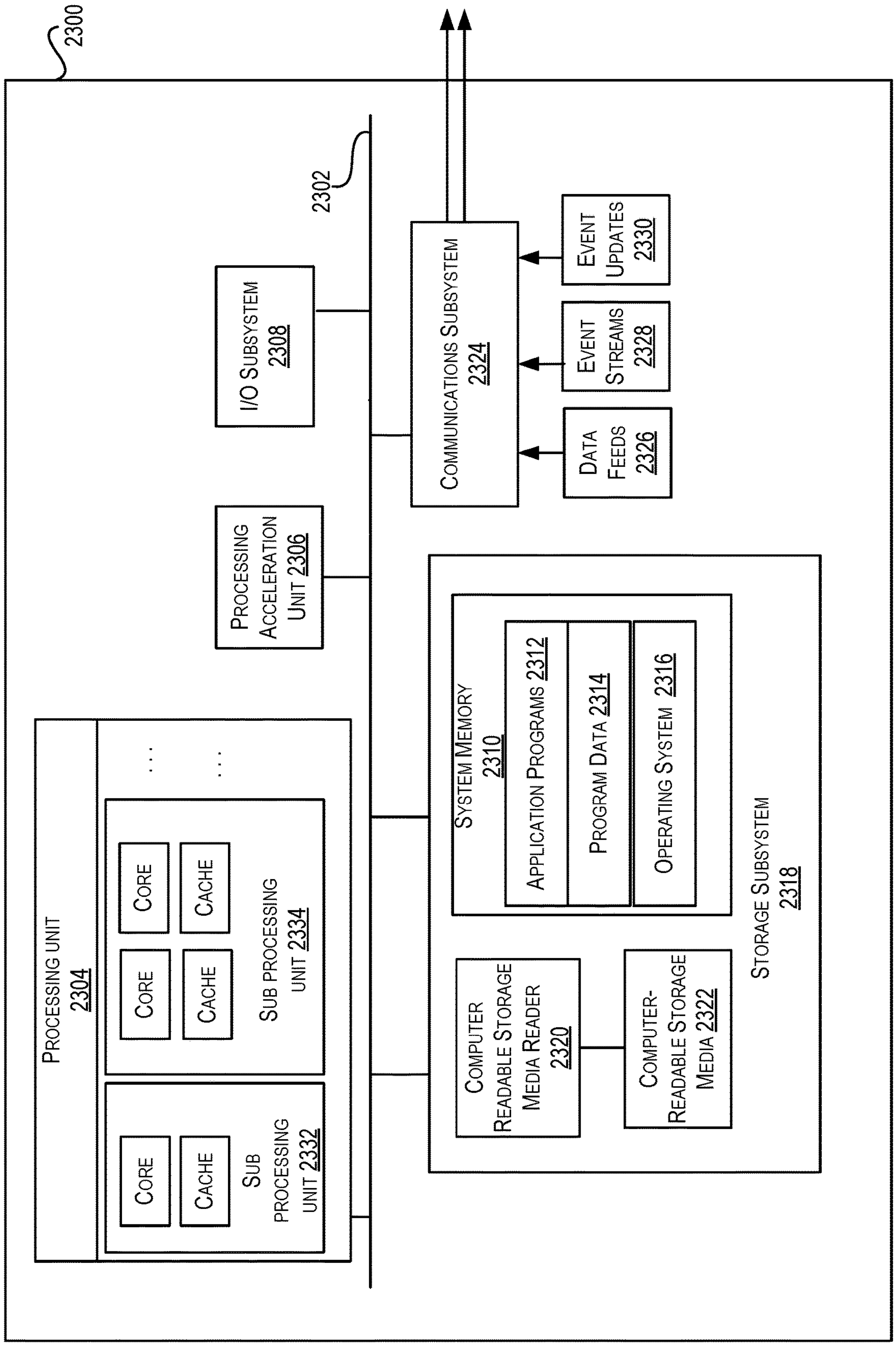
FIG. 23 is a block diagram illustrating an example computer system, according to at least one embodiment.

FIG. 23 illustrates an example computer system 2300, in which various embodiments may be implemented. The system 2300 may be used to implement any of the computer systems described above. As shown in the figure, computer system 2300 includes a processing unit 2304 that communicates with a number of peripheral subsystems via a bus subsystem 2302. These peripheral subsystems may include a processing acceleration unit 2306, an I/O subsystem 2308, a storage subsystem 2318 and a communications subsystem 2324. Storage subsystem 2318 includes tangible computer-readable storage media 2322 and a system memory 2310.

Bus subsystem 2302 provides a mechanism for letting the various components and subsystems of computer system 2300 communicate with each other as intended. Although bus subsystem 2302 is shown schematically as a single bus, alternative embodiments of the bus subsystem may utilize multiple buses. Bus subsystem 2302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2304, which can be implemented as one or more integrated circuits (e.g., a conventional microprocessor or microcontroller), controls the operation of computer system 2300. One or more processors may be included in processing unit 2304. These processors may include single core or multicore processors. In certain embodiments, processing unit 2304 may be implemented as one or more independent processing units 2332 and/or 2334 with single or multicore processors included in each processing unit. In other embodiments, processing unit 2304 may also be implemented as a quad-core processing unit formed by integrating two dual-core processors into a single chip.

In various embodiments, processing unit 2304 can execute a variety of programs in response to program code and can maintain multiple concurrently executing programs or processes. At any given time, some or all of the program code to be executed can be resident in processor(s) 2304 and/or in storage subsystem 2318. Through suitable programming, processor(s) 2304 can provide various functionalities described above. Computer system 2300 may additionally include a processing acceleration unit 2306, which can include a digital signal processor (DSP), a special-purpose processor, and/or the like.

I/O subsystem 2308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, or medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2300 may comprise a storage subsystem 2318 that comprises software elements, shown as being currently located within a system memory 2310. System memory 2310 may store program instructions that are loadable and executable on processing unit 2304, as well as data generated during the execution of these programs.

Depending on the configuration and type of computer system 2300, system memory 2310 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 2304. In some implementations, system memory 2310 may include multiple different types of memory, such as static random access memory (SRAM) or dynamic random access memory (DRAM). In some implementations, a basic input/output system (BIOS), containing the basic routines that help to transfer information between elements within computer system 2300, such as during start-up, may typically be stored in the ROM. By way of example, and not limitation, system memory 2310 also illustrates application programs 2312, which may include client applications, Web browsers, mid-tier applications, relational database management systems (RDBMS), etc., program data 2314, and an operating system 2316. By way of example, operating system 2316 may include various versions of Microsoft Windows®, Apple Macintosh®, and/or Linux operating systems, a variety of commercially available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 23 OS, and Palm® OS operating systems.

Storage subsystem 2318 may also provide a tangible computer-readable storage medium for storing the basic programming and data constructs that provide the functionality of some embodiments. Software (programs, code modules, instructions) that, when executed by a processor, provides the functionality described above may be stored in storage subsystem 2318. These software modules or instructions may be executed by processing unit 2304. Storage subsystem 2318 may also provide a repository for storing data used in accordance with the present disclosure.

Storage subsystem 2300 may also include a computer-readable storage media reader 2320 that can further be connected to computer-readable storage media 2322. Together and, optionally, in combination with system memory 2310, computer-readable storage media 2322 may comprehensively represent remote, local, fixed, and/or removable storage devices plus storage media for temporarily and/or more permanently containing, storing, transmitting, and retrieving computer-readable information.

Computer-readable storage media 2322 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2300.

By way of example, computer-readable storage media 2322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2300.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to connect to one or more devices via the Internet. In some embodiments communications subsystem 2324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2324 can provide wired network connectivity (e.g., Ethernet) in addition to or instead of a wireless interface.

In some embodiments, communications subsystem 2324 may also receive input communication in the form of structured and/or unstructured data feeds 2326, event streams 2328, event updates 2330, and the like on behalf of one or more users who may use computer system 2300.

By way of example, communications subsystem 2324 may be configured to receive data feeds 2326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2324 may also be configured to receive data in the form of continuous data streams, which may include event streams 2328 of real-time events and/or event updates 2330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2324 may also be configured to output the structured and/or unstructured data feeds 2326, event streams 2328, event updates 2330, and the like to one or more databases that may be in communication with one or more streaming data source computers coupled to computer system 2300.

Computer system 2300 can be one of various types, including a handheld portable device (e.g., an iPhone® cellular phone, an iPad® computing tablet, a PDA), a wearable device (e.g., a Google Glass® head-mounted display), a PC, a workstation, a mainframe, a kiosk, a server rack, or any other data processing system.

In the foregoing description, for the purposes of explanation, specific details are set forth to provide a thorough understanding of examples of the disclosure. However, it will be apparent that various examples may be practiced without these specific details. The ensuing description provides examples only and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile applications, desktop applications, web applications, enterprise applications, and the like. Further, the teachings of this disclosure are not restricted to a particular operating environment (e.g., operating systems, devices, platforms, and the like), but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but the process could have additional steps not included in a figure. A process may correspond to a method, a function, a procedure, a subroutine, a subprogram, and so on. When a process corresponds to a function, its termination may correspond to a return of the function to the calling function or the main function.

The words "example" and "exemplary" are used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and which does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, or memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and so forth may be passed, forwarded, or transmitted via any suitable means including memory sharing, message passing, token passing, network transmission, and so forth.

Furthermore, examples may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors or other suitable electronic circuits) to perform the operation, or any combination thereof.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including, but not limited to, conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

hosting, by a network virtualization device, a Layer 2 virtual network interface and a Layer 2 virtual switch that belong to a Layer 2 virtual network of a customer, wherein:

the Layer 2 virtual network interface and the Layer 2 virtual switch are associated with a Layer 2 compute instance that belongs to the Layer 2 virtual network, the Layer 2 compute instance is hosted on a host machine of a physical network that comprises the host machine and the network virtualization device, the host machine and the network virtualization device are separate physical devices that are communicatively coupled, and the Layer 2 virtual network is hosted on the physical network;

receiving, by the network virtualization device, information from a control plane of the physical network, wherein the information indicates one or more criteria associated with copying frames and a destination to receive frame copies, wherein the information is based on a mapping of a customer-specified configuration of the Layer 2 virtual network and a topology of the Layer 2 virtual network;

storing, by the network virtualization device, the information;

receiving, by the network virtualization device, a frame comprising header information, wherein the frame is destined to or originates from the Layer 2 compute instance;

determining, by the network virtualization device by comparing the header information with the one or more criteria, that the one or more criteria are satisfied for the frame;

generating, by the network virtualization device, a copy of the frame; and sending, by the network virtualization device, the copy of the frame to the destination.

2. The method of claim 1, wherein the information is based further on input of the customer indicating that the one or more criteria are to be applied to ingress traffic to or egress traffic from the Layer 2 compute instance and based on the network virtualization device hosting the Layer 2 virtual switch associated with the Layer 2 compute instance.

3. The method of claim 2, wherein the frame is destined to the Layer 2 compute instance.

4. The method of claim 3, further comprising:

determining, by the network virtualization device, a first destination media access control (MAC) address of the frame, wherein the first destination MAC address is included in the information and is associated with the Layer 2 compute instance; and including, by the network virtualization device, a second destination MAC address in the copy of the frame, wherein the second destination MAC address is included in the information and is associated with a destination for the copy of the frame.

5. The method of claim 2, wherein the input of the customer indicates that egress frames received from the Layer 2 compute instance are to be copied and sent to a second destination different from the destination, and wherein the method further comprises:

determining, by the network virtualization device, a source media access control (MAC) address associated with the Layer 2 compute instance, wherein the source MAC address associated with the Layer 2 compute instance is included in the information, and wherein the one or more criteria is based on the source MAC address associated with the Layer 2 compute instance; and including, by the network virtualization device, a destination MAC address in the copy of the frame, wherein the destination MAC address is included in the information.

6. The method of claim 2, wherein the input of the customer indicates that frames received from the Layer 2 compute instance are to be copied and sent to a second destination different from the destination using an encapsulation protocol, wherein the method further comprises:

determining a media access control (MAC) address of the frame, wherein the MAC address is a source MAC address or a first destination MAC address, and is included in the information; and including, in the copy of the frame, a second destination MAC address, wherein the second destination MAC address is included in the information; and encapsulating the copy of the frame based on the encapsulation protocol.

7. The method of claim 2, wherein:

the information comprises filtering criteria and processing criteria; and the frame comprises a Layer-2 header that comprises the header information.

8. The method of claim 1, wherein generating the copy of the frame is in response to determining that the one or more criteria are satisfied for the frame.

9. A network virtualization device comprising:

one or more processors; and one or more computer-readable storage media storing instructions that, upon execution by the one or more processors, configure the network virtualization device to:

host a Layer 2 virtual network interface and a Layer 2 virtual switch that belong to a Layer 2 virtual network of a customer, wherein:

the Layer 2 virtual network interface and the Layer 2 virtual switch are associated with a Layer 2 compute instance that belongs to the Layer 2 virtual network, the Layer 2 compute instance is hosted on a host machine of a physical network that comprises the host machine and the network virtualization device, the host machine and the network virtualization device are separate physical devices that are communicatively coupled, and the Layer 2 virtual network is hosted on the physical network;

receive information from a control plane of the physical network, wherein the information indicates one or more criteria associated with copying frames and a destination to receive frame copies, wherein the information is received based on a mapping of a customer-specified configuration of the Layer 2 virtual network and a topology of the Layer 2 virtual network;

store the information;

receive a frame comprising header information, wherein the frame is destined to or originates from the Layer 2 compute instance;

determine, by comparing the header information with the one or more criteria, that the one or more criteria are satisfied for the frame;

generate a copy of the frame; and send the copy of the frame to the destination.

10. The network virtualization device of claim 9, wherein the information is based further on input of the customer indicating that the one or more criteria are to be applied to ingress traffic to or egress traffic from the Layer 2 compute instance and based on the network virtualization device hosting the Layer 2 virtual switch associated with the Layer 2 compute instance.

11. The network virtualization device of claim 10, wherein the frame is destined to the Layer 2 compute instance, and wherein the execution of the instructions further configure the network virtualization device to:

determine a first destination media access control (MAC) address of the frame, wherein the first destination MAC address is included in the information and is associated with the Layer 2 compute instance; and include, in the copy of the frame, a second destination MAC address, wherein the second destination MAC address is included in the information and is associated with a destination for the copy of the frame.

12. The network virtualization device of claim 10, wherein the input of the customer indicates that egress frames received from the Layer 2 compute instance are to be copied and sent to a second destination different from the destination.

13. The network virtualization device of claim 12, wherein the execution of the instructions further configure the network virtualization device to:

determine a source media access control (MAC) address of the frame, wherein the source MAC address is included in the information and is associated with the Layer 2 compute instance; and include, in the copy of the frame, a destination MAC address, wherein the destination MAC address is included in the information and is associated with a destination for the copy of the frame.

14. The network virtualization device of claim 10, wherein the input of the customer indicates that frames received from the Layer 2 compute instance are to be copied and sent to a second destination different from the destination using an encapsulation protocol, wherein the execution of the instructions further configure the network virtualization device to:

determine a media access control (MAC) address of the frame, wherein the MAC address is a source MAC address or a first destination MAC address, and is included in the information; and include, in the copy of the frame, a second destination MAC address, wherein the second destination MAC address is included in the information; and encapsulate the copy of the frame based on the encapsulation protocol.

15. A non-transitory computer-readable storage medium storing instructions that, upon execution by one or more processors of a network virtualization device, cause the one or more processors to perform operations comprising:

hosting a Layer 2 virtual network interface and a Layer 2 virtual switch that belong to a Layer 2 virtual network of a customer, wherein:

the Layer 2 virtual network interface and the Layer 2 virtual switch are associated with a Layer 2 compute instance that belongs to the Layer 2 virtual network, the Layer 2 compute instance is hosted on a host machine of a physical network that comprises the host machine and the network virtualization device, the host machine and the network virtualization device are separate physical devices that are communicatively coupled, and the Layer 2 virtual network is hosted on the physical network;

receiving, by the network virtualization device, information from a control plane of the physical network, wherein the information indicates one or more criteria associated with copying frames and a destination to receive frame copies, wherein the information is based on a mapping of a customer-specified configuration of the Layer 2 virtual network and a topology of the Layer 2 virtual network;

storing the information;

receiving a frame comprising header information, wherein the frame is destined to or originates from the Layer 2 compute instance;

determining, by comparing the header information with the one or more criteria, that the one or more criteria are satisfied for the frame;

generating a copy of the frame; and sending the copy of the frame to the destination.

16. The non-transitory computer-readable storage medium of claim 15, wherein the information is based further on input of the customer indicating that the one or more criteria are to be applied to ingress traffic to or egress traffic from the Layer 2 compute instance and based on the network virtualization device hosting the Layer 2 virtual switch associated with the Layer 2 compute instance.

17. The non-transitory computer-readable storage medium of claim 16, wherein the input of the customer indicates that ingress frames received from the Layer 2 compute instance are to be copied and sent to a second destination different from the destination, and wherein the execution of the instructions further configure the one or more processors to perform operations comprising:

determine a first destination media access control (MAC) address of the frame, and wherein the first destination MAC address is included in the information; and include, in the copy of the frame, a second destination MAC address, wherein the second destination MAC address is included in the information.

18. The non-transitory computer-readable storage medium of claim 16, wherein the input of the customer indicates that egress frames received from the Layer 2 compute instance are to be copied and sent to a second destination different from the destination, and wherein the execution of the instructions further configure the one or more processors to perform operations comprising:

determine a source media access control (MAC) address of the frame, wherein the source MAC address is included in the information; and include, in the copy of the frame, a destination MAC address, wherein the destination MAC address is included in the information.

19. The non-transitory computer-readable storage medium of claim 16, wherein the input of the customer indicates that frames received from the Layer 2 compute instance are to be copied and sent to a second destination different from the destination using an encapsulation protocol.

20. The non-transitory computer-readable storage medium of claim 19, wherein the execution of the instructions further configure the one or more processors to perform operations comprising:

determine a media access control (MAC) address of the frame, wherein the MAC address is a source MAC address or a first destination MAC address, and is included in the information; and include, in the copy of the frame, a second destination MAC address, wherein the second destination MAC address is included in the information; and encapsulate the copy of the frame based on the encapsulation protocol.

* * * * *